United States Patent
Onoda et al.

(10) Patent No.: US 12,496,630 B2
(45) Date of Patent: Dec. 16, 2025

(54) REBAR TYING ROBOT

(71) Applicant: MAKITA CORPORATION, Anjo (JP)

(72) Inventors: Kengo Onoda, Anjo (JP); Kazuki Oguchi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 258 days.

(21) Appl. No.: 18/271,897

(22) PCT Filed: Dec. 16, 2021

(86) PCT No.: PCT/JP2021/046530
§ 371 (c)(1),
(2) Date: Jul. 12, 2023

(87) PCT Pub. No.: WO2022/153779
PCT Pub. Date: Jul. 21, 2022

(65) Prior Publication Data
US 2024/0066586 A1  Feb. 29, 2024

(30) Foreign Application Priority Data

Jan. 18, 2021  (JP) .................. 2021-006039

(51) Int. Cl.
*B21F 15/04*  (2006.01)
*B25J 5/00*  (2006.01)

(52) U.S. Cl.
CPC ............... *B21F 15/04* (2013.01); *B25J 5/007* (2013.01)

(58) Field of Classification Search
CPC ........ B21F 15/04; B21F 27/02; B21F 45/006; B21F 27/08; B25J 5/007; E04G 21/123
See application file for complete search history.

(56) References Cited

U.S. PATENT DOCUMENTS

| | | | | |
|---|---|---|---|---|
| 10,061,323 | B2 * | 8/2018 | Muck | G05D 1/0246 |
| 2016/0368149 | A1 * | 12/2016 | Inaba | G05D 1/0223 |

(Continued)

FOREIGN PATENT DOCUMENTS

| | | |
|---|---|---|
| JP | 2019-039174 A | 3/2019 |
| JP | 2020-504254 A | 2/2020 |

(Continued)

OTHER PUBLICATIONS

What is LiDAR, IBM.com/think/topics/lidar Sep. 2023.*

(Continued)

*Primary Examiner* — Edward T Tolan
(74) *Attorney, Agent, or Firm* — Oliff PLC

(57) ABSTRACT

A rebar tying robot may include a rebar tying unit, a conveying unit configured to convey the rebar tying unit, and a control unit configured to control the conveying unit. The conveying unit may include a longitudinal movement mechanism configured to move the rebar tying robot in a front-rear direction and a first three-dimensional distance sensor configured to output first point cloud data which represents a three-dimensional position of a subject in a first field of view by point clouds. The control unit may be configured to execute a first rebar extraction process in which the control unit extracts point clouds from the point clouds included in the first point cloud data and an intersection location identification process in which the control unit identifies a position where the primary rebar and the secondary rebar intersect based on the point clouds extracted in the first rebar extraction process.

7 Claims, 41 Drawing Sheets

(56) References Cited

U.S. PATENT DOCUMENTS

2020/0117213 A1* 4/2020 Tian ..................... G05D 1/0274
2020/0398433 A1* 12/2020 Kelly ..................... B25J 13/085
2021/0156160 A1* 5/2021 Manabe ................... B25J 5/007
2022/0143678 A1* 5/2022 Evans ....................... B21F 7/00

FOREIGN PATENT DOCUMENTS

JP         2020-165748 A    10/2020
WO     2018/118229 A1    6/2018

OTHER PUBLICATIONS

CN 112045654A, Zhang Dec. 2020.*
Jan. 7, 2025 Office Action issued in Japanese Patent Application No. 2021-006039.
Feb. 1, 2022 International Search Report issued in International Patent Application No. PCT/JP2021/046530.
Feb. 1, 2022 Written Opinion issued in International Patent Application No. PCT/JP2021/046530.

* cited by examiner

REBAR TYING ROBOT

TECHNICAL FIELD

The art disclosed herein relates to a rebar tying robot.

BACKGROUND ART

Japanese Patent Application Publication No. 2019-39174 describes a rebar tying robot alternately and repeatedly performs an operation of moving, in a direction in which a plurality of primary rebars extends, over the plurality of primary rebars and a plurality of secondary rebars intersecting the plurality of primary rebars and an operation of tying the plurality of primary rebars and the plurality of secondary rebars at points where the plurality of primary rebars and the plurality of secondary rebars intersect. The rebar tying robot includes a rebar tying unit, a conveying unit that conveys the rebar tying unit, and a control unit that controls an operation of the conveying unit. The conveying unit includes a longitudinal movement mechanism that can move the rebar tying robot in a front-rear direction.

SUMMARY OF INVENTION

Technical Problem

In the rebar tying robot of Japanese Patent Application Publication No. 2019-39174, the longitudinal movement mechanism can only move the rebar tying robot in a direction along the primary rebars, thus a posture angle of the rebar tying robot with respect to the primary rebars is fixed. Due to this, a position of a point where a primary rebar and a secondary rebar intersect is identified by detecting presence/absence of the secondary rebar using laser sensors arranged on the left and right sides of the rebar tying robot and directed downward. However, when the posture angle of the rebar tying robot with respect to the primary rebars is not fixed, the position of the point where the primary rebar and the secondary rebar intersect cannot be identified. The disclosure herein provides art that enables identifying a position of a point where a primary rebar and a secondary rebar intersect even when a posture angle of a rebar tying robot with respect to the primary rebar is not fixed.

Solution to Technical Problem

A rebar tying robot disclosed herein may be configured to alternately and repeatedly perform an operation of moving, in a direction in which a plurality of primary rebars extends, over the plurality of primary rebars and a plurality of secondary rebars intersecting the plurality of primary rebars and an operation of tying the plurality of primary rebars and the plurality of secondary rebars at points where the plurality of primary rebars and the plurality of secondary rebars intersect. The rebar tying robot may comprise a rebar tying unit, a conveying unit configured to convey the rebar tying unit, and a control unit configured to control an operation of the conveying unit. The conveying unit may comprise a longitudinal movement mechanism configured to move the rebar tying robot in a front-rear direction and a first three-dimensional distance sensor configured to output first point cloud data which represents a three-dimensional position of an object in a first field of view by point clouds. The control unit may be configured to execute a first rebar extraction process in which the control unit extracts, from the point clouds included in the first point cloud data, point clouds whose positions in an up-down direction are within a predetermined rebar depth range and an intersection location identification process in which the control unit identifies a position where the primary rebar and the secondary rebar intersect based on the point clouds extracted in the first rebar extraction process.

According to the above configuration, a position where the primary rebar and the secondary rebar intersect is identified using the first point cloud data obtained by the first three-dimensional distance sensor. Due to this, even when a posture angle of the rebar tying robot with respect to the primary rebar is not fixed, the position of the point where the primary rebar and the secondary rebar intersect can still be identified. The point clouds included in the first point cloud data obtained by the first three-dimensional distance sensor includes not only point clouds corresponding to the primary rebars and the secondary rebars but also point clouds corresponding to objects located lower than the primary rebars and the secondary rebars, such as the ground surface. According to the above configuration, the point clouds corresponding to the primary rebars and the secondary rebars can be extracted by the first rebar extraction process, and the position where the primary rebar and the secondary rebar intersect can accurately be identified.

DESCRIPTION OF EMBODIMENTS

Figure 1:
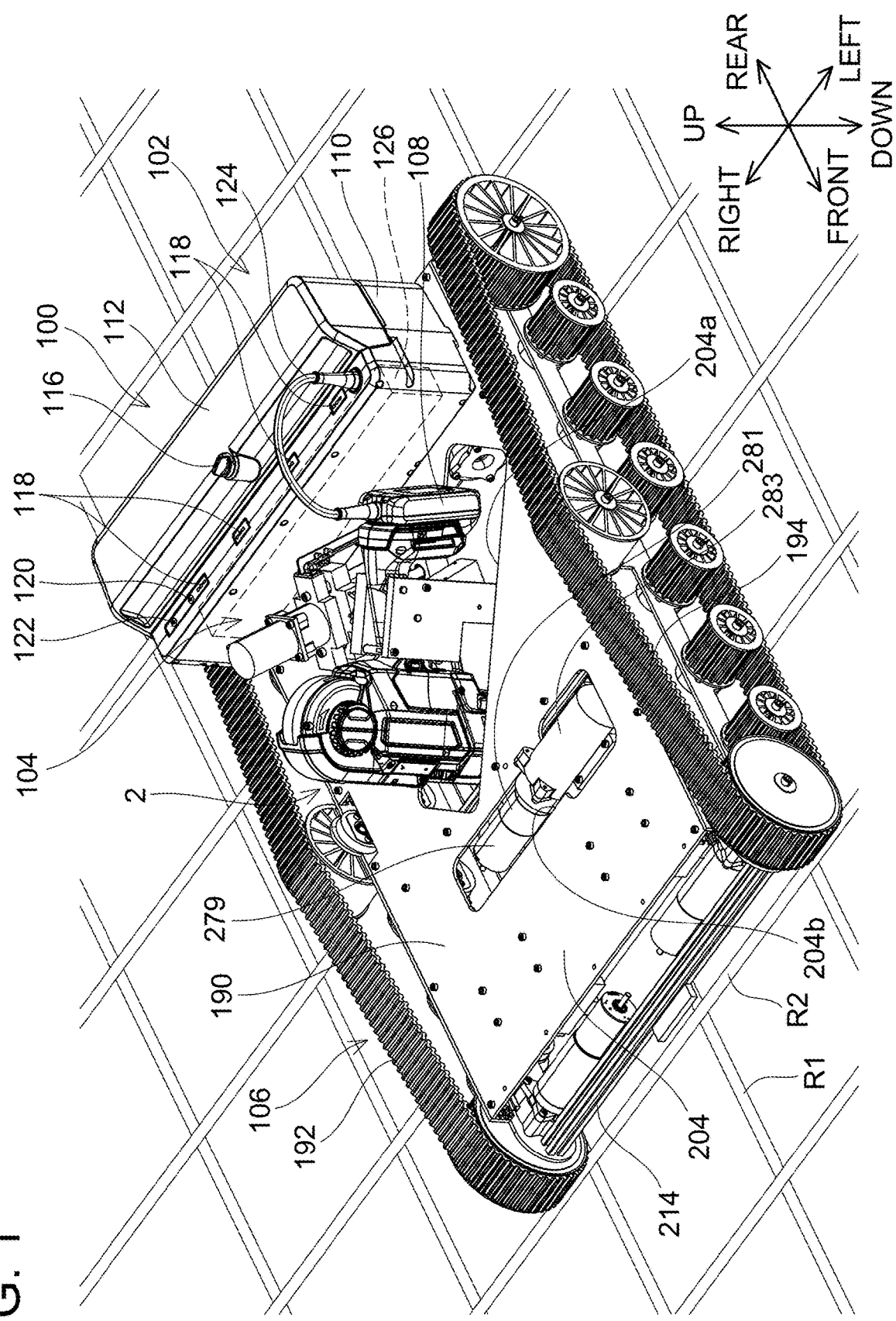
FIG. 1 is a perspective view of a rebar tying robot 100 of an embodiment viewed from the front left upper side.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved rebar tying robots as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, a rebar tying robot may be configured to alternately and repeatedly perform an operation of moving, in a direction in which a plurality of primary rebars extends, over the plurality of primary rebars and a plurality of secondary rebars intersecting the plurality of primary rebars and an operation of tying the plurality of primary rebars and the plurality of secondary rebars at points where the plurality of primary rebars and the plurality of secondary rebars intersect. The rebar tying robot may comprise a rebar tying unit, a conveying unit configured to convey the rebar tying unit, and a control unit configured to control an operation of the conveying unit. The conveying unit may comprise a longitudinal movement mechanism configured to move the rebar tying robot in a front-rear direction and a first three-dimensional distance sensor configured to output first point cloud data which represents a three-dimensional position of an object in a first field of view by point clouds. The control unit may be configured to execute a first rebar extraction process in which the control unit extracts, from the point clouds included in the first point cloud data, point clouds whose positions in an up-down direction are within a predetermined rebar depth range and an intersection location identification process in which the control unit identifies a position where the primary rebar and the secondary rebar intersect based on the point clouds extracted in the first rebar extraction process.

In one or more embodiments, the intersection location identification process may include a primary rebar model generation process in which the control unit generates a primary rebar model in which the primary rebar is modeled by a linear line, a primary rebar exclusion process in which the control unit further extracts, from the point clouds extracted in the first rebar extraction process, point clouds that are not included in an area at or in a vicinity of the primary rebar model, and an intersection location calculation process in which the control unit calculates a position where the primary rebar and the secondary rebar intersect based on the point clouds extracted in the primary rebar exclusion process and the primary rebar model.

According to the above configuration, the position where the primary rebar and the secondary rebar intersect is calculated based on the primary rebar model and the point clouds from which the point clouds corresponding to the primary rebars are excluded and only the point clouds corresponding to the secondary rebars are included, thus the position where the primary rebar and the secondary rebar intersect can more accurately be identified. The area at or in the vicinity of the primary rebar model hereof refers for example to an area within which a distance from a linear line represented by the primary rebar model is within a predetermined value (such as within 1.5 or 1 times a diameter of the primary rebar).

In one or more embodiments, the intersection location calculation process may include an average value calculation process in which the control unit calculates an average value of positions in the front-rear direction of the point clouds extracted in the primary rebar exclusion process and an average value application process in which the control unit applies the average value calculated in the average value calculation process to the primary rebar model.

According to the above configuration, the position where the primary rebar and the secondary rebar intersect can be calculated without applying large processing load on the control unit.

In one or more embodiments, the conveying unit may further comprise a second three-dimensional distance sensor configured to output second point cloud data which represents a three-dimensional position of an object in a second field of view by point clouds, the second field of view being frontward of the first field of view and a third three-dimensional distance sensor configured to output third point cloud data which represents a three-dimensional position of an object in a third field of view by point clouds, the third field of view being rearward of the first field of view. The control unit may be configured to execute a second rebar extraction process in which the control unit extracts, from the point clouds included in the second point cloud data, point clouds whose positions in an up-down direction are within the rebar depth range and a third rebar extraction process in which the control unit extracts, from the point clouds included in the third point cloud data, point clouds whose positions in an up-down direction are within the rebar depth range. In the primary rebar model generation process, the primary rebar model may be generated based on the point clouds extracted in the second rebar extraction process and the point clouds extracted in the third rebar extraction process.

According to the above configuration, the primary rebar model is generated using the point clouds included in the second point cloud data obtained by the second three-dimensional distance sensor and the point clouds included in the third point cloud data obtained by the third three-dimensional distance sensor, thus a more accurate primary rebar model can be generated.

In one or more embodiments, the second three-dimensional distance sensor and the third three-dimensional distance sensor may be directed downward.

According to the above configuration, it is possible to simplify a process of converting a three-dimensional position of an object with the second three-dimensional distance sensor or the third three-dimensional distance sensor as the reference into a three-dimensional position with the rebar tying robot as the reference.

In one or more embodiments, the control unit may be configured to further execute a cluster extraction process in which the control unit further extracts, from the point clouds extracted in the first rebar extraction process, point clouds included in a largest cluster. The intersection location identification process may be based on the point clouds extracted in the cluster extraction process.

The point clouds included in the first point cloud data obtained by the first three-dimensional distance sensor may in some cases include point clouds corresponding to an object other than the primary rebars and the secondary rebars among the point clouds whose positions in the up-down direction are substantially the same as the primary rebars and the secondary rebars. In the point clouds included in the first point cloud data obtained by the first three-dimensional distance sensor, point clouds corresponding to the primary rebars and the secondary rebars constitute clusters, thus by extracting only the point clouds included in the largest cluster, point clouds corresponding to the object other than the primary rebars and the secondary rebars can be excluded. According to the above configuration, the point clouds corresponding to the primary rebars and the secondary rebars can more accurately be extracted.

In one or more embodiments, the first three-dimensional distance sensor may be offset from a center of the rebar tying robot in a left-right direction to one side in the left-right direction and be directed diagonally downward toward the other side in the left-right direction.

The first three-dimensional distance sensor needs to include the point where the primary rebar and the secondary rebar intersect in its field of view. As such, if the first three-dimensional distance sensor is directed downward, the first three-dimensional distance sensor could interfere with the rebar tying unit performing the tying operation or the rebar tying unit could enter into the field of view of the first three-dimensional distance sensor. According to the above configuration, since the first three-dimensional distance sensor is offset to one side in the left-right direction from the center in the left-right direction, the first three-dimensional distance sensor can be suppressed from interfering with the rebar tying unit performing the tying operation and the rebar tying unit can be suppressed from entering into the field of view of the first three-dimensional distance sensor. Further, according to the above configuration, since the first three-dimensional distance sensor which is offset to one side in the left-right direction is directed diagonally downward toward the other side in the left-right direction, it can be ensured that the point where the primary rebar and the secondary rebar intersect is included in the field of view of the first three-dimensional distance sensor.

Embodiment

As shown in FIG. 1, a rebar tying robot 100 of the present embodiment comprises a rebar tying machine 2, a power supply unit 102, an operation unit 104, and a conveying unit 106. The rebar tying robot 100 is a robot configured to move over a plurality of primary rebars R1 arranged parallel to each other along a horizontal direction and a plurality of secondary rebars R2 arranged parallel to each other along the horizontal direction and tie the primary rebars R1 and the secondary rebars R2 at points where the primary rebars R1 and the secondary rebars R2 intersect by using the rebar tying machine 2. When the primary rebars R1 and the secondary rebars R2 are viewed from above, a direction along which the secondary rebars R2 extend intersects perpendicularly to a direction along which the primary rebars R1 extend. Further, the secondary rebars R2 are arranged on top of the primary rebars R1. The primary rebars R1 are arranged at an interval of 100 mm to 300 mm and the secondary rebars R2 are arranged at an interval of 100 mm to 300 mm, for example. The rebar tying robot 100 has a dimension of about 900 mm in a front-rear direction and a dimension of about 600 mm in a left-right direction, for example.

(Configuration of Rebar Tying Machine 2)

Hereinbelow, a configuration of the rebar tying machine 2 will be described with reference to FIGS. 2 to 5. It is hereby noted that a front-rear direction, a left-right direction, and an up-down direction in the explanation of FIGS. 2 to 5 are not a front-rear direction, a left-right direction, and an up-down direction with the rebar tying robot 100 as the reference, but are a front-rear direction, a left-right direction, and an up-down direction with the rebar tying machine 2 as the reference.

Figure 2:
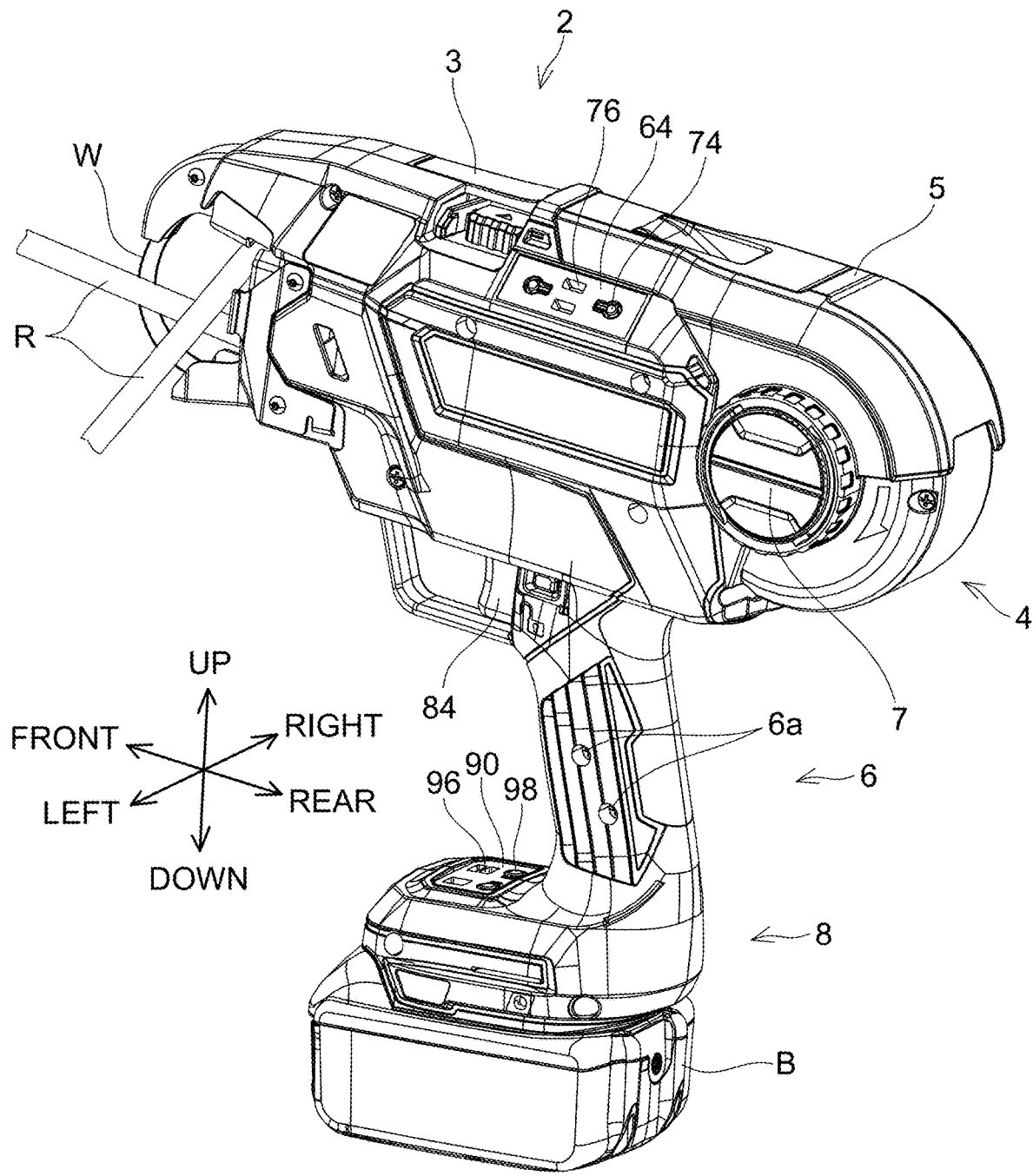
FIG. 2 is a perspective view of a rebar tying machine 2 used in the rebar tying robot 100 of the embodiment viewed from the rear left upper side.

As shown in FIG. 2, the rebar tying machine 2 is a power tool for tying rebars R intersecting each other (such as a primary rebar R1 and a second rebar R2) by a wire W. The rebar tying machine 2 can be detached from the rebar tying robot 100 and used by a user as a handheld tool and can also be used by attaching it to the rebar tying robot 100. The rebar tying machine 2 comprises a housing 3. The housing 3 includes a body 4, a grip 6 arranged below the body 4, and a battery receptacle 8 arranged below the grip 6. A battery pack B may be attached to a lower portion of the battery receptacle 8 as shown in FIG. 2, or a battery adapter 108 may be attached thereto as shown in FIG. 1. The battery pack B includes secondary battery cells (not shown) such as lithium-ion battery cells, and is configured to be charged by a charger (not shown). The body 4, the grip 6, and the battery receptacle 8 are integrally configured.

Figure 3:
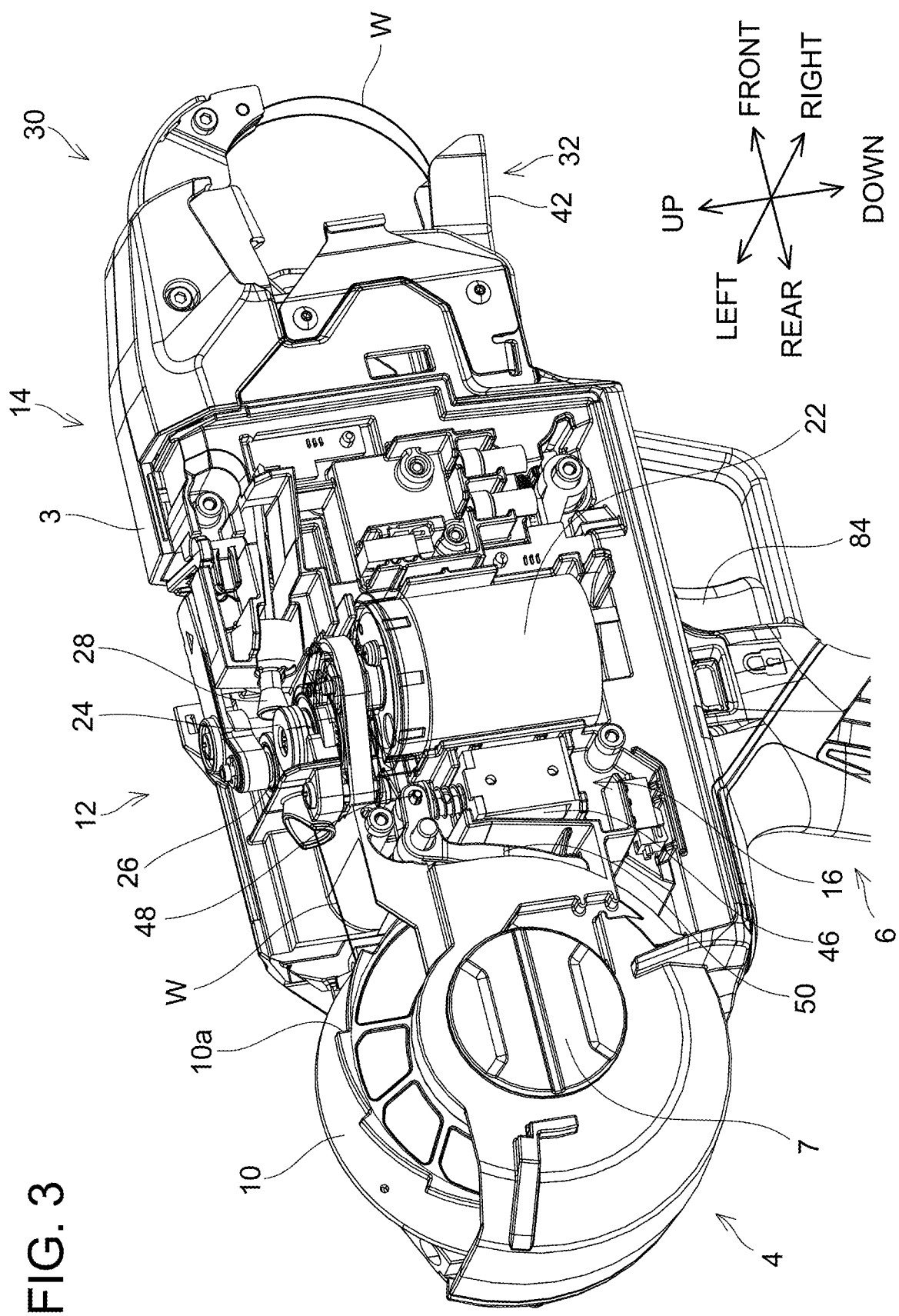
FIG. 3 is a perspective view of an internal structure of a body 4 of the rebar tying machine 2 used in the rebar tying robot 100 of the embodiment viewed from the rear right upper side.

As shown in FIG. 3, a reel 10 on which the wire W is wound is detachably housed in a rear upper portion of the body 4. As shown in FIG. 2, the housing 3 includes a reel cover 5 having a shape that covers an upper portion of the reel 10. The reel cover 5 is rotatably retained by cover retainers 7 arranged at rear left and right sides of the body 4. The reel cover 5 is configured to open and close by rotating with respect to the body 4

Figure 4:
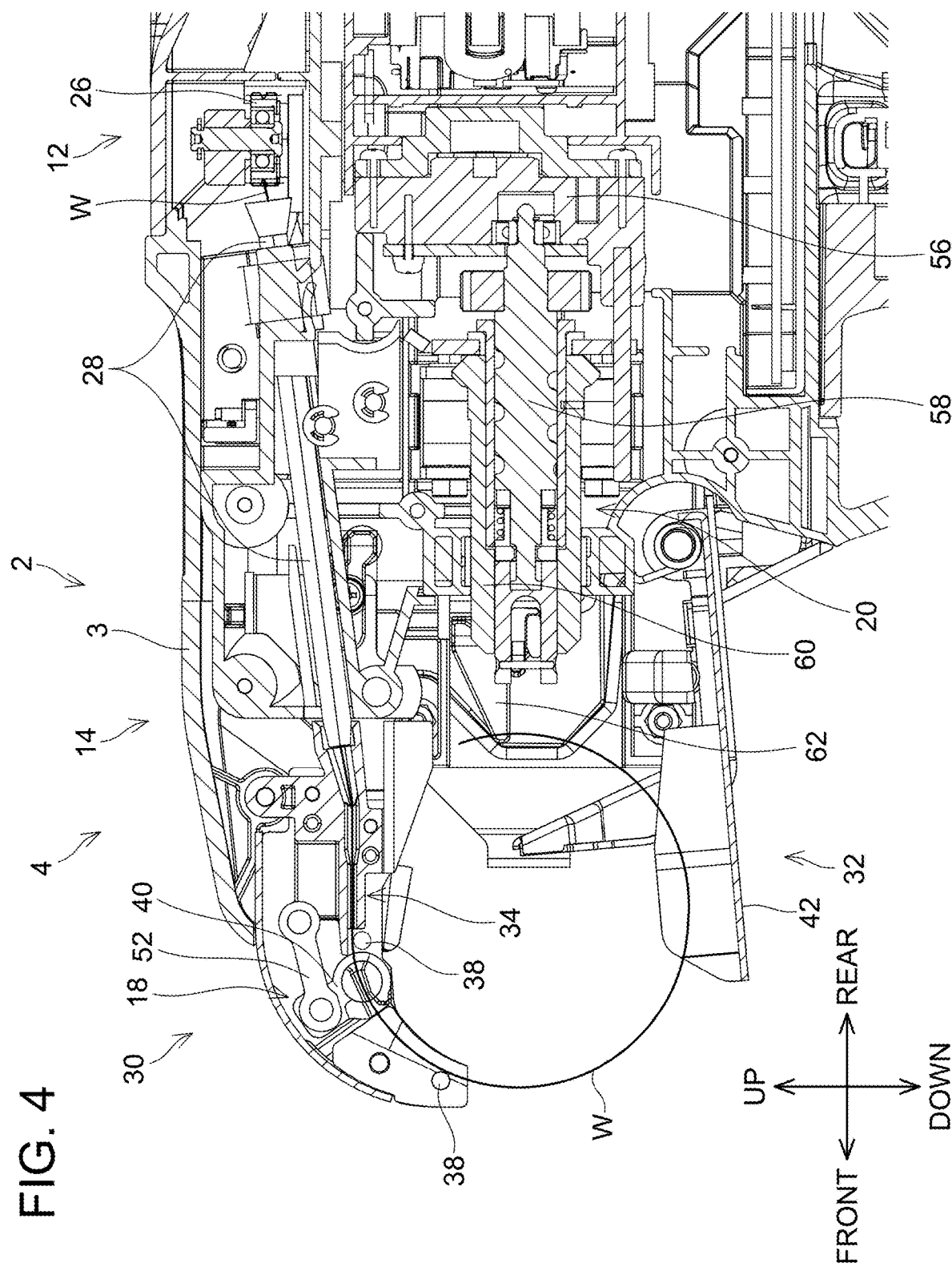
FIG. 4 is a cross-sectional view of a front part of the body 4 of the rebar tying machine 2 used in the rebar tying robot 100 of the embodiment.
Figure 5:
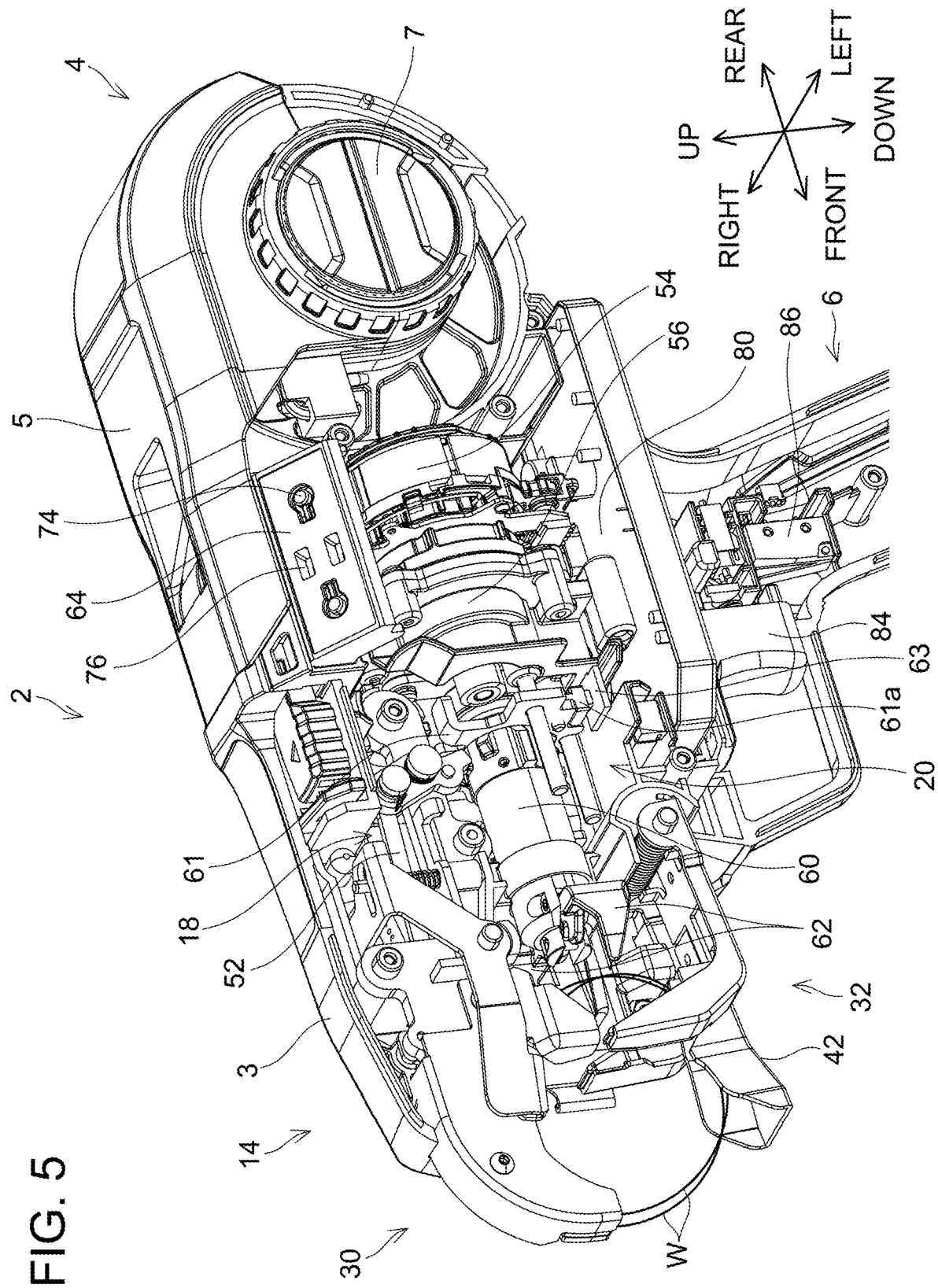
FIG. 5 is a perspective view of internal structures of the body 4 and an upper portion of a grip 6 of the rebar tying machine 2 used in the rebar tying robot 100 of the embodiment viewed from the front left upper side.

As shown in FIGS. 3 to 5, the rebar tying machine 2 comprises a feeder mechanism 12, a guide mechanism 14, a brake mechanism 16, a cutter mechanism 18, a twister mechanism 20, and a controller 80.

As shown in FIG. 3, the feeder mechanism 12 is configured to feed out the wire W supplied from the reel 10 to the guide mechanism 14 located in a front part of the body 4. The feeder mechanism 12 includes a feed motor 22, a driving roller 24, and a driven roller 26. The wire W is to be held between the driving roller 24 and the driven roller 26. The feed motor 22 may for example be a DC brush motor. An operation of the feed motor 22 is controlled by the controller 80. The feed motor 22 is configured to rotate the driving roller 24. When the feed motor 22 rotates the driving roller 24, the driven roller 26 rotates in a reverse direction and the wire W held by the driving roller 24 and the driven roller 26 is thereby fed out toward the guide mechanism 14, and the wire W is drawn out from the reel 10.

As shown in FIG. 4, the guide mechanism 14 is configured to guide the wire W fed out from the feeder mechanism 12 around the rebars R in a loop shape. The guide mechanism 14 includes a guide pipe 28, an upper curl guide 30, and a lower curl guide 32. The rear end of the guide pipe 28 opens into a space between the driving roller 24 and the driven roller 26. The wire W fed out from the feeder mechanism 12 is fed into the guide pipe 28. The front end of the guide pipe 28 opens into the upper curl guide 30. The upper curl guide 30 includes therein a first guiding passage 34 for guiding the wire W fed from the guide pipe 28 and a second guiding passage (not shown) for guiding the wire W fed from the lower curl guide 32.

As shown in FIG. 4, the first guiding passage 34 includes a plurality of guide pins 38 configured to guide the wire W such that they give a downward curl to the wire W and a cutter 40 that constitutes a part of the cutter mechanism 18 to be described later. The wire W fed from the guide pipe 28 is guided by the guide pins 38 in the first guiding passage 34, passes through the cutter 40, and is fed out toward the lower curl guide 32 from the front end of the upper curl guide 30.

As shown in FIG. 5, the lower curl guide 32 includes a feed-returning plate 42. The feed-returning plate 42 is configured to guide the wire W fed out from the front end of the upper curl guide 30 to return the wire W to the rear end of the second guiding passage of the upper curl guide 30.

The second guiding passage of the upper curl guide 30 is arranged adjacent to the first guiding passage 34. The second guiding passage is configured to guide the wire W fed from the lower curl guide 32 and feed it out from the front end of the upper curl guide 30 toward the lower curl guide 32.

The wire W fed out from the feeder mechanism 12 is wound in the loop shape around the rebars R by the upper curl guide 30 and the lower curl guide 32. The number of turns of the wire W around the rebars R can be preset by the user. When the feeder mechanism 12 feeds out the wire W by a feed amount corresponding to the set number of turns, it stops the feed motor 22 and thus stops feeding out the wire W.

The brake mechanism 16 shown in FIG. 3 is configured to stop rotation of the reel 10 in conjunction with the feeder mechanism 12 stopping feeding out the wire W. The brake mechanism 16 includes a solenoid 46, a link 48, and a brake arm 50. An operation of the solenoid 46 is controlled by the controller 80. The reel 10 includes engagement portions 10a arranged along its radial direction at a predetermined angular interval and each engagement portion 10a is configured to engage with the brake arm 50. With the solenoid 46 not electrically actuated, the brake arm 50 is separated from the engagement portions 10a of the reel 10. With the solenoid 46 electrically actuated, the brake arm 50 is driven via the link 48, and the brake arm 50 engages with the engagement portions 10a of the reel 10. When the feeder mechanism 12 is to feed out the wire W, the controller 80 maintains the brake arm 50 separated from the engagement portions 10a of the reel 10 by not electrically actuating the solenoid 46. Due to this, the reel 10 can rotate freely, and the feeder mechanism 12 can draw out the wire W from the reel 10. Further, when the feeder mechanism 12 stops feeding out the wire W, the controller 80 electrically actuates the solenoid 46 and causes the brake arm 50 to engage with the engagement portions 10a of the reel 10. As a result, rotation of the reel 10 is prohibited. Due to this, the wire W can be prevented from sagging between the reel 10 and the feeder mechanism 12, which would be caused by the reel 10 continuing to rotate by inertia even after the feeder mechanism 12 has stopped feeding out the wire W.

The cutter mechanism 18 shown in FIGS. 4 and 5 is configured to cut the wire W with the wire W wrapped around the rebars R. The cutter mechanism 18 includes the cutter 40 and a link 52. The link 52 is configured to cooperate with the twister mechanism 20 to be described later and rotates the cutter 40. The wire W passing through the cutter 40 is cut by rotation of the cutter 40.

The twister mechanism 20 shown in FIG. 5 is configured to tie the rebars R with the wire W by twisting the wire W wrapped around the rebars R. The twister mechanism 20 includes a twisting motor 54, a reduction gear mechanism 56, a screw shaft 58 (see FIG. 4), a sleeve 60, a push plate 61, and a pair of hooks 62.

The twisting motor 54 may for example be a DC brushless motor. An operation of the twisting motor 54 is controlled by the controller 80. Rotation of the twisting motor 54 is transmitted to the screw shaft 58 through the reduction gear mechanism 56. The twisting motor 54 is configured to rotate in a forward direction and in a reverse direction, in response to which the screw shaft 58 is also configured to rotate in a forward direction and a reverse direction. The sleeve 60 is arranged to surround a periphery of the screw shaft 58. In the state in which rotation of the sleeve 60 is prohibited, the sleeve 60 moves forward when the screw shaft 58 rotates in the forward direction, and the sleeve 60 moves rearward when the screw shaft 58 rotates in the reverse direction. The push plate 61 is configured to move integrally with the sleeve 60 in the front-rear direction in response to movement of the sleeve 60 in the front-rear direction. Further, when the screw shaft 58 rotates in the state in which the rotation of the sleeve 60 is permitted, the sleeve 60 rotates together with the screw shaft 58.

When the sleeve 60 advances to a predetermined position from its initial position, the push plate 61 drives the link 52 of the cutter mechanism 18 and rotates the cutter 40. The pair of hooks 62 is arranged at the front end of the sleeve 60, and is configured to open and close according to the position of the sleeve 60 in the front-rear direction. When the sleeve 60 moves forward, the pair of hooks 62 closes and grasps the wire W. After this, when the sleeve 60 moves rearward, the pair of hooks 62 opens and releases the wire W.

The controller 80 rotates the twisting motor 54 with the wire W wrapped around the rebars R. At this occasion, the rotation of the sleeve 60 is prohibited, and the sleeve 60 moves forward by the rotation of the screw shaft 58 and also the push plate 61 and the pair of hooks 62 thereby move forward, by which the pair of hooks 62 closes and grasps the wire W. Then, when the rotation of the sleeve 60 is permitted, the sleeve 60 rotates by the rotation of the screw shaft 58, and along with this the pair of hooks 62 rotates. Due to this, the wire W is twisted and the rebars R are thereby tied.

When twisting of the wire W is completed, the controller 80 rotates the twisting motor 54 in a reverse direction. At this occasion, the rotation of the sleeve 60 is prohibited, and after the pair of hooks 62 opens and the wire W is thereby released, the sleeve 60 moves rearward by the rotation of the screw shaft 58, and along with this the push plate 61 and the pair of hooks 62 also move rearward. Due to the sleeve 60 moving rearward, the push plate 61 drives the link 52 of the cutter mechanism 18, which returns the cutter 40 to its initial posture. After this, when the sleeve 60 moves back to the initial position, the rotation of the sleeve 60 is permitted, by which the sleeve 60 and the pair of hooks 62 rotate by the rotation of the screw shaft 58 and return to the initial angle.

As shown in FIG. 2, a first operation section 64 is arranged at an upper portion of the body 4. The first operation section 64 includes a main switch 74 configured to switch on/off of main power, a main power LED 76 that indicates an on/off state of the main power, and the like. The first operation section 64 is connected to the controller 80.

A second operation section 90 is arranged on a front upper surface of the battery receptacle 8. The user can set the number of turns of the wire W to be wrapped around the rebars R, a torque threshold for twisting the wire W, and the like through the second operation section 90. The second operation section 90 includes setting switches 98 for setting the number of turns of the wire W to be wrapped around the rebars R and the torque threshold for twisting the wire W, display LEDs 96 for displaying current settings, and the like. The second operation section 90 is connected to the controller 80.

As shown in FIGS. 2 to 5, with the rebar tying machine 2 detached from the rebar tying robot 100, the user uses the rebar tying machine 2 while holding the grip 6. A trigger 84 which can be pulled by the user is arranged at a front upper portion of the grip 6. As shown in FIG. 5, a trigger switch 86 configured to detect on/off of the trigger 84 is arranged inside the grip 6. The trigger switch 86 is connected to the controller 80. When the user pulls the trigger 84 and the trigger switch 86 thereby turns on, the rebar tying machine 2 performs a series of operations of wrapping the wire W around the rebars R by the feeder mechanism 12, the guide mechanism 14, and the brake mechanism 16, cutting the wire W and twisting the wire W wrapped on the rebars R by the cutter mechanism 18 and the twister mechanism 20.

(Configuration of Power Supply Unit 102)

As shown in FIG. 1, the power supply unit 102 is supported by the conveying unit 106. The power supply unit 102 includes a housing 110 and a cover 112. A control unit 126 is housed in the housing 110. The control unit 126 is configured to control operations of the power supply unit 102, the operation unit 104, and the conveying unit 106.

Figure 6:
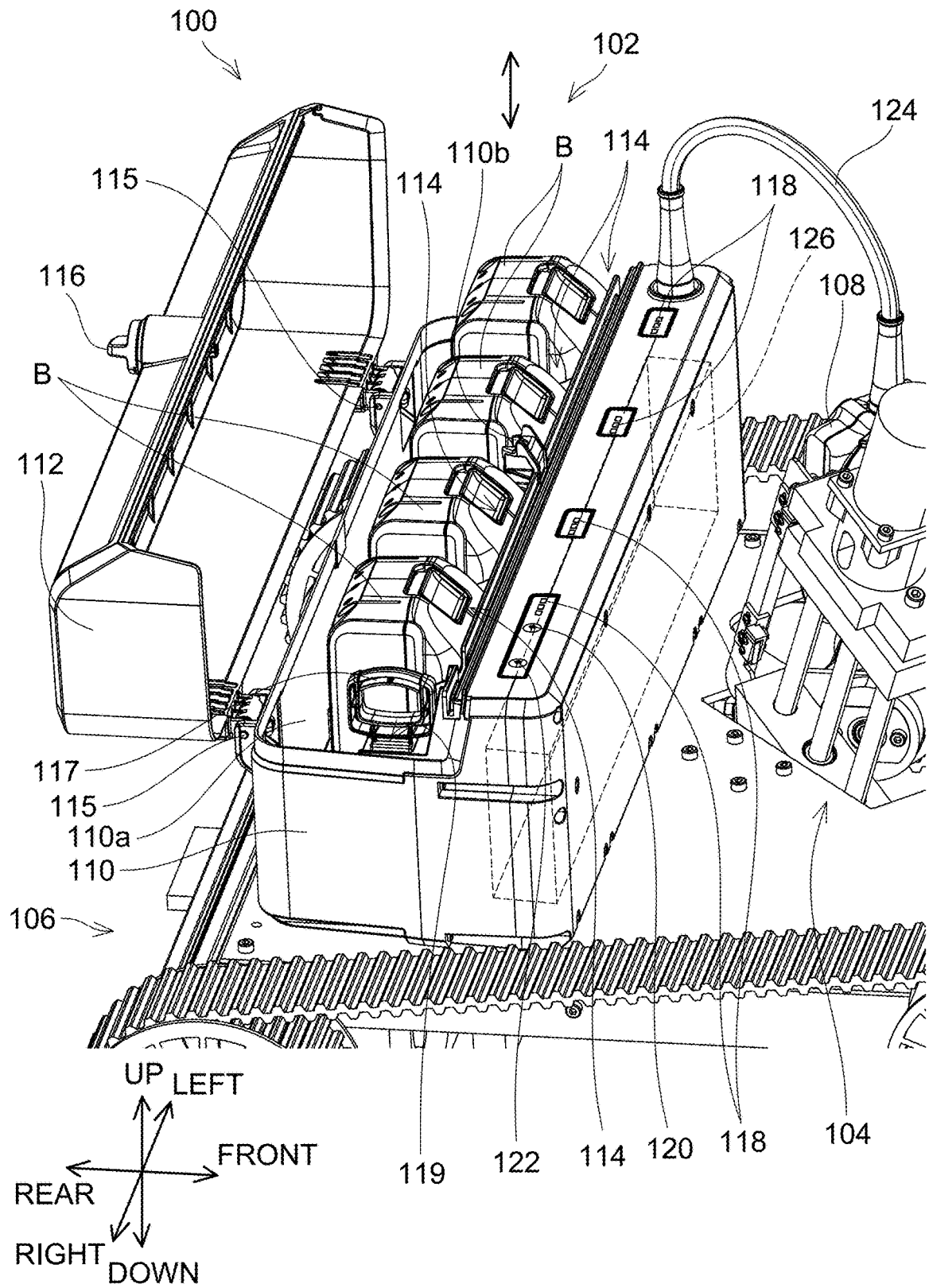
FIG. 6 is a perspective view of a power supply unit 102 of the rebar tying robot 100 of the embodiment viewed from the front right upper side in the state where a cover 112 is open.

As shown in FIG. 6, a battery housing chamber 110a is defined in the housing 110. The battery housing chamber 110a includes a plurality of battery receptacles 114. One of a plurality of battery packs B can be detachably attached to each of the plurality of battery receptacles 114. The cover 112 is attached to the housing 110 via hinges 115 arranged at rear portions of the housing 110 at the vicinity of the upper end of the battery housing chamber 110a. The cover 112 is configured to pivot about a pivot axis extending in the left-right direction relative to the housing 110. As shown in FIG. 6, with the cover 112 opened relative to the housing 110, the plurality of battery packs B can be detachably attached to the plurality of battery receptacles 114 by sliding in the up-down direction. As shown in FIG. 1, when the cover 112 is closed relative to the housing 110, peripheries of the plurality of battery packs B attached to the plurality of battery receptacles 114 are surrounded by the housing 110 and the cover 112. In this state, the plurality of battery packs B inside the battery housing chamber 110a can be prevented from getting wet even when the power supply unit 102 gets wet with water.

The cover 112 is biased by a torsion spring that is not shown in a closing direction relative to the housing 110. A latch member 116 which the user can operate is arranged on the cover 112. As shown in FIG. 6, a latch receiver 110b corresponding to the latch member 116 is arranged on the housing 110. When the user closes the cover 112 and pivots the latch member 116, the latch member 116 engages with the latch receiver 110b, by which the cover 112 is maintained in the closed state relative to the housing 110. From this state, when the user pivots the latch member 116 in a reverse direction, engagement between the latch member 116 and the latch receiver 110b is released, and the user can thereby open the cover 112 relative to the housing 110.

A plurality of remaining charge indicators 118, a remaining charge display button 120, and an operation execution button 122 are arranged on an upper surface of the housing 110 frontward of the battery housing chamber 110a. Each of the plurality of remaining charge indicators 118 is arranged corresponding to one of the plurality of battery receptacles 114, and is configured to display remaining charge in the battery pack B attached to its corresponding battery receptacle 114. The remaining charge display button 120 is a button for the user to switch on/off the display of the remaining charge by the plurality of remaining charge indicators 118. The operation execution button 122 is a button for the user to switch between executing and stopping of the operation of the rebar tying robot 100.

A power supply cable 124 is connected to the upper surface of the housing 110 frontward of the battery housing chamber 110a. The battery adapter 108 is connected to the power supply cable 124. With the battery adapter 108 attached to the rebar tying machine 2, power from the plurality of battery packs B is supplied to the rebar tying machine 2.

A key receptacle 119 to which a key 117 can be detachably attached is arranged in the battery housing chamber 110a. The key 117 can be attached or detached by being inserted into or withdrawn from the key receptacle 119. With the key 117 detached from the key receptacle 119, power supply from the plurality of battery packs B to the rebar tying machine 2, the operation unit 104, and the conveying unit 106 is cut off. With the key 117 attached to the key receptacle 119, the power supply from the plurality of battery packs B to the rebar tying machine 2, the operation unit 104, and the conveying unit 106 is permitted.

(Configuration of Operation Unit 104)

Figure 7:
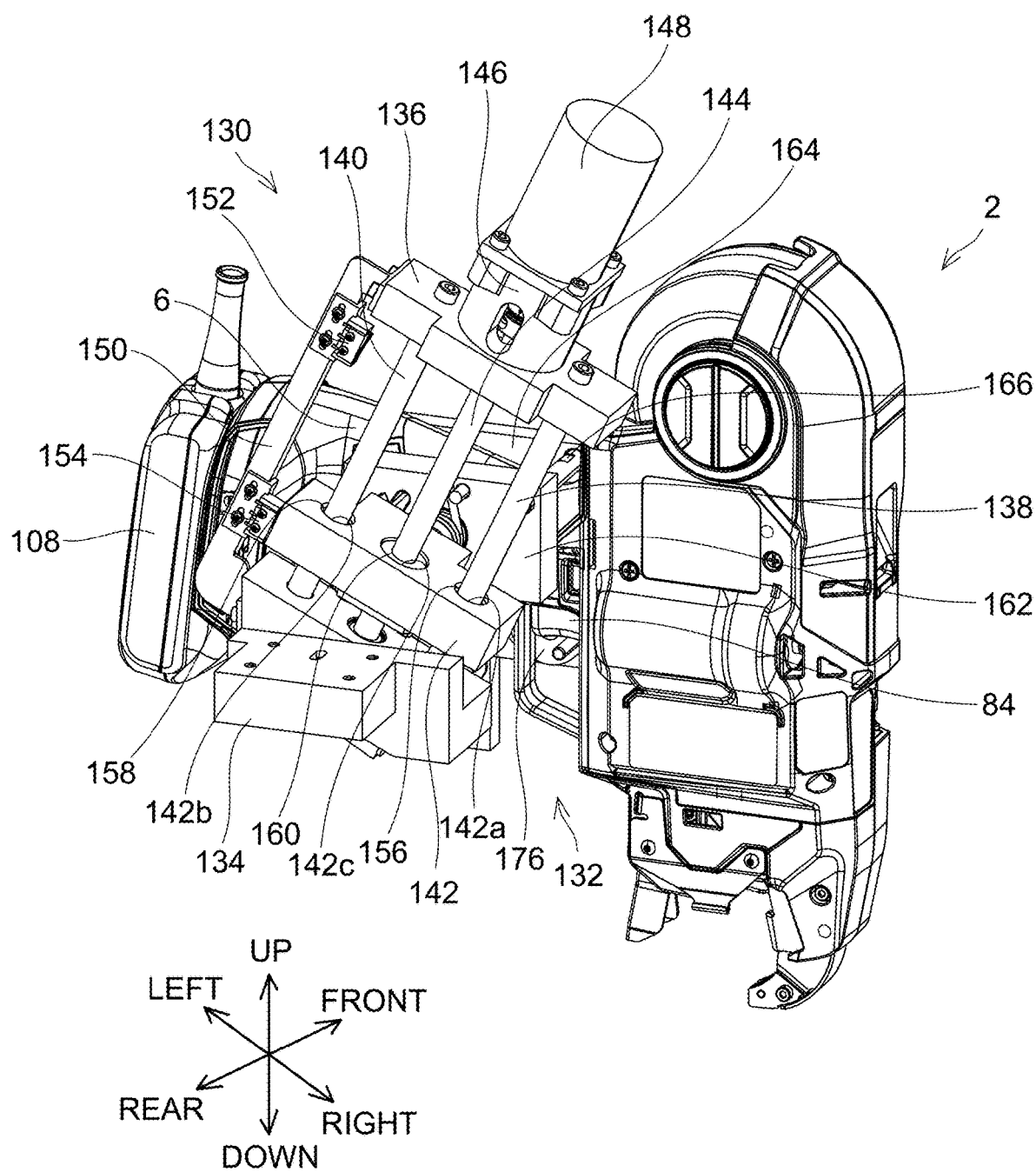
FIG. 7 is a perspective view of the rebar tying robot 100 of the embodiment in the state where the rebar tying machine 2 is attached to an operation unit 104 viewed from the rear right upper side.
Figure 8:
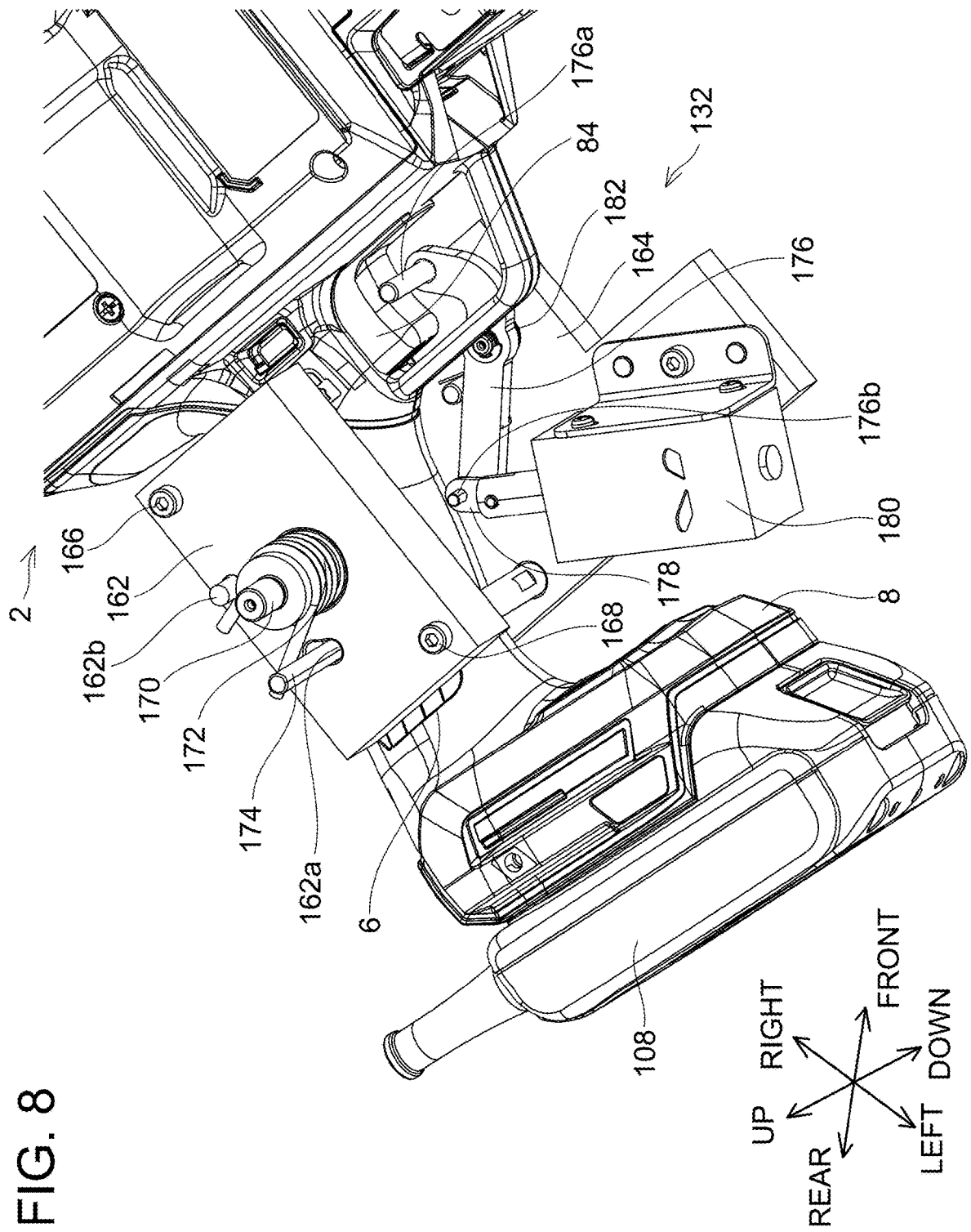
FIG. 8 is a perspective view of the rebar tying robot 100 of the embodiment in the state where the rebar tying machine 2 is attached to a grip mechanism 132 viewed from the rear right lower side.

As shown in FIGS. 7 and 8, the operation unit 104 includes a lift mechanism 130 and a grip mechanism 132.

As shown in FIG. 7, the lift mechanism 130 includes a lower base member 134, an upper base member 136, support pipes 138, 140, a lifter 142, a screw shaft 144, a motor connector 146, a lift motor 148, a sensor supporting member 150, an upper limit detection sensor 152, and a lower limit detection sensor 154. The lower base member 134 is supported by the conveying unit 106. The lower ends of the support pipes 138, 140 are fixed to the lower base member 134. The upper ends of the support pipes 138, 140 are fixed to the upper base member 136. The support pipes 138, 140 are arranged parallel to each other. The support pipes 138, 140 are arranged such that they are inclined in both the front-rear direction and the left-right direction with respect to the up-down direction of the rebar tying robot 100. Hereinbelow, a direction along which the support pipes 138, 140 extend may be termed a lifting direction. Through holes 142a, 142b through which the support pipes 138, 140 penetrate are defined in the lifter 142. Retaining members 156, 158 configured to slidably retain the support pipes 138, 140 are fixed to the through holes 142a, 142b. The retaining members 156, 158 may for example be linear bushes in which solid lubricant is embedded, linear ball bearings, or oilless bearings. The lifter 142 is arranged between the lower base member 134 and the upper base member 136 in the state in which each of the support pipes 138, 140 is slidably penetrating a corresponding one of the retaining members 156, 158. The screw shaft 144 is arranged between the support pipes 138, 140. The lower end of the screw shaft 144 is rotatably supported by the lower base member 134. The vicinity of the upper end of the screw shaft 144 is rotatably supported by the upper base member 136. The screw shaft 144 is arranged parallel to the support pipes 138, 140. An external thread is defined on an outer surface of the screw shaft 144 at a portion between the lower base member 134 and the upper base member 136. The lifter 142 includes a through hole 142c through which the screw shaft 144 penetrates. A nut 160 is fixed to the through hole 142c. An internal thread corresponding to the external thread of the screw shaft 144 is defined on the nut 160. The screw shaft 144 penetrates the lifter 142 with its external thread screw-fitted with the internal thread of the nut 160. The upper end of the screw shaft 144 is coupled to the lift motor 148 via the motor connector 146. The lift motor 148 may for example be a DC brush motor. When the lift motor 148 rotates in a forward direction, the lifter 142 is lowered in a direction from the upper base member 136 toward the lower base member 134 by rotation of the screw shaft 144. On the other hand, when the lift motor 148 rotates in a reverse direction, the lifter 142 is lifted in a direction from the lower base member 134 toward the upper base member 136 by rotation of the screw shaft 144. The sensor supporting member 150 has its lower end fixed to the lower base member 134 and its upper end fixed to the upper base member 136. Each of the upper limit detection sensor 152 and the lower limit detection sensor 154 is fixed to the sensor supporting member 150. The upper limit detection sensor 152 is normally off, and turns on by contacting the lifter 142 when the lifter 142 reaches an upper limit position. The lower limit detection sensor 154 is normally off, and turns on by contacting the lifter 142 when the lifter 142 reaches a lower limit position. When the rebar tying machine 2 is to be lowered, the control unit 126 of the rebar tying robot 100 rotates the lift motor 148 in the forward direction, and stops the lift motor 148 when the lower limit detection sensor 154 turns on. The control unit 126 also stops the lift motor 148 in the case in which the rebar tying machine 2 collides with the primary rebars R1, the secondary rebars R2, or other obstacles when the rebar tying machine 2 is lowered and a load applied to the lift motor 148 thereby increases abruptly. The load applied to the lift motor 148 may be identified for example from a current value of the lift motor 148. When the rebar tying machine 2 is to be lifted, the control unit 126 rotates the lift motor 148 in the reverse direction and stops the lift motor 148 when the upper limit detection sensor 152 turns on.

Figure 9:
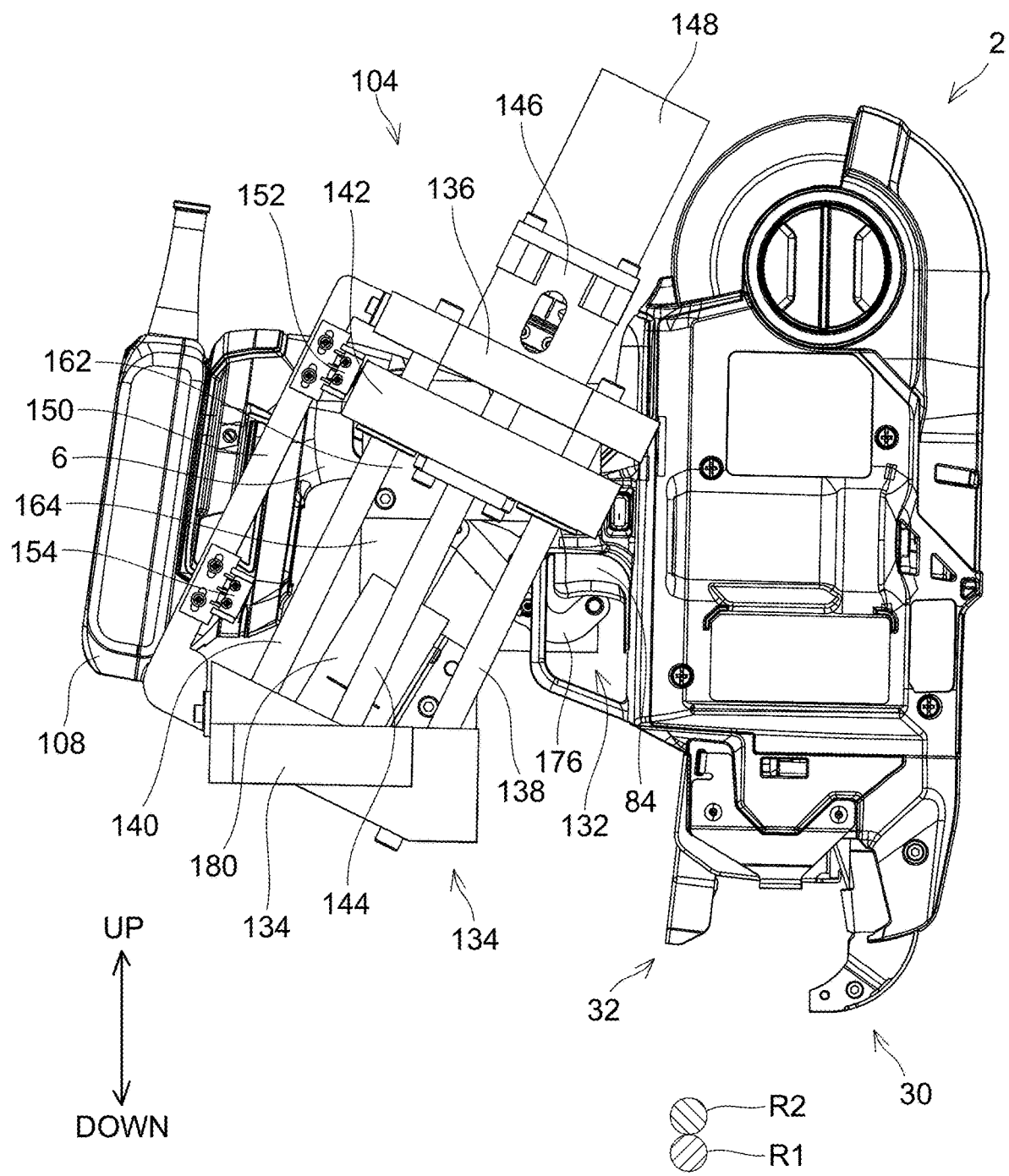
FIG. 9 is a side view of the operation unit 104 and the rebar tying machine 2 in the state where the rebar tying machine 2 is lifted in the rebar tying robot 100 of the embodiment.
Figure 10:
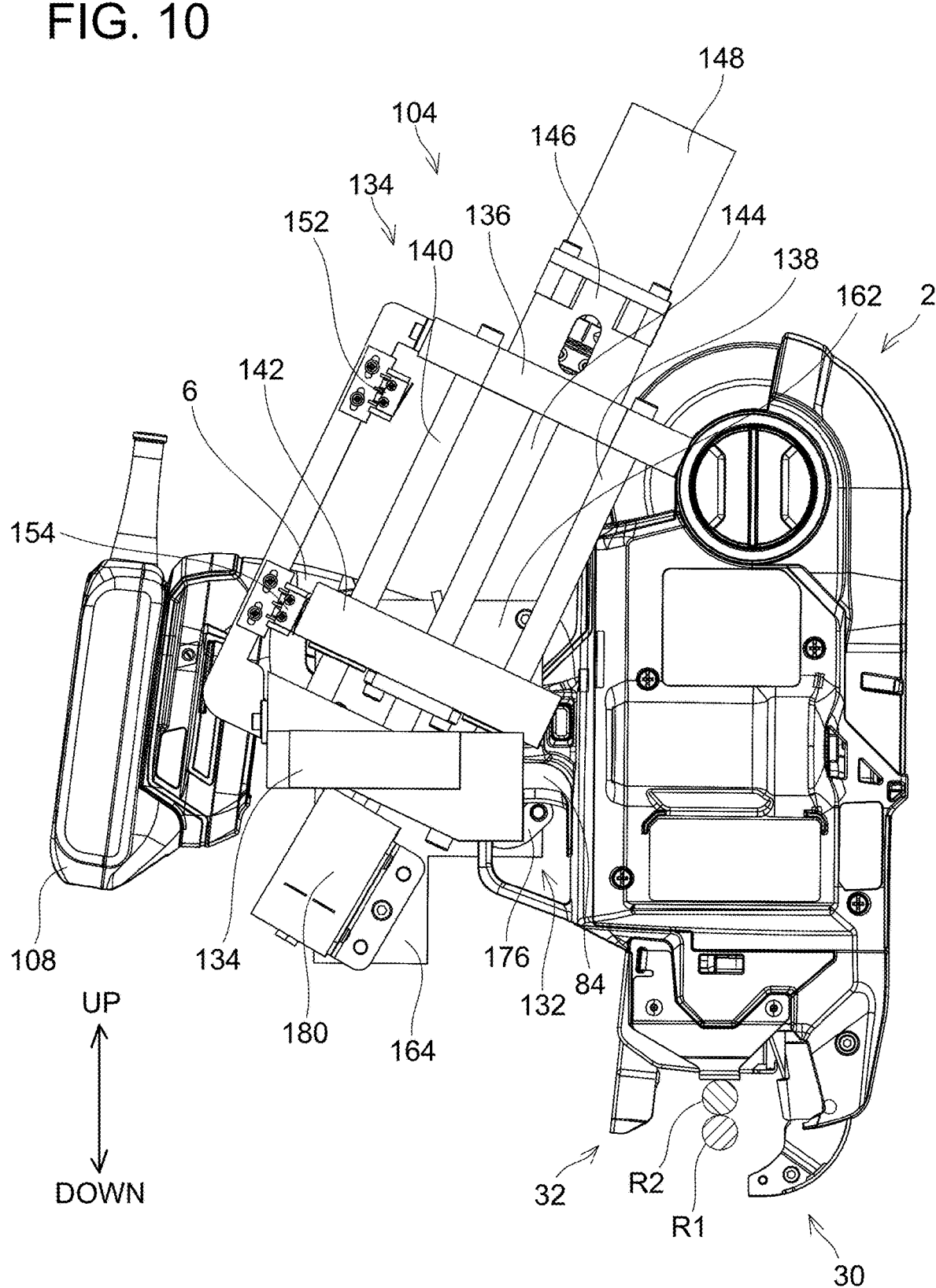
FIG. 10 is a side view of the operation unit 104 and the rebar tying machine 2 in the state where the rebar tying machine 2 is lowered in the rebar tying robot 100 of the embodiment.

As shown in FIGS. 9 and 10, in the rebar tying robot 100 of the present embodiment, when the rebar tying machine 2 is lowered, the primary rebar R1 and the second rebar R2 become closer to the rebar tying machine 2 at positions closer to the lower curl guide 32 than to the upper curl guide 30. Due to this, in lowering the rebar tying machine 2, the primary rebar R1 and the second rebar R2 can be suppressed from colliding with the upper curl guide 30. Further, in the rebar tying robot 100 of the present embodiment, when the rebar tying machine 2 is lifted, the primary rebar R1 and the second rebar R2 become distant from the rebar tying machine 2 toward positions closer to the lower curl guide 32 than to the upper curl guide 30. Due to this, in lifting the rebar tying machine 2, the primary rebar R1 and the second rebar R2 can be suppressed from being caught on the upper curl guide 30.

As shown in FIG. 8, the grip mechanism 132 includes a first support plate 162, a second support plate 164, coupling shafts 166, 168, a pivot pin 170, a torsion spring 172, a support pin 174, a link 176, a plunger 178, an actuator 180, and a torsion spring 182. The first support plate 162 is arranged facing one outer surface of the grip 6 of the rebar tying machine 2 (such as a right outer surface as viewed from the rebar tying machine 2). The second support plate 164 is arranged facing the other outer surface of the grip 6 of the rebar tying machine 2 (such as a left outer surface as viewed from the rebar tying machine 2). The first support plate 162 and the second support plate 164 are fixed to each other via the coupling shafts 166, 168 while holding the grip 6 of the rebar tying machine 2 between them. A surface of the first support plate 162 facing the grip 6 and a surface of the second support plate 164 facing the grip 6 each have a plurality of protrusions (not shown) defined thereon that is to fit with a plurality of recesses 6a (see FIG. 2) defined on a corresponding outer surface of the grip 6 of the rebar tying machine 2. Due to this, a position of the grip 6 of the rebar tying machine 2 is fixed relative to the first support plate 162 and the second support plate 164.

The first support plate 162 is coupled to the lifter 142 of the lift mechanism 130 via the pivot pin 170. One end of the pivot pin 170 is fixed to the lifter 142. The other end of the pivot pin 170 is pivotably supported by the first support plate 162. Due to this, the rebar tying machine 2 supported by the first support plate 162 and the second support plate 164 can be lifted or lowered according to lifting or lowering motion of the lifter 142 and can pivot about the pivot pin 170 relative to the lifter 142. The support pin 174 is fixed to the lifter 142 and extends from the lifter 142 toward the first support plate 162. The first support plate 162 includes a long hole 162a through which the support pin 174 is to be inserted and a protrusion 162b protruding toward the lifter 142. The long hole 162a defines a pivoting range for the rebar tying machine 2 to pivot about the pivot pin 170. The torsion spring 172 is arranged outside the pivot pin 170 and biases the protrusion 162b relative to the support pin 174 in a direction along which the protrusion 162b separates away from the support pin 174 (that is, biases the first support plate 162 relative to the lifter 142). If the rebar tying machine 2 is configured such that it cannot pivot relative to the lifter 142, a large impact acts on the operation unit 104 when an obstacle collides with the rebar tying machine 2. By configuring the rebar tying machine 2 as above to be pivotable relative to the lifter 142, such a large impact can be suppressed from acting on the operation unit 104 when the rebar tying machine 2 collides with an obstacle.

The link 176 is supported by the second support plate 164. The link 176 is pivotable relative to the second support plate 164 about a pivot axis extending along the left-right direction. The link 176 includes a presser portion 176a and an operation portion 176b. The presser portion 176a is arranged facing the trigger 84 of the rebar tying machine 2. The operation portion 176b is coupled to the actuator 180 via the plunger 178. The actuator 180 may for example be a solenoid. An operation of the actuator 180 is controlled by the control unit 126 of the rebar tying robot 100. The torsion spring 182 biases the link 176 relative to the second support plate 164 in a direction along which the presser portion 176a separates away from the trigger 84. When the actuator 180 is off, the presser portion 176a is separated away from the trigger 84 by a biasing force of the torsion spring 182. When the actuator 180 turns on, the link 176 pivots in a direction by which the operation portion 176b approaches toward the actuator 180, and the presser portion 176a thereby presses the trigger 84. Due to this, the operation of pulling the trigger 84 of the rebar tying machine 2 is carried out.

(Configuration of Conveying Unit 106)

Figure 11:
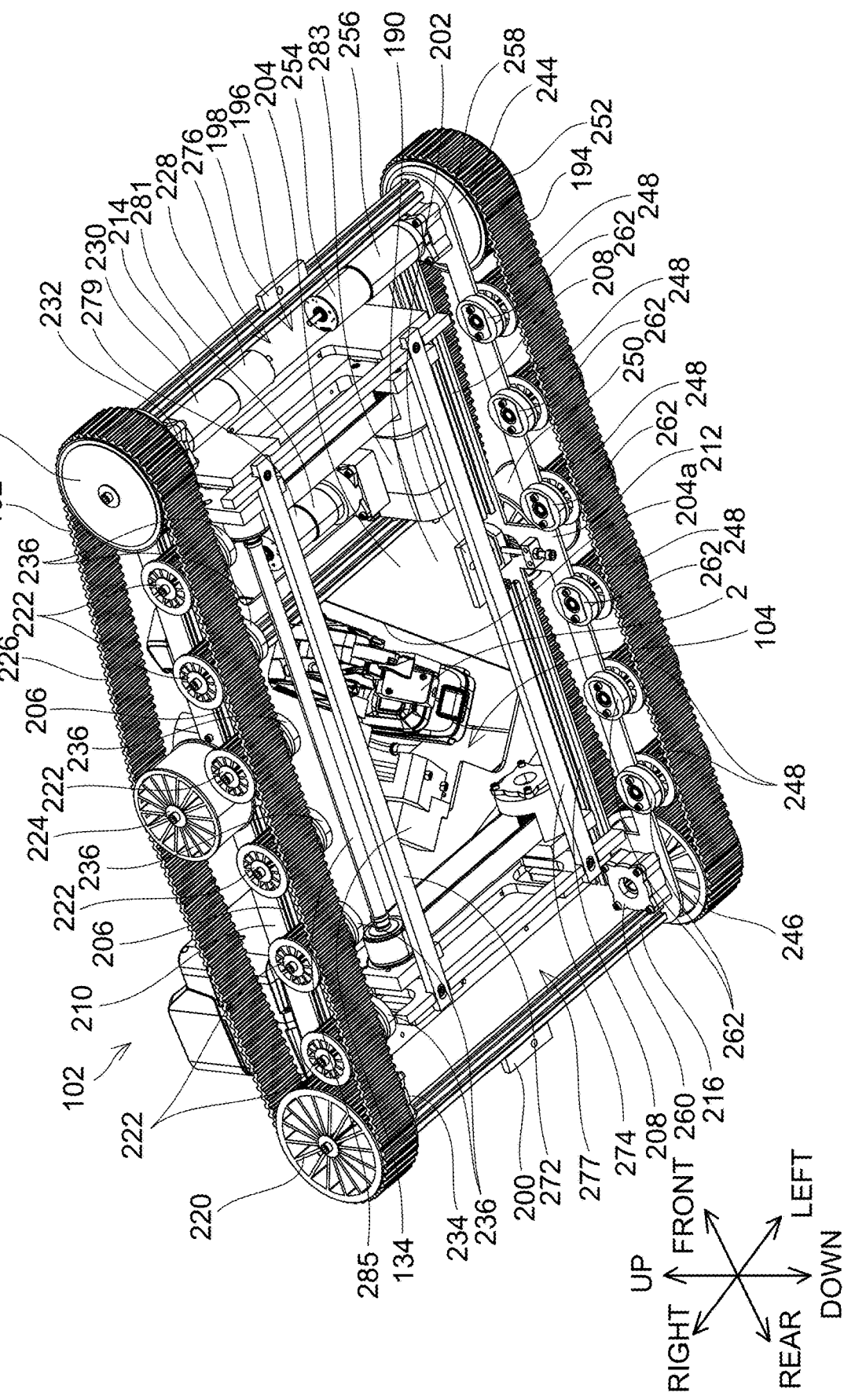
FIG. 11 is a perspective view of the rebar tying robot 100 of the embodiment viewed from the front right lower side.

As shown in FIG. 11, the conveying unit 106 includes a carrier 190, a right crawler 192, a left crawler 194, a side stepper 196, a front three-dimensional distance sensor 198, a rear three-dimensional distance sensor 200, and a central three-dimensional distance sensor 202.

The carrier 190 includes a base plate 204, a right frame 206, a left frame 208, a right plate 210, a left plate 212, a front frame 214, and a rear frame 216. The base plate 204 is arranged along the front-rear direction and the left-right direction. As shown in FIG. 1, the power supply unit 102 is supported by the conveying unit 106 by having the housing 110 fixed to an upper surface of the base plate 204. A through hole 204a is defined in the base plate 204. As shown in FIG. 11, the operation unit 104 is supported by the conveying unit 106 by fixing the lower base member 134 to an edge of the through hole 204a. When the operation unit 104 is to lift or lower the rebar tying machine 2, the rebar tying machine 2 moves through the through hole 204a.

The right frame 206 and the left frame 208 are fixed to a lower surface of the base plate 204. The right frame 206 extends in the front-rear direction at the right end of the base plate 204. The left frame 208 extends in the front-rear direction at the left end of the base plate 204. In the front-rear direction, the front end of the right frame 206 and the front end of the left frame 208 are located at the same position as the front end of the base plate 204, and the rear end of the right frame 206 and the rear end of the left frame 208 are located at the same position as the rear end of the base plate 204. The right plate 210 is fixed to a right surface of the right frame 206. The right plate 210 is arranged along the front-rear direction and the up-down direction. The left plate 212 is fixed to a left surface of the left frame 208. The left plate 212 is arranged along the front-rear direction and the up-down direction. In the up-down direction, the upper end of the right plate 210 and the upper end of the left plate 212 are located at the same position as the upper surface of the base plate 204. In the front-rear direction, the front end of the right plate 210 and the front end of the left plate 212 protrude frontward beyond the front end of the base plate 204, and the rear end of the right plate 210 and the rear end of the left plate 212 protrude rearward beyond the rear end of the base plate 204. The front frame 214 couples a portion of the right plate 210 at the vicinity of its front end and a portion of the left plate 212 at the vicinity of its front end at a position on the frontward of the front end of the base plate 204. The rear frame 216 couples a portion of the right plate 210 at the vicinity of the rear end and a portion of the left plate 212 at the vicinity of the rear end at a position rearward of the rear end of the base plate 204. The front frame 214 and the rear frame 216 extend in the left-right direction. In the up-down direction, the front frame 214 and the rear frame 216 are positioned lower than the right frame 206 and the left frame 208.

The right crawler 192 includes a front pulley 218, a rear pulley 220, a plurality of auxiliary pulleys 222, a tensioner pulley 224, a rubber belt 226, a right crawler motor 228, and a gearbox 230. Teeth configured to mesh with the rubber belt 226 are defined on an outer surface of the front pulley 218, an outer surface of the rear pulley 220, and outer surfaces of the plurality of auxiliary pulleys 222. The rubber belt 226 is strapped over each of the front pulley 218, the rear pulley 220, the plurality of auxiliary pulleys 222, and the tensioner pulley 224. The front pulley 218 is rotatably supported by the right plate 210 via a bearing 232 in the vicinity of the front end of the right plate 210. The rear pulley 220 is rotatably supported by the right plate 210 via a bearing 234 at the vicinity of the rear end of the right plate 210. The plurality of auxiliary pulleys 222 is rotatably supported by the right plate 210 via bearings 236 between the front pulley 218 and the rear pulley 220. The plurality of auxiliary pulleys 222 is arranged along the front-rear direction. An outer diameter of the front pulley 218 and an outer diameter of the rear pulley 220 are substantially the same, and an outer diameter of each of the plurality of auxiliary pulleys 222 is smaller than the outer diameters of the front pulley 218 and the rear pulley 220. In the up-down direction, the lower end of the front pulley 218, the lower end of the rear pulley 220, and the lower ends of the plurality of auxiliary pulleys 222 are located at the substantially same position.

Figure 12:
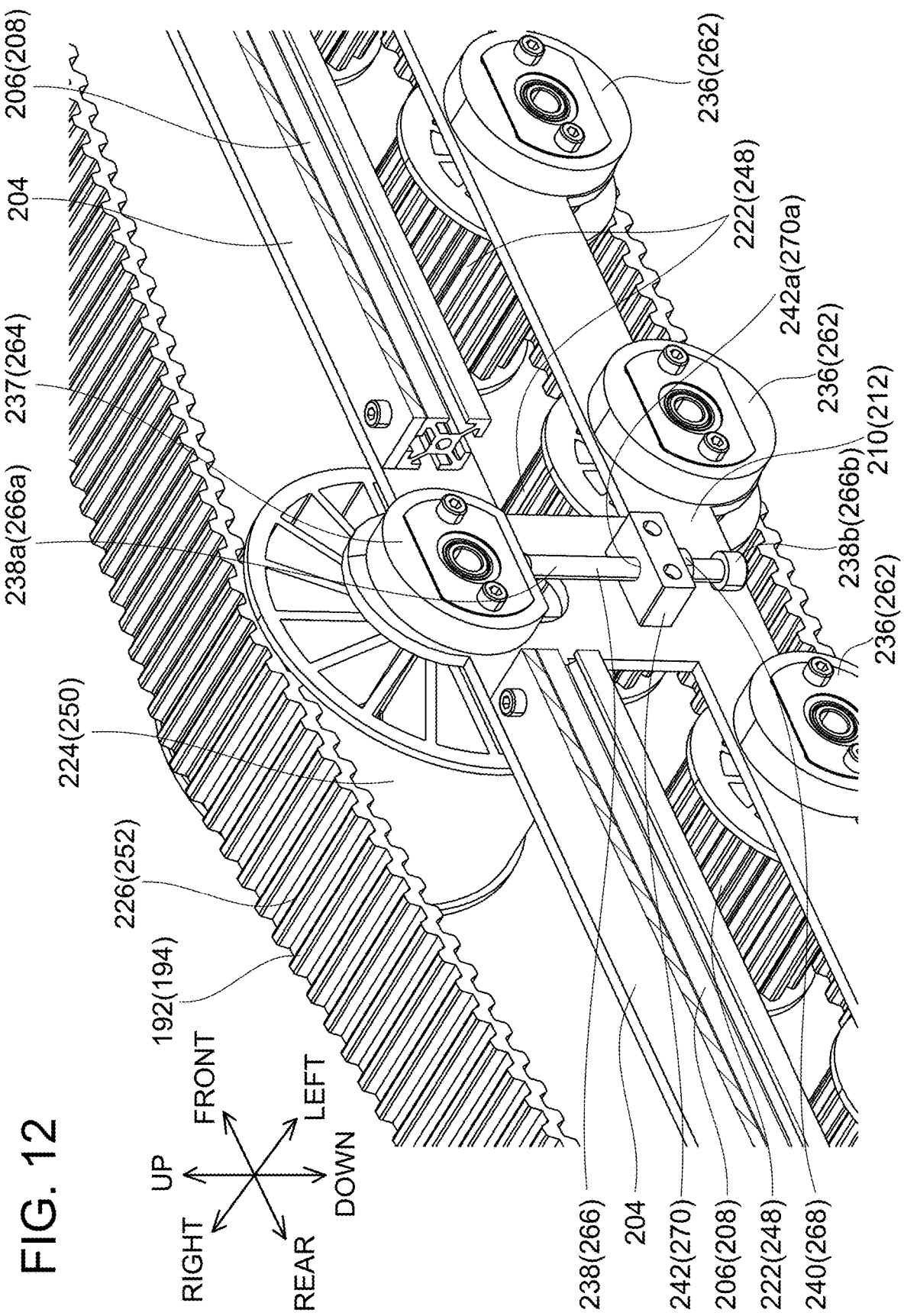
FIG. 12 is a perspective cross-sectional view of a tensioner pulley 224 of the rebar tying robot 100 of the embodiment and its vicinity viewed from the front left upper side.

As shown in FIG. 12, the tensioner pulley 224 is rotatably supported by a movable bearing 237. The movable bearing 237 is supported by the right plate 210 such that the movable bearing 237 can move in the up-down direction. The base plate 204 and the right frame 206 are cut away in the vicinity of the movable bearing 237 so that they do not interfere with the movable bearing 237. An adjustment bolt 238, a nut 240, and a bolt supporting member 242 are arranged below the movable bearing 237. The bolt supporting member 242 is fixed to the right plate 210. A through hole 242a through which a shank 238a of the adjustment bolt 238 penetrates is defined in the bolt supporting member 242. An internal thread corresponding to an external thread on the shank 238a is defined on an inner surface of the through hole 242a. The nut 240 is arranged below the bolt supporting member 242. Ahead 238b of the adjustment bolt 238 is arranged below the nut 240, and the shank 238a of the adjustment bolt 238 is screw-fitted with the nut 240 and with the through hole 242a of the bolt supporting member 242. Due to this, a position of the adjustment bolt 238 in the up-down direction is fixed by a so-called double nut structure. The upper end of the shank 238a of the adjustment bolt 238 abuts a lower surface of the movable bearing 237. By adjusting the position of the adjustment bolt 238 in the up-down direction with the rubber belt 226 strapped over the tensioner pulley 224, a position of the movable bearing 237 relative to the right plate 210 in the up-down direction can be adjusted. Due to this, a degree of tension of the rubber belt 226 can be adjusted.

As shown in FIG. 11, the right crawler motor 228 is supported by the right plate 210 via the bearing 232 and the gearbox 230. The right crawler motor 228 may for example be a DC brushless motor. The right crawler motor 228 is coupled to the front pulley 218 via a reduction gear (not shown) incorporated in the gearbox 230. When the right crawler motor 228 rotates in a forward direction or a reverse direction, the front pulley 218 rotates in a forward direction or a reverse direction, by which the rubber belt 226 rotates in a forward direction or a reverse direction on the outside of the front pulley 218, the rear pulley 220, the plurality of auxiliary pulleys 222, and the tensioner pulley 224.

The left crawler 194 includes a front pulley 244, a rear pulley 246, a plurality of auxiliary pulleys 248, a tensioner pulley 250, a rubber belt 252, a left crawler motor 254, and a gearbox 256. Teeth configured to mesh with the rubber belt 252 are defined on an outer surface of the front pulley 244, an outer surface of the rear pulley 246, and outer surfaces of the plurality of auxiliary pulleys 248. The rubber belt 252 is strapped over the front pulley 244, the rear pulley 246, the plurality of auxiliary pulleys 248, and the tensioner pulley 250. The front pulley 244 is rotatably supported by the left plate 212 via a bearing 258 at the vicinity of the front end of the left plate 212. The rear pulley 246 is rotatably supported by the left plate 212 via a bearing 260 at the vicinity of the rear end of the left plate 212. The plurality of auxiliary pulleys 248 is rotatably supported by the left plate 212 via bearings 262 between the front pulley 244 and the rear pulley 246. The plurality of auxiliary pulleys 248 is arranged along the front-rear direction. An outer diameter of the front pulley 244 and an outer diameter of the rear pulley 246 are substantially the same, and an outer diameter of each of the plurality of auxiliary pulleys 248 is smaller than the outer diameters of the front pulley 244 and the rear pulley 246. In the up-down direction, the lower end of the front pulley 244, the lower end of the rear pulley 246, and the lower ends of the plurality of auxiliary pulleys 248 are at the substantially same position.

As shown in FIG. 12, the tensioner pulley 250 is rotatably supported by a movable bearing 264. The movable bearing 264 is supported by the left plate 212 such that the movable bearing 264 can move in the up-down direction. The base plate 204 and the left frame 208 are cut away in the vicinity of the movable bearing 264 so that they do not interfere with the movable bearing 264. An adjustment bolt 266, a nut 268, and a bolt supporting member 270 are arranged below the movable bearing 264. The bolt supporting member 270 is fixed to the left plate 212. A through hole 270a through which a shank 266a of the adjustment bolt 266 penetrates is defined in the bolt supporting member 270. An internal thread corresponding to an external thread on the shank 266a is defined on an inner surface of the through hole 270a. The nut 268 is arranged below the bolt supporting member 270. Ahead 266b of the adjustment bolt 266 is arranged below the nut 268, and the shank 266a of the adjustment bolt 266 is screw-fitted with the nut 268 and with the through hole 270a of the bolt supporting member 270. Due to this, a position of the adjustment bolt 266 in the up-down direction is fixed by a so-called double nut structure. The upper end of the shank 266a of the adjustment bolt 266 abuts a lower surface of the movable bearing 264. By adjusting the position of the adjustment bolt 266 in the up-down direction with the rubber belt 252 strapped over the tensioner pulley 250, a position of the movable bearing 264 relative to the left plate 212 in the up-down direction can be adjusted. Due to this, a degree of tension of the rubber belt 252 can be adjusted.

As shown in FIG. 11, the left crawler motor 254 is supported by the left plate 212 via the bearing 258 and the gearbox 256. The left crawler motor 254 may for example be a DC brushless motor. The left crawler motor 254 is coupled to the front pulley 244 via a reduction gear (not shown) incorporated in the gearbox 256. When the left crawler motor 254 rotates in a forward direction or a reverse direction, the front pulley 244 rotates in a forward direction or a reverse direction, by which the rubber belt 252 rotates in a forward direction or a reverse direction on the outside of the front pulley 244, the rear pulley 246, the plurality of auxiliary pulleys 248, and the tensioner pulley 250.

Figure 13:
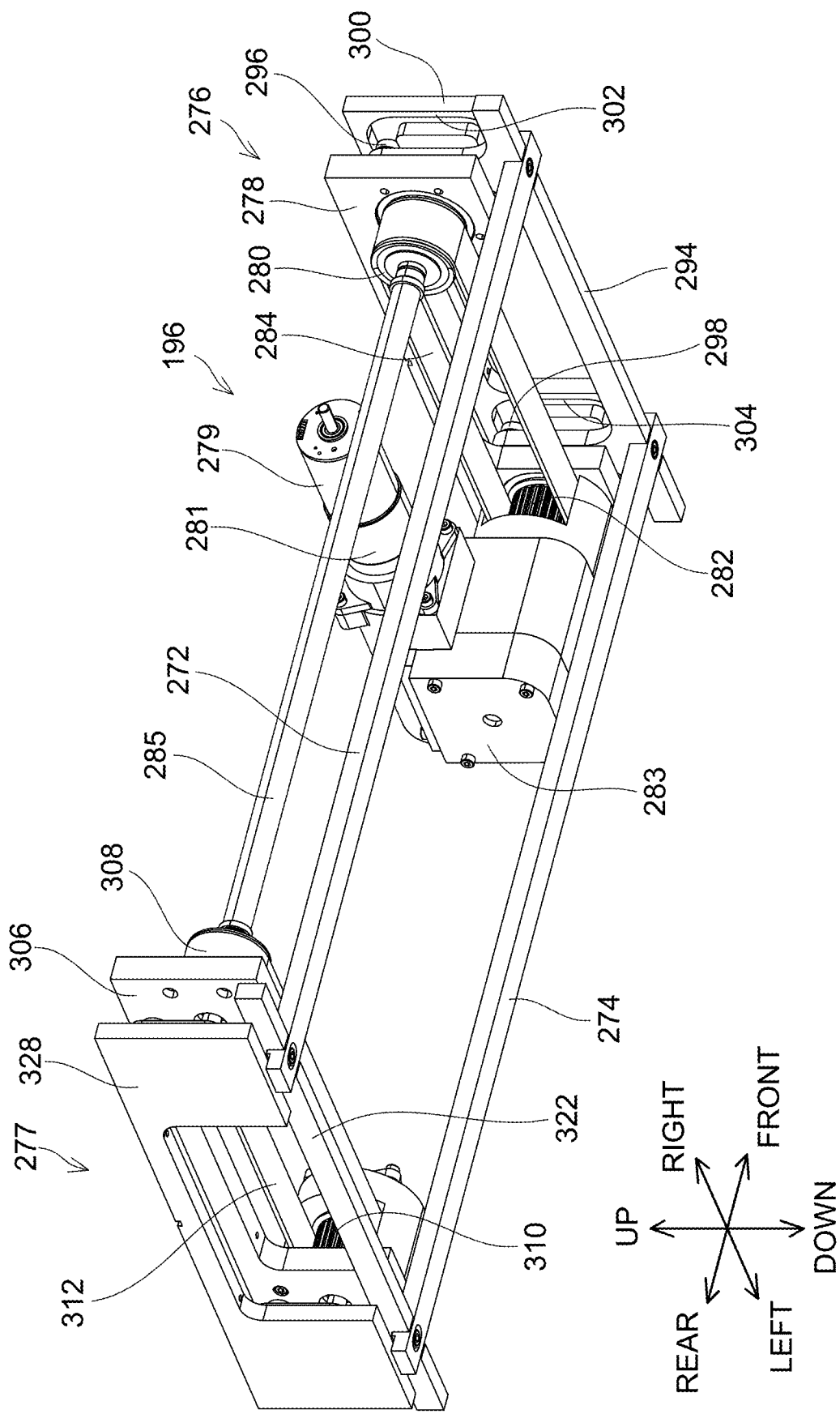
FIG. 13 is a perspective view of a side stepper 196 of the rebar tying robot 100 of the embodiment viewed from the rear right lower side.

As shown in FIG. 13, the side stepper 196 includes step bars 272, 274, a front crank mechanism 276, a rear crank mechanism 277, a stepper motor 279, a gearbox 281, a worm gear casing 283, and a rotation transmitting shaft 285. The step bars 272, 274 are bar-shaped members with a substantially rectangular cross section, and extend in the front-rear direction. As shown in FIG. 11, in the left-right direction, the step bar 272 is arranged between the center and the right end of the base plate 204, and the step bar 274 is arranged between the center and the left end of the base plate 204.

Figure 14:
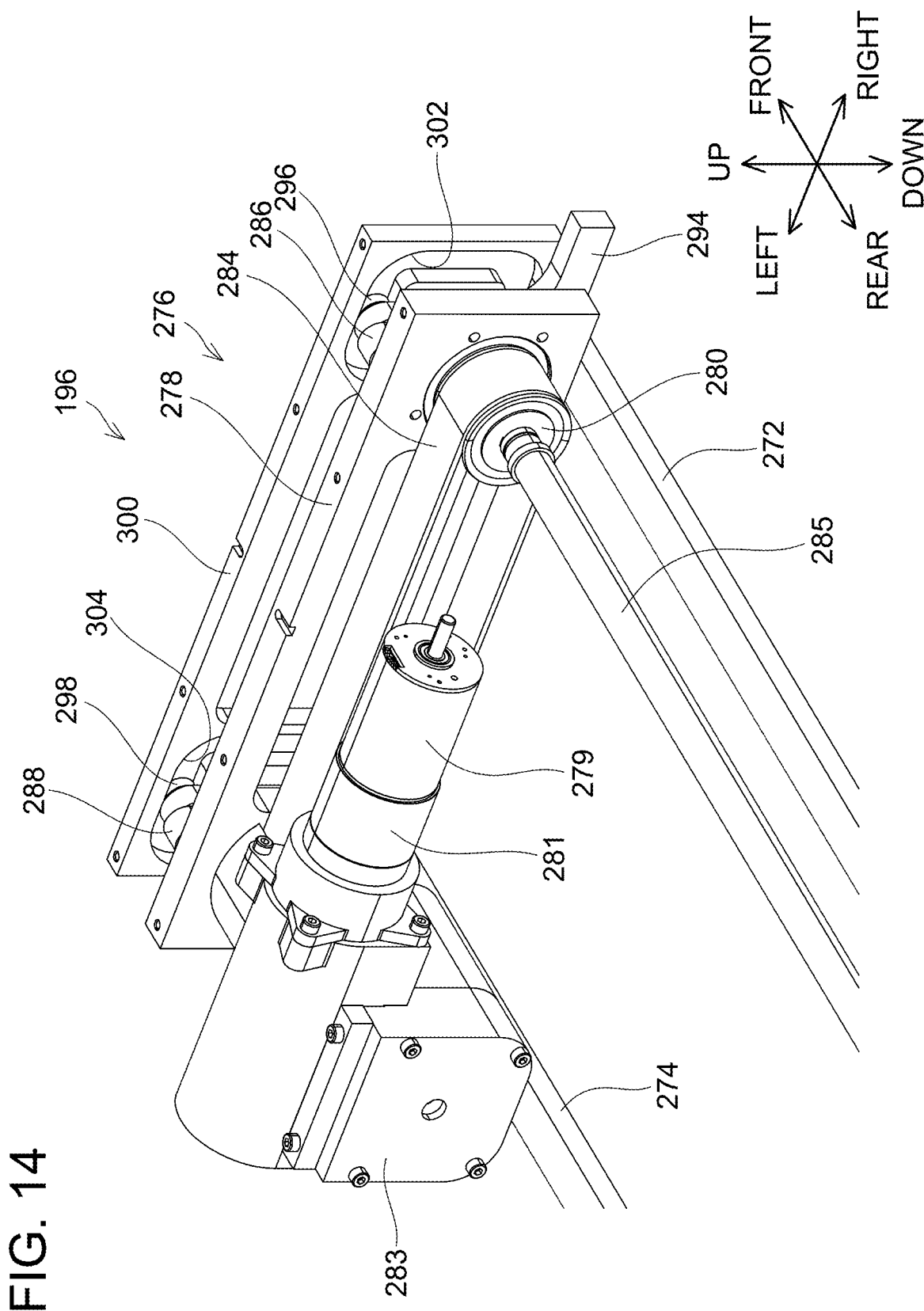
FIG. 14 is a perspective view of a front portion of the side stepper 196 of the rebar tying robot 100 of the embodiment viewed from the rear right upper side.

As shown in FIGS. 13 and 14, the front crank mechanism 276 includes a support plate 278, pulleys 280, 282, a belt 284, crank arms 286, 288, crank pins 290, 292 (see FIG. 15), a crank plate 294, rollers 296, 298, and a guide plate 300. The support plate 278 is fixed to the lower surface of the base plate 204 at the vicinity of the front end of the base plate 204. The support plate 278 is arranged along the left-right direction and the up-down direction. The pulley 280 is arranged rearward of the support plate 278 at the vicinity of the right end of the support plate 278. The pulley 282 is arranged rearward of the support plate 278 in the vicinity of the left end of the support plate 278. The pulleys 280, 282 are supported rotatably by the support plate 278. A diameter of the pulley 280 is substantially the same as a diameter of the pulley 282. The belt 284 is strapped over each of the pulleys 280, 282. Due to this, when one of the pulleys 280, 282 rotates in a forward direction or a reverse direction, the other thereof rotates in the forward direction or the reverse direction at substantially the same rotational speed.

Figure 15:
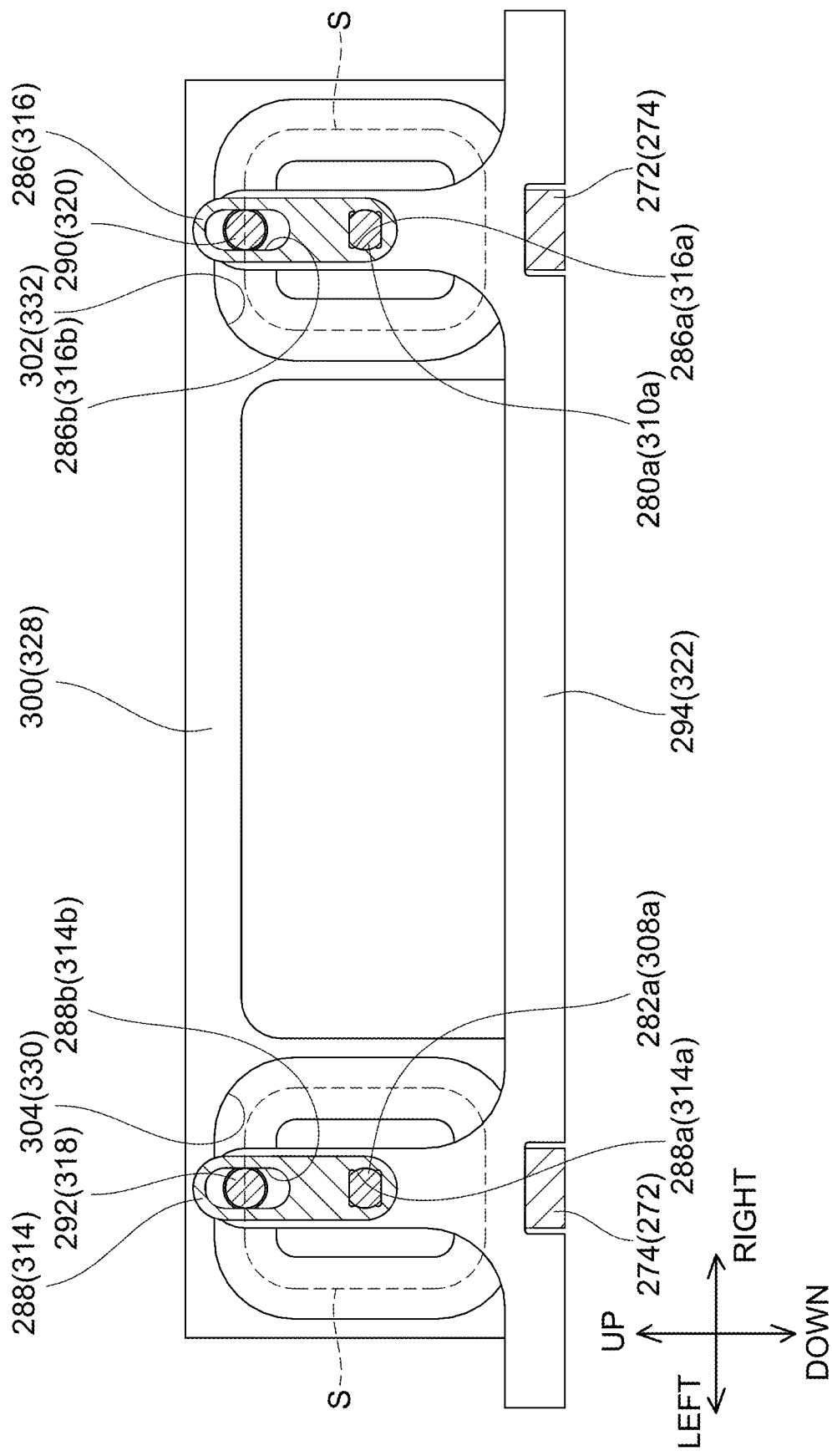
FIG. 15 is a cross-sectional view of a front crank mechanism 276 of the rebar tying robot 100 of the embodiment viewed from the rear side.

The crank arms 286, 288, the crank pins 290, 292, the crank plate 294, the rollers 296, 298, and the guide plate 300 are arranged frontward of the support plate 278. As shown in FIG. 15, the crank arms 286, 288 include fitting holes 286a, 288a to which shafts 280a, 282a of the pulleys 280, 282 are fitted, and long holes 286b, 288b extending in a longitudinal direction of the crank arms 286, 288. When the pulleys 280, 282 rotate, the crank arms 286, 288 rotate integrally with the pulleys 280, 282 about the shafts 280a, 282a. The crank pins 290, 292 are slidably inserted into the long holes 286b, 288b. The crank pins 290, 292 are fixed to the crank plate 294 with the crank pins 290, 292 penetrating the crank plate 294. The crank plate 294 is arranged frontward of the crank arms 286, 288. The crank plate 294 extends in the left-right direction and the up-down direction. The rollers 296, 298 (see FIG. 14) are attached to the crank pins 290, 292 frontward of the crank plate 294. As shown in FIG. 14, the rollers 296, 298 are accommodated in guide grooves 302, 304 defined in a rear surface of the guide plate 300. The guide plate 300 is fixed to the lower surface of the base plate 204 frontward of the crank plate 294. The guide plate 300 extends in the left-right direction and the up-down direction. As shown in FIG. 15, the guide grooves 302, 304 of the guide plate 300 have substantially rectangular shapes with rounded corners. The guide grooves 302, 304 define a side-stepping track S shown by a broken line in FIG. 15. The side-stepping track S has a substantially rectangular shape with rounded corners, and includes upper and lower edges extending along the left-right direction, and right and left edges extending along the up-down direction.

In the front crank mechanism 276, when the pulleys 280, 282 rotate, the crank pins 290, 292 move in a rotating direction of the crank arms 286, 288 by rotation of the crank arms 286, 288. Here, since the rollers 296, 298 are accommodated in the guide grooves 302, 304, the crank pins 290, 292 move along the side-stepping track S defined by the guide grooves 302, 304 while sliding inside the long holes 286b, 288b. Due to this, the crank plate 294 to which the crank pins 290, 292 are fixed also moves along the side-stepping track S defined by the guide grooves 302, 304.

Figure 16:
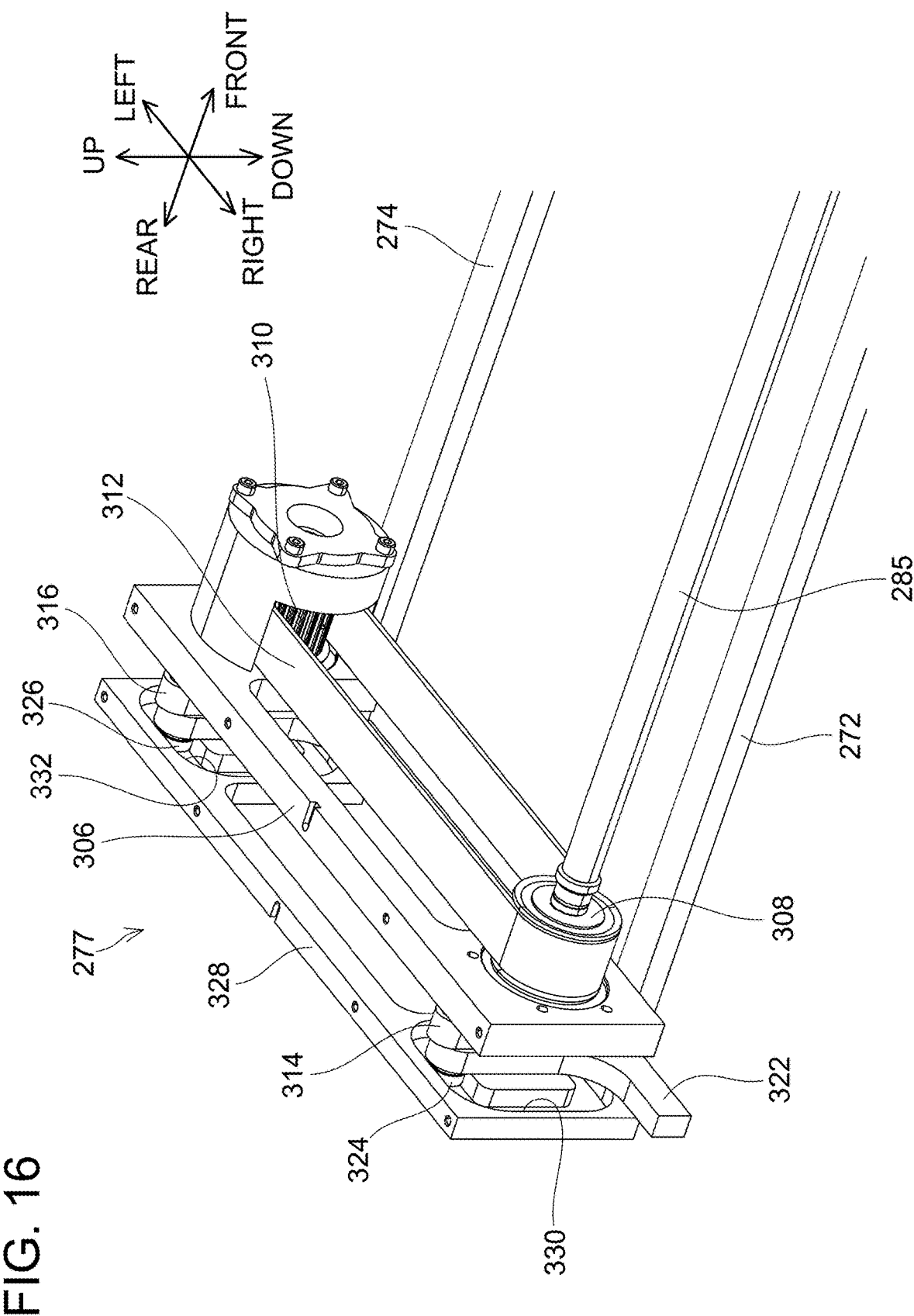
FIG. 16 is a perspective view of a rear portion of the side stepper 196 of the rebar tying robot 100 of the embodiment viewed from the front right upper side.

As shown in FIG. 16, the rear crank mechanism 277 includes a support plate 306, pulleys 308, 310, a belt 312, crank arms 314, 316, crank pins 318, 320 (see FIG. 15), a crank plate 322, rollers 324, 326, and a guide plate 328. The support plate 306 is fixed to the lower surface of the base plate 204 at the vicinity of the rear end of the base plate 204. The support plate 306 is arranged along the left-right direction and the up-down direction. The pulley 308 is arranged frontward of the support plate 306 at the vicinity of the right end of the support plate 306. The pulley 310 is arranged frontward of the support plate 306 at the vicinity of the left end of the support plate 306. The pulleys 308, 310 are supported rotatably by the support plate 306. A diameter of the pulley 308 is substantially the same as a diameter of the pulley 310, and is substantially the same as the diameter of each of the pulleys 280, 282 of the front crank mechanism 276. The belt 312 is strapped over each of the pulleys 308, 310. Due to this, when one of the pulleys 308, 310 rotates in a forward direction or a reverse direction, the other thereof rotates in the forward direction or the reverse direction at substantially the same rotational speed.

The crank arms 314, 316, the crank pins 318, 320, the crank plate 322, the rollers 324, 326, and the guide plate 328 are arranged rearward of the support plate 306. As shown in FIG. 15, the crank arms 314, 316 include fitting holes 314a, 316a to which shafts 308a, 310a of the pulleys 308, 310 are fitted, and long holes 314b, 316b extending in a longitudinal direction of the crank arms 314, 316. When the pulleys 308, 310 rotate, the crank arms 314, 316 rotate integrally with the pulleys 308, 310 about the shafts 308a, 310a. The crank pins 318, 320 are slidably inserted into the long holes 314b, 316b. The crank pins 318, 320 are fixed to the crank plate 322 with the crank pins 318, 320 penetrating the crank plate 322. The crank plate 322 is arranged rearward of the crank arms 314, 316. The crank plate 322 extends in the left-right direction and the up-down direction. The rollers 324, 326 (see FIG. 16) are attached to the crank pins 318, 320 at positions rearward of the crank plate 322. As shown in FIG. 16, the rollers 324, 326 are accommodated in guide grooves 330, 332 defined in a front surface of the guide plate 328. The guide plate 328 is fixed to the lower surface of the base plate 204 at a position rearward of the crank plate 322. The guide plate 328 extends in the left-right direction and the up-down direction. As shown in FIG. 15, the guide grooves 330, 332 of the guide plate 328 have a substantially rectangular shape with rounded corners. The guide grooves 330, 332 define a side-stepping track S shown by a broken line in FIG. 15. The side-stepping track S has a substantially rectangular shape with rounded corners, and includes upper and lower edges extending along the left-right direction, and right and left edges extending along the up-down direction. The side-stepping track S defined by the guide grooves 330, 332 is the same as the side-stepping track S defined by the guide grooves 302, 304.

In the rear crank mechanism 277, when the pulleys 308, 310 rotate, the crank pins 318, 320 move in a rotating direction of the crank arms 314, 316 by rotation of the crank arms 314, 316. Here, since the rollers 324, 326 are accommodated in the guide grooves 330, 332, the crank pins 318, 320 move along the side-stepping track S defined by the guide grooves 330, 332 while sliding inside the long holes 314b, 316b. Due to this, the crank plate 322 to which the crank pins 318, 320 are fixed also moves along the side-stepping track S defined by the guide grooves 330, 332.

As shown in FIG. 13, the step bars 272, 274 have front ends fixed to the crank plate 294 of the front crank mechanism 276, and rear ends fixed to the crank plate 322 of the rear crank mechanism 277. Further, the pulley 280 of the front crank mechanism 276 and the pulley 308 of the rear crank mechanism 277 are coupled by the rotation transmitting shaft 285. Due to this, the pulleys 280, 282 of the front crank mechanism 276 and the pulleys 308, 310 of the rear crank mechanism 277 rotate in synchrony with each other, and the crank plate 294 of the front crank mechanism 276 and the crank plate 322 of the rear crank mechanism 277 operate in synchrony. One of the front crank mechanism 276 and the rear crank mechanism 277 (such as the front crank mechanism 276) is provided with a zero-point detection sensor (not shown). The zero-point detection sensor may for example include a permanent magnet (not shown) fixed to the crank plate 294 and a Hall element (not shown) fixed to the guide plate 300. The zero-point detection sensor is configured to detect whether the crank plates 294, 322 are at a zero-point position, where the zero-point position is the center of the upper edge of the side-stepping track S in the left-right direction.

As shown in FIG. 13, the worm gear casing 283 is arranged rearward of the pulley 282 of the front crank mechanism 276. The worm gear casing 283 is fixed to the support plate 278 of the front crank mechanism 276. The gearbox 281 is arranged rightward of the worm gear casing 283 and is fixed to the worm gear casing 283. The stepper motor 279 is arranged rightward of the gearbox 281 and is supported by the gearbox 281. The stepper motor 279 may for example be a DC brush motor. The stepper motor 279 is coupled to the pulley 282 via a reduction gear (not shown) incorporated in the gearbox 281 and a worm gear (not shown) incorporated in the worm gear casing 283. When the stepper motor 279 rotates in a forward direction or a reverse direction, the pulleys 280, 282, 308, 310 thereby rotate in the forward direction or the reverse direction, by which the crank plates 294, 322 move rightward or leftward along the side-stepping track S, and the step bars 272, 274 also move rightward or leftward along the side-stepping track S. As shown in FIG. 1, the base plate 204 includes a through hole 204b for avoiding interference with the stepper motor 279, the gearbox 281, and the worm gear casing 283.

Figure 17:
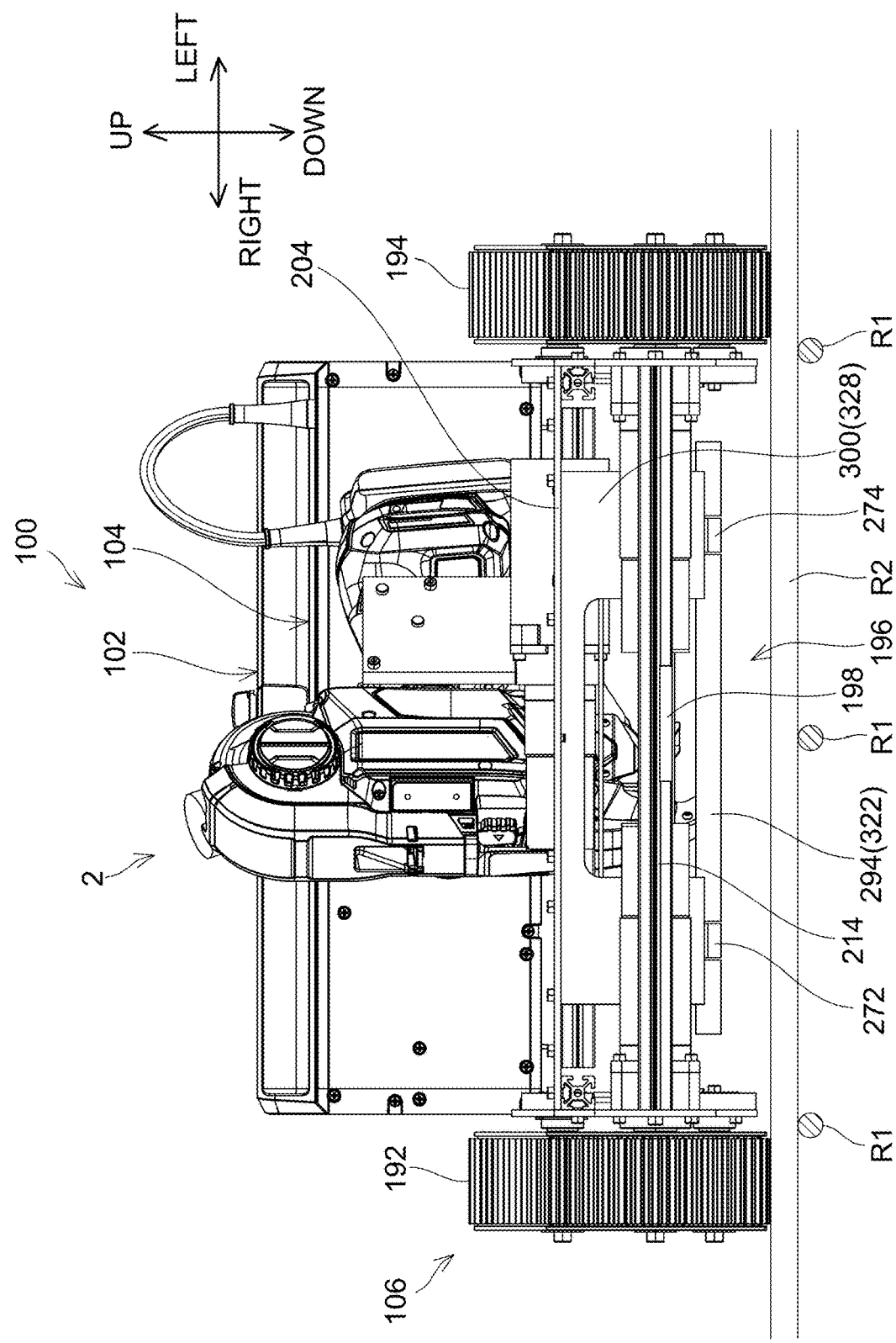
FIG. 17 is a front view of the rebar tying robot 100 of the embodiment in the state where step bars 272, 274 are lifted.

As shown in FIG. 17, in the state in which the crank plates 294, 322 are located at the upper edge of the side-stepping track S (see FIG. 15) and the step bars 272, 274 are lifted up, the crank plates 294, 322 and the step bars 272, 274 are separated from the primary rebars R1 and the secondary rebars R2. In this state, since the right crawler 192 and the left crawler 194 are in contact with the primary rebars R1 and the secondary rebars R2, the rebar tying robot 100 drives the right crawler 192 and the left crawler 194 and thus can move in the front-rear direction.

Figure 18:
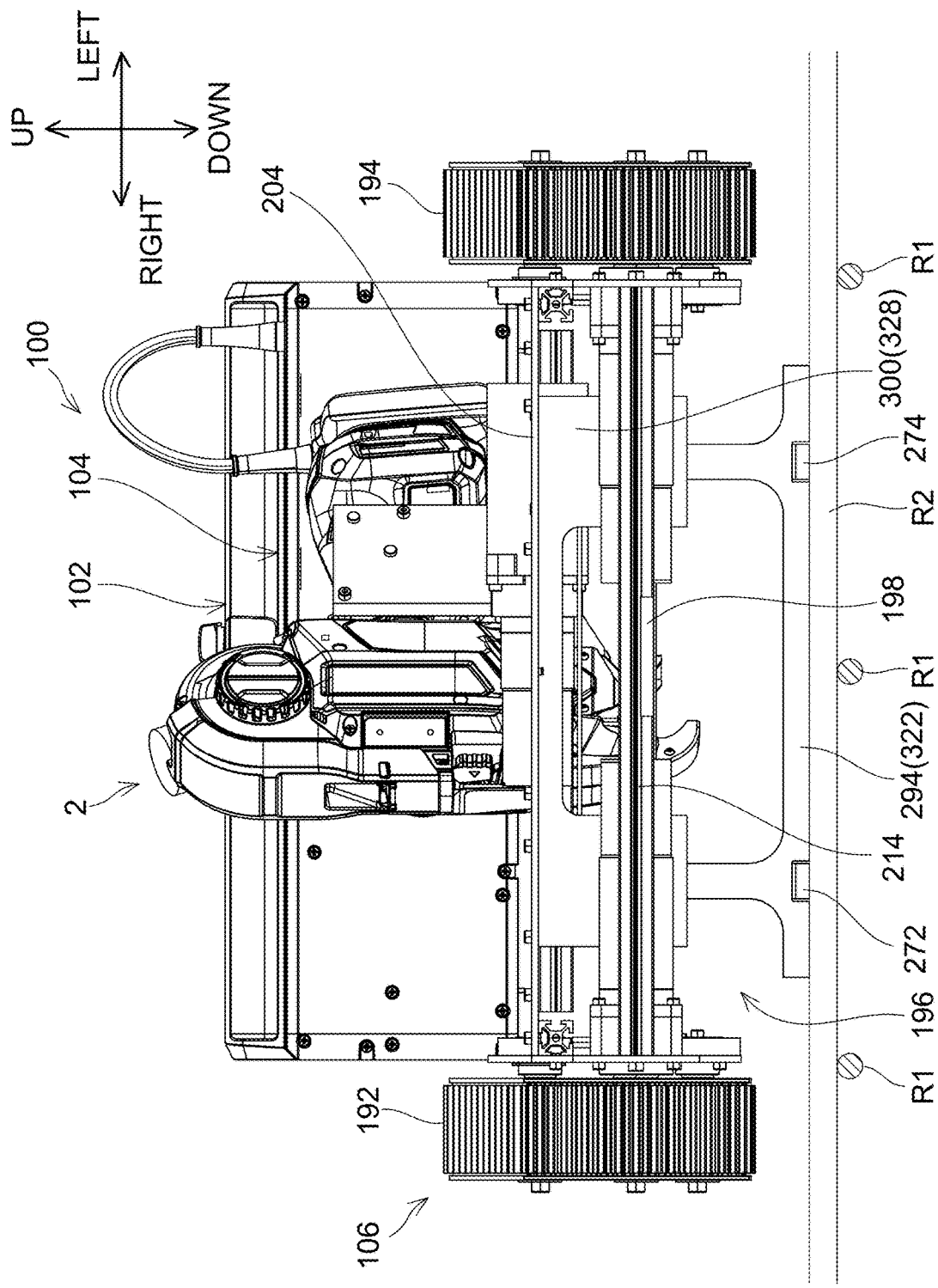
FIG. 18 is a front view of the rebar tying robot 100 of the embodiment in the state where the step bars 272, 274 are lowered.

When the stepper motor 279 is rotated from the state shown in FIG. 17, the crank plates 294, 322 move along the side-stepping track S (see FIG. 15), accompanying which the step bars 272, 274 move downward, and the crank plates 294, 322 and the step bars 272, 274 come into contact with the secondary rebars R2. When the stepper motor 279 is further rotated from this state, the crank plates 294, 322 and the step bars 272, 274 further move downward, as a result of which the right crawler 192 and the left crawler 194 separate from the secondary rebars R2 as shown in FIG. 18. By further continuing to rotate the stepper motor 279, the rebar tying robot 100 moves rightward or leftward by a step width corresponding to a width of the side-stepping track S in the left-right direction, after which the crank plates 294, 322 and the step bars 272, 274 move upward, by which the right crawler 192 and the left crawler 194 come into contact again with the primary rebars R1 and the secondary rebars R2 and the crank plates 294, 322 and the step bars 272, 274 separate from the secondary rebars R2. When the zero-point detection sensor detects that the crank plates 294, 322 have moved to the zero-point position, rotation of the stepper motor 279 stops. As above, by driving the side stepper 196, the rebar tying robot 100 can move rightward or leftward by a predetermined step width.

The side-stepping track S defined by the guide grooves 302, 304, 330, 332 is not limited to the aforementioned substantially rectangular shape, but may have various other shapes. The shape may be any shape so long as that, upon when the step bars 272, 274 move along the side-stepping track S, lower ends of the step bars 272, 274 move to positions lower than the lower ends of the right crawler 192 and the left crawler 194, and then the lower ends of the step bars 272, 274 move in the left-right direction and then the lower ends of the step bars 272, 274 move to positions higher than the lower ends of the right crawler 192 and the left crawler 194. For example, the side-stepping track S may be circular, oval, triangular with its bottom edge on the lower side, or polygonal such as pentagon or with more vertices.

As shown in FIG. 11, the front three-dimensional distance sensor 198 is arranged on a front surface of the front frame 214 at the vicinity of the center of the front frame 214 in the left-right direction. The rear three-dimensional distance sensor 200 is arranged on a rear surface of the rear frame 216 at the vicinity of the center of the rear frame 216 in the left-right direction. The central three-dimensional distance sensor 202 is arranged on the lower surface of the base plate 204 at the vicinity of the center of the left end of the base plate 204 in the front-rear direction. The front three-dimensional distance sensor 198 and the rear three-dimensional distance sensor 200 are directed downward. The central three-dimensional distance sensor 202 is directed diagonally downward toward the right side. The front three-dimensional distance sensor 198, the rear three-dimensional distance sensor 200, and the central three-dimensional distance sensor 202 are Time-of Flight (TOF) sensors configured to output point cloud data that represents a three-dimensional position of an object in a field of view using point clouds. The control unit 126 of the rebar tying robot 100 is configured to identify a relative arrangement of each of the primary rebars R1 and the secondary rebars R2 relative to each of the front three-dimensional distance sensor 198, the rear three-dimensional distance sensor 200, and the central three-dimensional distance sensor 202 based on the point cloud data obtained by the front three-dimensional distance sensor 198, the rear three-dimensional distance sensor 200, and the central three-dimensional distance sensor 202. A field of view of the front three-dimensional distance sensor 198 is arranged frontward of a field of view of the central three-dimensional distance sensor 202, and a field of view of the rear three-dimensional distance sensor 200 is arranged rearward of the field of view of the central three-dimensional distance sensor 202. Three-dimensional distance sensors that employ stereo vision scheme or pattern projection scheme may be used instead of the TOF sensors as the front three-dimensional distance sensor 198, the rear three-dimensional distance sensor 200, and the central three-dimensional distance sensor 202.

(Operation of Rebar Tying Robot 100)

Figure 19:
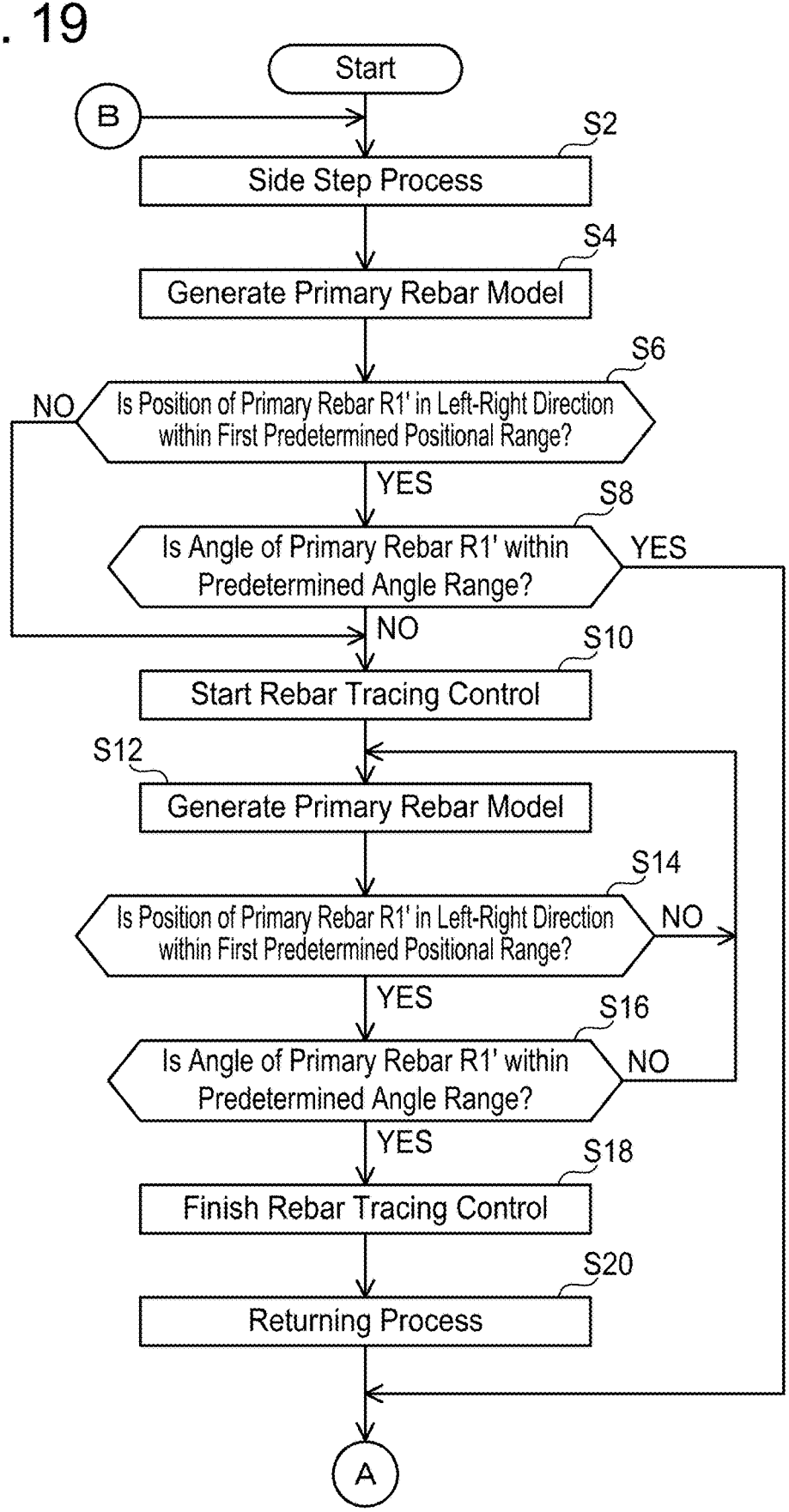
FIG. 19 is a flowchart showing processes which a control unit 126 executes in the rebar tying robot 100 of the embodiment.
Figure 20:
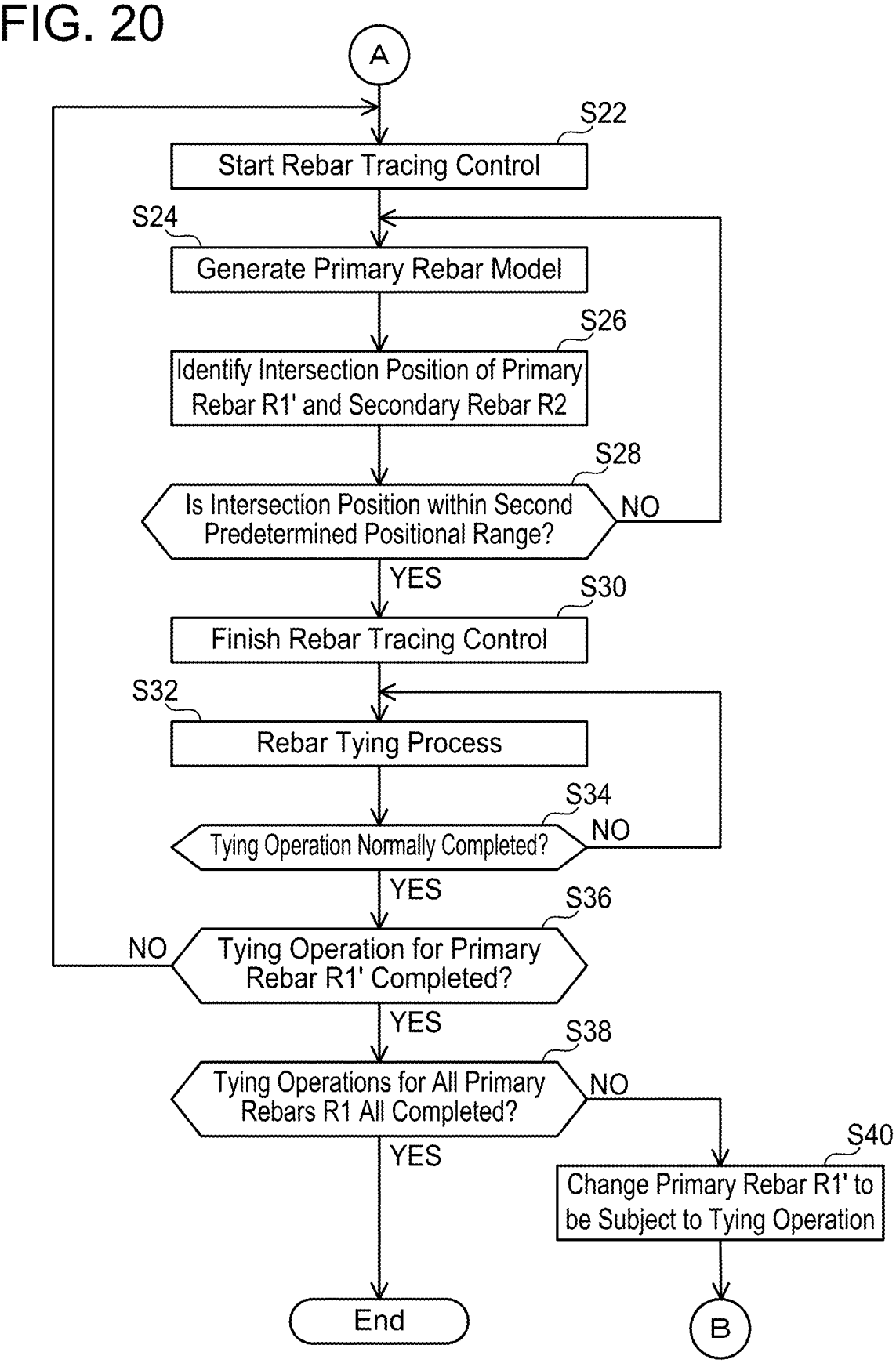
FIG. 20 is a flowchart showing processes which the control unit 126 executes in the rebar tying robot 100 of the embodiment.

When the user operates the operation execution button 122 and execution of the operation of the rebar tying robot 100 is instructed, the control unit 126 executes processes shown in FIG. 19, FIG. 20.

As shown in FIG. 19, in S2, the control unit 126 executes a side step process (see FIG. 28) until the rebar tying robot 100 arrives above a primary rebar R1' that is to be a target of tying work among the plurality of primary rebars R1. Details of the side step process will be described later.

In S4, the control unit 126 generates a primary rebar model in which a position and an angle of the primary rebar R1' as viewed from the rebar tying robot 100 are modeled by a linear line. Details of a process for generating the primary rebar model will be described later.

In S6, the control unit 126 determines whether a position of the primary rebar R1' in the left-right direction is within a first predetermined positional range from a reference position. The reference position hereof refers to a position where an intersecting point of the primary rebar R1' and the secondary rebar R2 should exist when the operation unit 104 lowers the rebar tying machine 2 to perform tying work. For example, in relation to the front-rear direction and the left-right direction, the reference position is located at the center of the base plate 204 in the front-rear direction and the left-right direction. Further, the position of the primary rebar R1' in the left-right direction hereof refers to the position of the primary rebar R1' in the left-right direction at the same position in the front-rear direction as the reference position. The position of the primary rebar R1' in the left-right direction can be calculated based on the primary rebar model. Further, the first predetermined positional range hereof refers to a range within which the tying work by the rebar tying machine 2 can be executed so long as the position of the primary rebar R1' in the left-right direction is within the range. In the case where the position of the primary rebar R1' in the left-right direction is not within the first predetermined positional range (case of NO), the process proceeds to S10. In the case where the position of the primary rebar R1' in the left-right direction is within the first predetermined positional range (case of YES), the process proceeds to S8.

In S8, the control unit 126 determines whether the angle of the primary rebar R1' is within a predetermined angle range from a reference angle. The reference angle hereof refers to an angle at which the primary rebar R1' should be oriented with respect to the front-rear direction of the rebar tying robot 100 at the intersecting point of the primary rebar R1' and the secondary rebar R2 when the operation unit 104 lowers the rebar tying machine 2 to execute the tying work. For example, the reference angle is 0 degrees. The angle of the primary rebar R1' can be calculated based on the primary rebar model. Further, the predetermined angle range hereof is a range within which the tying work by the rebar tying machine 2 can be executed so long as the angle of the primary rebar R1' is within this range. In the case where the angle of the primary rebar R1' is not within the predetermined angle range (case of NO), the process proceeds to S10. In the case where the angle of the primary rebar R1' is within the predetermined angle range (case of YES), the process proceeds to S22 (see FIG. 20).

In S10, the control unit 126 starts rebar tracing control. In the rebar tracing control, the control unit 126 moves the rebar tying robot 100 forward or rearward while providing a speed difference between the right crawler 192 and the left crawler 194, and thereby brings the position and angle of the primary rebar R1' in the left-right direction closer to the reference position and reference angle. Details of the rebar tracing control will be described later.

In S12, the control unit 126 generates a primary rebar model of the primary rebar R1' by a process similar to S4 in order to update the primary rebar model as the rebar tying robot 100 moves.

In S14, the control unit 126 determines whether the position of the primary rebar R1' in the left-right direction is within the first predetermined positional range from the reference position. In the case where the position of the primary rebar R1' in the left-right direction is not within the first predetermined positional range (case of NO), the process returns to S12. In the case where the position of the primary rebar R1' in the left-right direction is within the first predetermined range (case of YES), the process proceeds to S16.

In S16, the control unit 126 determines whether the angle of the primary rebar R1' is within the predetermined angle range from the reference angle. In the case where the angle of the primary rebar R1' is not within the predetermined angle range (case of NO), the process returns to S12. In the case where the angle of the primary rebar R1' is within the predetermined angle range (case of YES), the process proceeds to S18.

Figure 21:
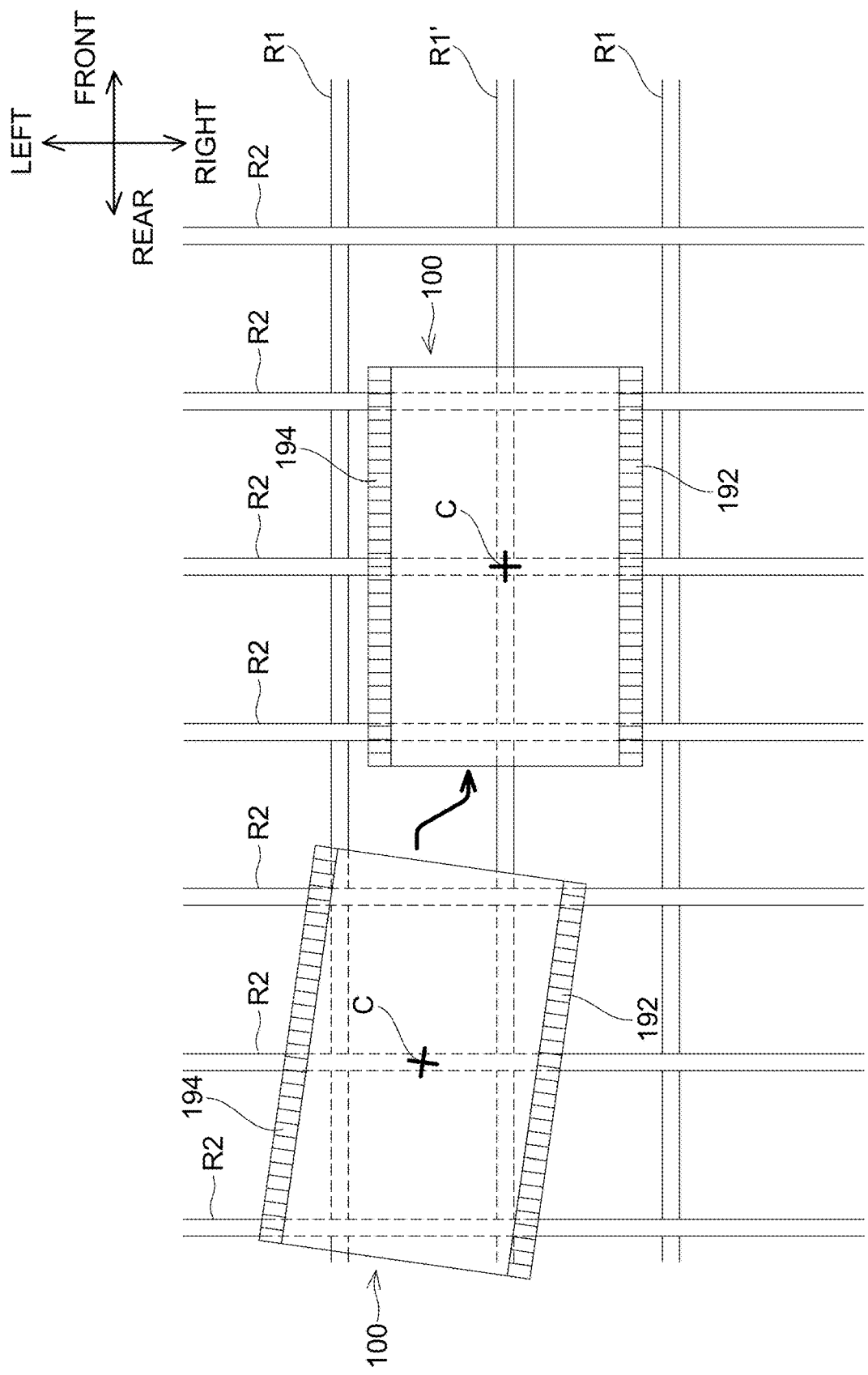
FIG. 21 is a top view showing an example of an operation of the rebar tying robot 100 of the embodiment.

In S18, the control unit 126 finishes the rebar tracing control. By performing the processes from S10 to S18, the rebar tying robot 100 moves so that the position and the angle of the primary rebar R1' in the left-right direction comes to match the reference position and the reference angle as shown in FIG. 21. In FIGS. 21 to 24, the reference position and the reference angle of the rebar tying robot 100 are represented by a cross-cursor C.

Figure 22:
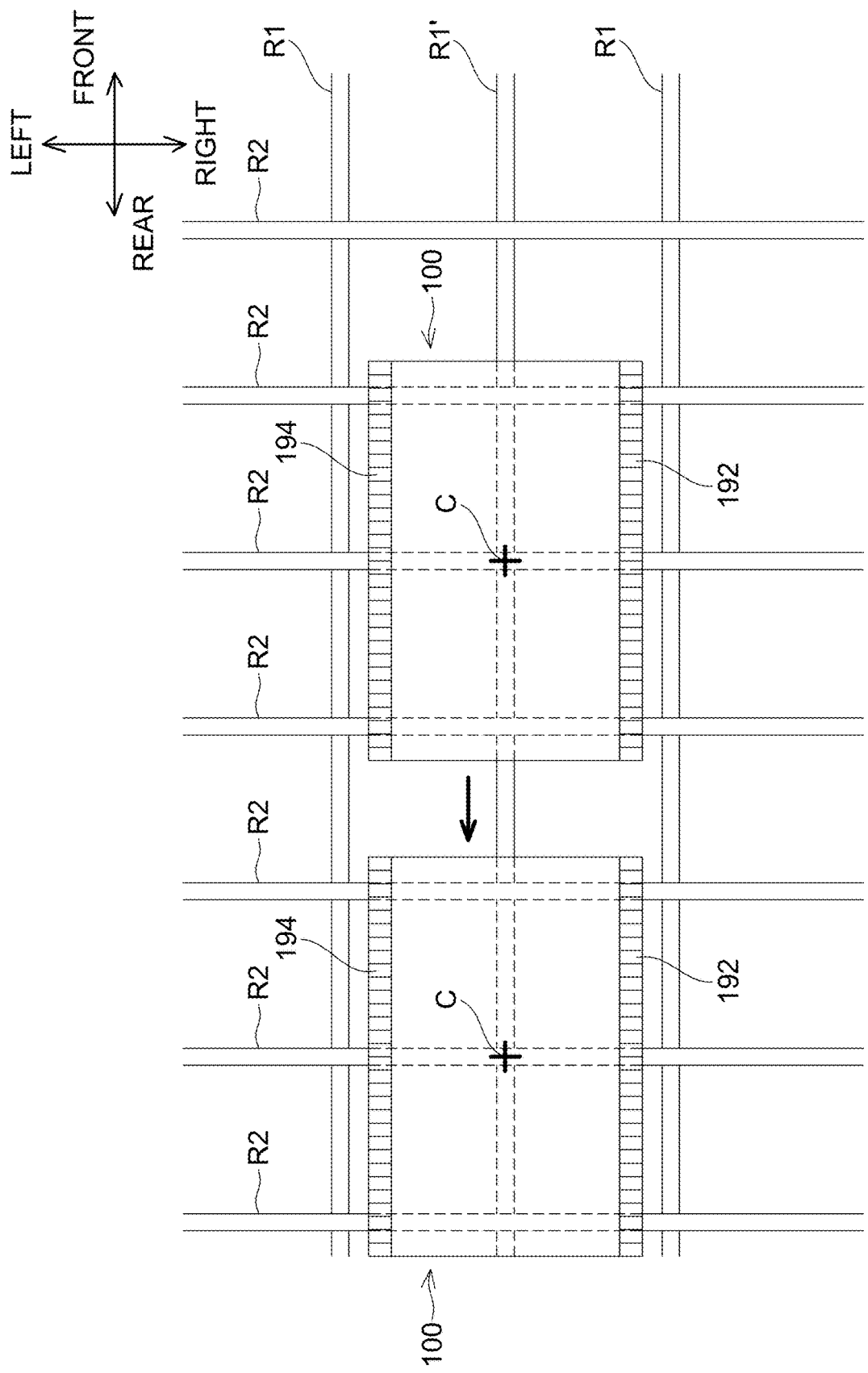
FIG. 22 is a top view showing another example of the operation of the rebar tying robot 100 of the embodiment.

As shown in FIG. 19, the control unit 126 executes a returning process in S20. In the returning process, the control unit 126 moves the rebar tying robot 100 in a reverse direction opposite from the direction in which the rebar tying robot 100 moved in the preceding processes of S10 to S18. In doing so, the control unit 126 moves the rebar tying robot 100 by providing a speed difference between the right crawler 192 and the left crawler 194 so that the position and angle of the primary rebar R1' in the left-right direction that were brought to be within the first predetermined positional range and the predetermined angular range in the preceding processes of S10 to S18 do not deviate out of the first predetermined positional range and the predetermined angular range. The control unit 126 measures a moving distance of the rebar tying robot 100 in the forward or rearward direction from the time when the rebar tracing control was started in S10 until the rebar tracing control is finished in S18, and moves the rebar tying robot 100 in the reverse direction over the same moving distance in the returning process of S20. By performing the returning process of S20, the rebar tying robot 100 moves in the reverse direction as shown in FIG. 22 while the position and angle of the primary rebar R1' in the left-right direction are matched to the reference position and reference angle.

As shown in FIG. 20, in S22, the control unit 126 starts the rebar tracing control similar to S10 (see FIG. 19). Due to this, the rebar tying robot 100 starts to move forward or rearward along the primary rebar R1'.

In S24, the control unit 126 generates a primary rebar model related to the primary rebar R1' by a process similar to S4 so as to update the primary rebar model in accordance with the movement of the rebar tying robot 100.

In S26, the control unit 126 identifies a position of the intersecting point of the primary rebar R1' and the secondary rebar R2. Details of a position identification process for the intersecting point will be described later.

In S28, the control unit 126 determines whether the position of the intersecting point of the primary rebar R1' and the secondary rebar R2 is within a second positional range from the reference position. The second positional range hereof is a range within which the tying work by the rebar tying machine 2 can be executed so long as the position of the intersecting point of the primary rebar R1' and the secondary rebar R2 is within the range. In the case where the position of the intersecting point is not within the second positional range (case of NO), the process returns to S24. In the case where the position of the intersecting point is within the second positional range (case of YES), the process proceeds to S30.

In S30, the control unit 126 finishes the rebar tracing control. Due to this, the rebar tying robot 100 stops moving forward or rearward along the primary rebar R1'.

In S32, the control unit 126 executes a rebar tying process. In the rebar tying process, the control unit 126 drives the lift mechanism 130 to lower the rebar tying machine 2 to set the rebar tying machine 2 at the intersecting point of the primary rebar R1' and the secondary rebar R2, and drives the grip mechanism 132 to perform the tying work using the rebar tying machine 2 on the primary rebar R1' and the secondary rebar R2. After this, the control unit 126 drives the lift mechanism 130 to lift the rebar tying machine 2. After S32, the process proceeds to S34.

In S34, the control unit 126 determines whether the tying work performed in S32 has been completed normally. In the case it is determined that the tying work has not been completed normally (case of NO), the process returns to S32. In the case it is determined that the tying work has been completed normally (case of YES), the process proceeds to S36.

Figure 23:
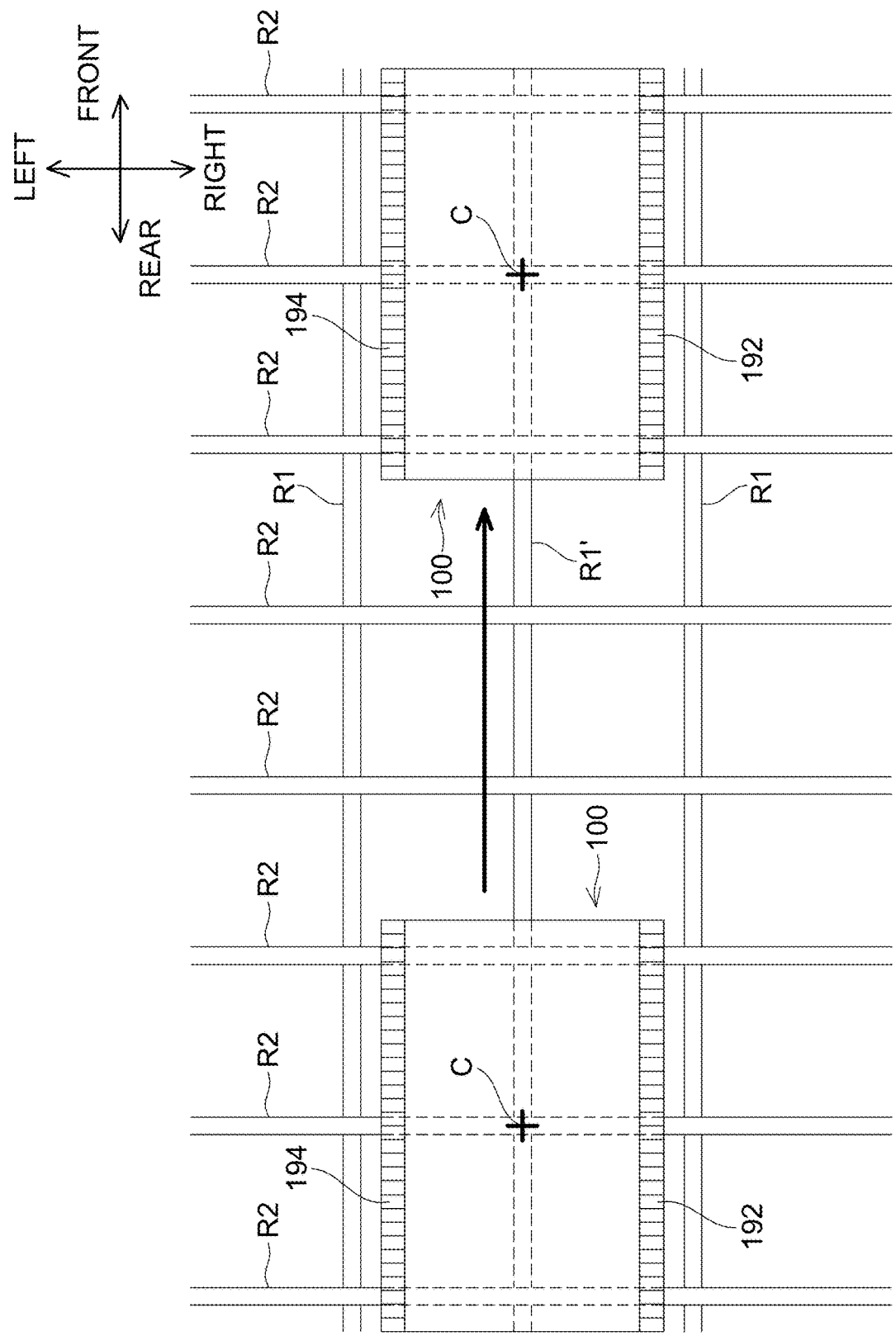
FIG. 23 is a top view showing yet another example of the operation of the rebar tying robot 100 of the embodiment.

In S36, the control unit 126 determines whether all the tying work for the primary rebar R1' has been completed. When it is determined that it has not yet been completed (case of NO), the process returns to S22. By repeating the processes from S22 to S36, the rebar tying robot 100 repeatedly performs the tying work on the intersecting points of the primary rebar R1' and the secondary rebars R2 while moving along the primary rebar R1' as shown in FIG. 23.

As shown in FIG. 20, when it is determined that all the tying work for the primary rebar R1' has been completed in S36 (when it is determined YES), the process proceeds to S38.

In S38, the control unit 126 determines whether the tying work has been completed for all of the primary rebars R1. When it is determined that it has not yet been completed (case of NO), the process proceeds to S40.

In S40, the control unit 126 changes the primary rebar R1' that is to be the target of the tying work to another primary rebar R1 for which the tying work has not been completed. After S40, the process returns to S2 (see FIG. 19).

In S38, when it is determined that the tying work has been completed for all of the primary rebars R1 (case of YES), the processes of FIGS. 19 and 20 are terminated.

In the processes of FIGS. 19 and 20, when the rebar tying robot 100 repeatedly performs the tying work on the intersecting points of the primary rebar R1' and the secondary rebars R2, every other intersecting point of the primary rebar R1' and the secondary rebars R2 may be tied. In this case, the intersecting points which the rebar tying robot 100 targets for the tying work may be selected so that at least one of each pair of adjacent intersecting points is tied as the result of the repeated tying work.

(Rebar Tracing Control)

Figure 24:
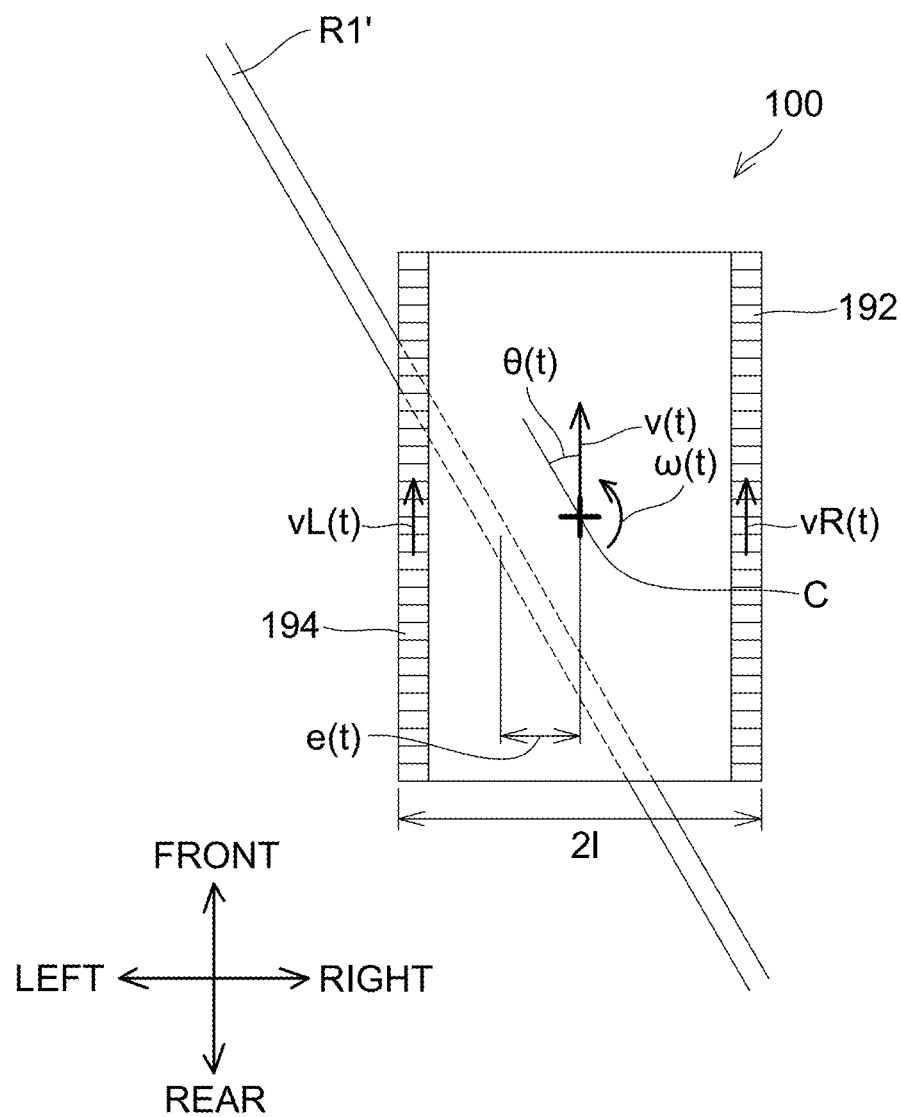
FIG. 24 is a top view showing an example of a relative positional relationship of the rebar tying robot 100 of the embodiment and a primary rebar R1'.

When the rebar tying robot 100 is to be moved, the control unit 126 determines a moving speed vR(t) of the right crawler 192 and a moving speed vL(t) of the left crawler 194, and rotates the right crawler motor 228 at a rotary speed corresponding to the moving speed vR(t) of the right crawler 192 and rotates the left crawler motor 254 at a rotary speed corresponding to the moving speed vL(t) of the left crawler 194. As shown in FIG. 24, a moving velocity v(t) in the forward direction and an angular velocity ω(t) of rotation about the up-down direction of the rebar tying robot 100 realized in this case are respectively given by the following equations:

$$v(t)=(vR(t)+vL(t))/2 \quad (1)$$

$$\omega(t)=(vR(t)-vL(t))/2l \quad (2)$$

where 2l is a distance between the right crawler 192 and the left crawler 194.

In the rebar tracing control executed in the processes of FIGS. 19 and 20, the control unit 126 determines vR(t) and vL(t) such that the reference position and reference angle of the rebar tying robot 100 become closer to the position and angle of the primary rebar R1' in the left-right direction. Specifically, the control unit 126 calculates vR(t) and vL(t) respectively in the following equations:

$$vR(t)=v\text{const}+\Delta v(t) \quad (3)$$

$$vL(t)=v\text{const}-\Delta v(t) \quad (4)$$

where vconst is a constant value and Δv(t) is a correction amount for bringing the reference position and reference angle of the rebar tying robot 100 closer to the position and angle of the primary rebar R1' in the left-right direction.

When vR(t) and vL(t) are given by the above equations (3), (4), the velocity v(t) and the angular velocity ω(t) realized by the rebar tying robot 100 are represented by the following equations:

$$v(t)=v\text{const} \quad (5)$$

$$\omega(t)=\Delta v(t)/l \quad (6)$$

As shown in FIG. 24, when the position of the primary rebar R1' in the left-right direction (amount of displacement from the reference position) is e(t) and the angle of the primary rebar R1' (amount of displacement from the reference angle) is θ(t), the control unit 126 calculates the correction amount Δv(t) by the following equation:

$$\Delta v(t)=k1 \times e(t)+k2 \times e'(t)+k3 \times \theta(t)+k4 \times \theta'(t) \quad (7)$$

where e'(t) is a time differential value of e(t), θ'(t) is a time differential value of θ(t), and each of k1, k2, k3, and k4 is a positive fixed number.

As it is apparent from FIG. 24, if an angular velocity $\omega(t)(=\Delta v(t)/l)$ is given when the rebar tying robot 100 moves forward at a speed v, e(t) and θ(t) both approach zero as the rebar tying robot 100 moves forward. Due to this, by giving the correction amount Δv(t) as in the above equation (7), the reference position and reference angle of the rebar tying robot 100 can be brought closer to the position and angle of the primary rebar R1' in the left-right direction.

Figure 25:
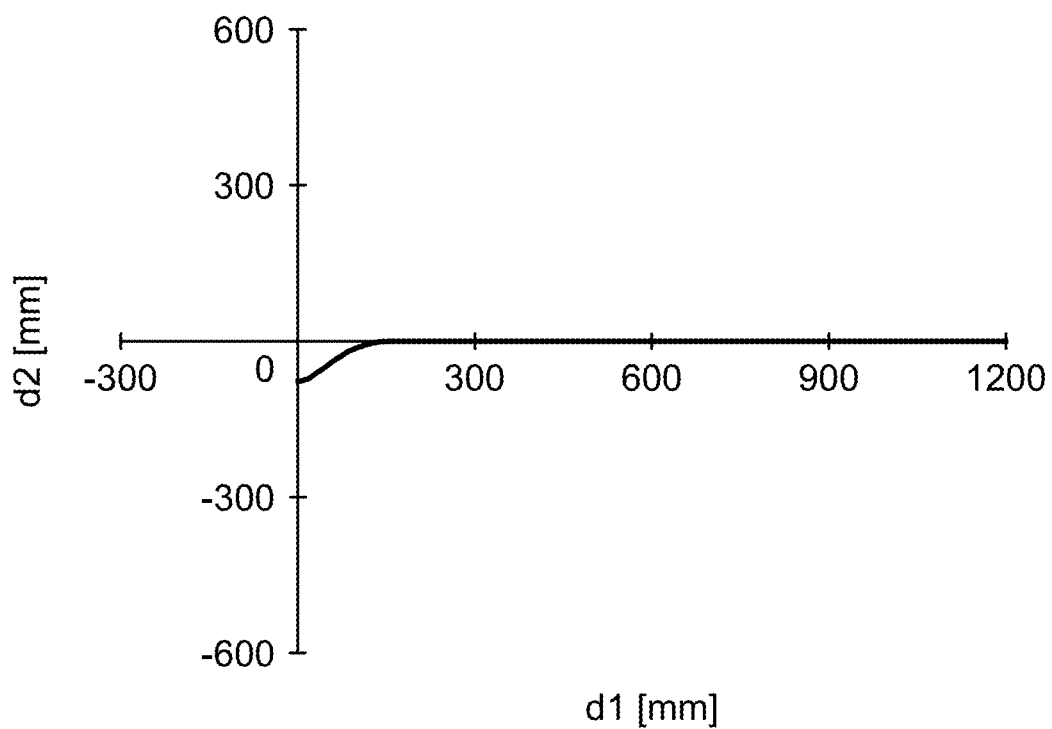
FIG. 25 is a graph showing an example of a trajectory of the rebar tying robot 100 of the embodiment in rebar tracing control.
Figure 26:
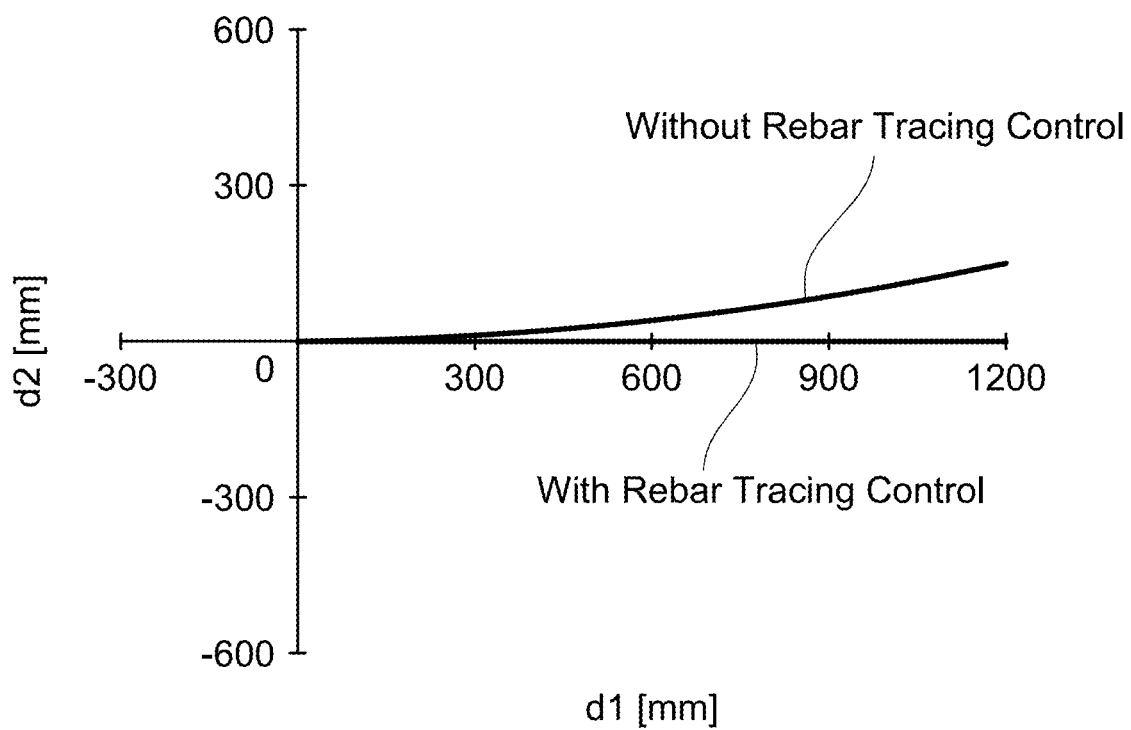
FIG. 26 is a graph showing an example of a difference in trajectories in the rebar tying robot 100 of the embodiment that occurs due to presence and absence of the rebar tracing control.
Figure 27:
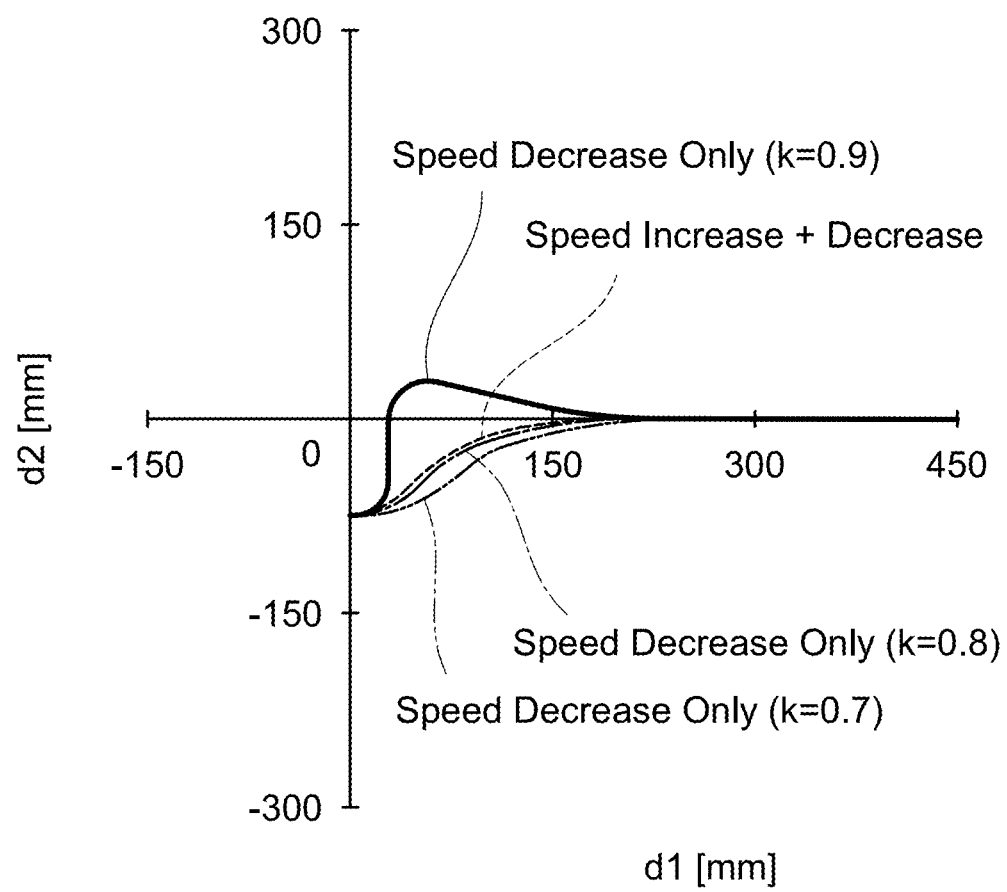
FIG. 27 is a graph showing an example of differences in trajectories of the rebar tying robot 100 of the embodiment in various types of rebar tracing control.

FIG. 25 shows as an example a trajectory of the rebar tying robot 100 moving forward by the rebar tracing control in the case where a predetermined amount of displacement is present between the reference position of the rebar tying robot 100 and the position of the primary rebar R1' in the left-right direction. In FIGS. 25 to 27, d1 [mm] indicates positions in a direction along the primary rebar R1' and d2 [mm] indicates positions in a direction perpendicular to the direction along the primary rebar R1'. As shown in FIG. 25, by executing the rebar tracing control, the amount of displacement between the reference position of the rebar tying robot 100 and the position of the primary rebar R1' in the left-right direction is resolved, and the rebar tying robot 100 can move along the primary rebar R1'.

FIG. 26 shows as another example a trajectory of the rebar tying robot 100 moving forward when the right crawler 192 operates normally but the left crawler 194 slips. When the left crawler 194 slips, an actual moving speed of the left crawler 194 becomes slower, thus as shown in FIG. 26, the rebar tying robot 100 gradually deviates away from the primary rebar R1' toward the left side as the rebar tying robot 100 moves forward should no rebar tracing control be executed. Unlike this case, when the rebar tracing control is executed, the correction amount Δv(t) is given to bring the reference position and reference angle of the rebar tying robot 100 closer to the position and angle of the primary rebar R1' in the left-right direction even if the left crawler 194 is slipping, thus the rebar tying robot 100 does not separate away from the primary rebar R1' and can move forward along the primary rebar R1'.

When vR(t) and vL(t) are given by the above equations (3) and (4), vR(t) and vL(t) may take values exceeding vconst. Due to this, it is necessary to prepare motors capable of high-speed operation as the right crawler motor 228 and the left crawler motor 254, which may adversely increases the size and weight of the right crawler motor 228 and the left crawler motor 254.

As such, vR(t) and vL(t) may be given as follows instead of the above equations (3) and (4). That is, after Δv is calculated by the above equation (7), the following may be used when Δv≥0:

$$vR(t)=v\text{const} \quad (8)$$

$$vL(t)=v\text{const}-2\Delta v(t) \quad (9)$$

and if Δv<0:

$$vR(t)=v\text{const}+2\Delta v(t) \quad (10)$$

$$vL(t)=v\text{const} \quad (11)$$

When vR(t) and vL(t) are given by the above equations (8), (9), (10), (11), vR(t) and vL(t) will never exceed vconst, thus motors that can rotate at vconst may be prepared as the right crawler motor 228 and the left crawler motor 254, and the sizes and weights of the right crawler motor 228 and the left crawler motor 254 can be suppressed from increasing.

When vR(t) and vL(t) are given by the above equations (8), (9), (10), (11), the velocity v(t) and angular velocity ω(t) realized by the rebar tying robot 100 are expressed in the following equations:

$$v(t)=v\text{const}-|\Delta v| \quad (12)$$

$$\omega(t)=\Delta v(t)/l \quad (13)$$

That is, when vR(t) and vL(t) are determined by the above equations (8), (9), (10), (11), the moving velocity v(t) of the rebar tying robot 100 in the forward direction decreases by |Δv| from vconst. Due to this, if |Δv| becomes greater than vconst, the rebar tying robot 100 starts to move not forward but rearward.

As such, in the present embodiment, upper and lower limits are given to Δv(t) as in the following equation:

$$|\Delta v(t)|<k \times v\text{const} \quad (14)$$

where 0<k≤1.

FIG. 27 shows trajectories of the rebar tying robot 100 in the case where vR(t) and vL(t) are given using the equations (3) and (4) (indicated as speed increase+decrease in FIG. 27) and the case where vR(t) and vL(t) are given using the equations (8), (9), (10), (11), and (14) (indicated as speed decrease only in FIG. 27). As shown in FIG. 27, when vR(t) and vL(t) are given by the equations (8), (9), (10), (11), and (14), the trajectory of the rebar tying robot 100 approaches the primary rebar R1' at a faster pace when the value of k in the equation (14) is set larger. However, when the value of k becomes excessively large, overshoot occurs and convergence of the trajectory of the rebar tying robot 100 is delayed. Due to this, when vR(t) and vL(t) are given using the equations (8), (9), (10), (11), and (14), it is possible to promptly bring the trajectory of the rebar tying robot 100 closer to the primary rebar R1' by setting k=0.8, for example.

(Side Step Process)

Figure 28:
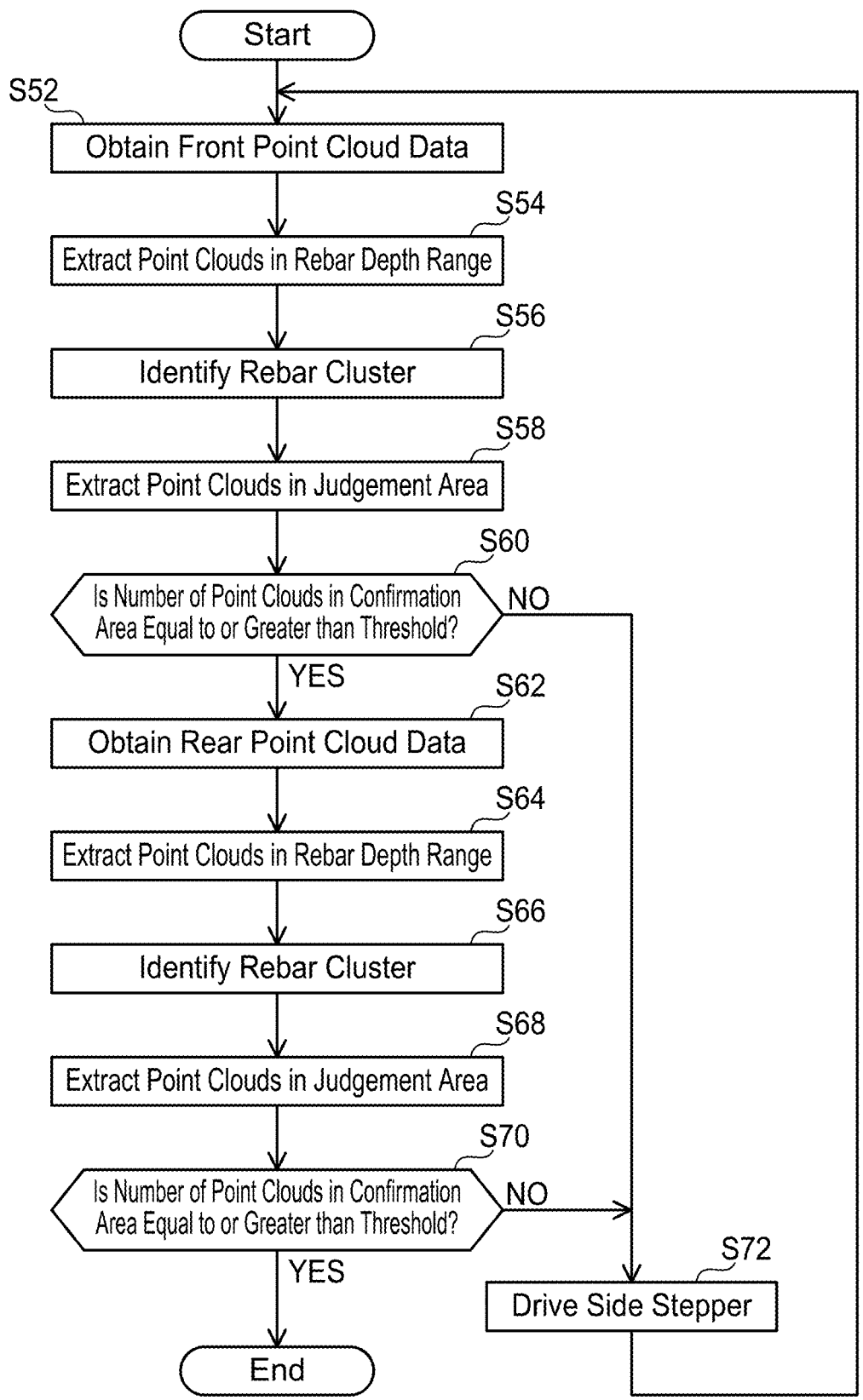
FIG. 28 is a flowchart of a side step process which the control unit 126 executes in the rebar tying robot 100 of the embodiment.

In the side step process shown in S2 of FIG. 19, the control unit 126 executes processes shown in FIG. 28. In the following explanation, the rightward direction is termed X direction, the frontward direction is termed Y direction, and the upward direction is termed Z direction with the rebar tying robot 100 as the reference, and the reference position of the rebar tying robot 100 is expressed as X0, Y0, Z0.

In S52, the control unit 126 obtains point cloud data from the front three-dimensional distance sensor 198. In the following explanation, the point cloud data obtained from the front three-dimensional distance sensor 198 may be termed front point cloud data.

In S54, the control unit 126 extracts, from the point clouds included in the front point cloud data, point clouds located at positions in the Z direction corresponding to the primary rebar R1' and the secondary rebars R2. Specifically, the control unit 126 extracts, from the point clouds included in the front point cloud data, the point clouds whose positions in the Z direction are within a predetermined rebar depth range (for example, a range whose upper end is defined by a position in the Z direction of lower surfaces of the right crawler 192 and the left crawler 194 and whose lower end is defined by a position in the Z direction that is located below the upper end by a sum of a diameter of the primary rebar R1 and a diameter of the secondary rebar R2). The front point cloud data obtained in S52 includes point clouds corresponding to the primary rebar R1' and the secondary rebars R2 as well as point clouds corresponding to, for example, the ground surface located lower than the primary rebar R1' and the secondary rebars R2. By executing the process of S54, the point clouds corresponding to the ground surface can be excluded and only the point clouds which are highly likely to correspond to the primary rebar R1' and the secondary rebars R2 can be extracted.

In S56, the control unit 126 clusters the point clouds extracted in S54, identifies a cluster with the largest number of point clouds as a rebar cluster, and extracts the point clouds included in the rebar cluster. Clustering of the point clouds is executed by, when for example a distance between points is included in a range that is a predetermined value or less, associating the points included in the point clouds to each other so that those points are included in the same cluster.

Figure 29:
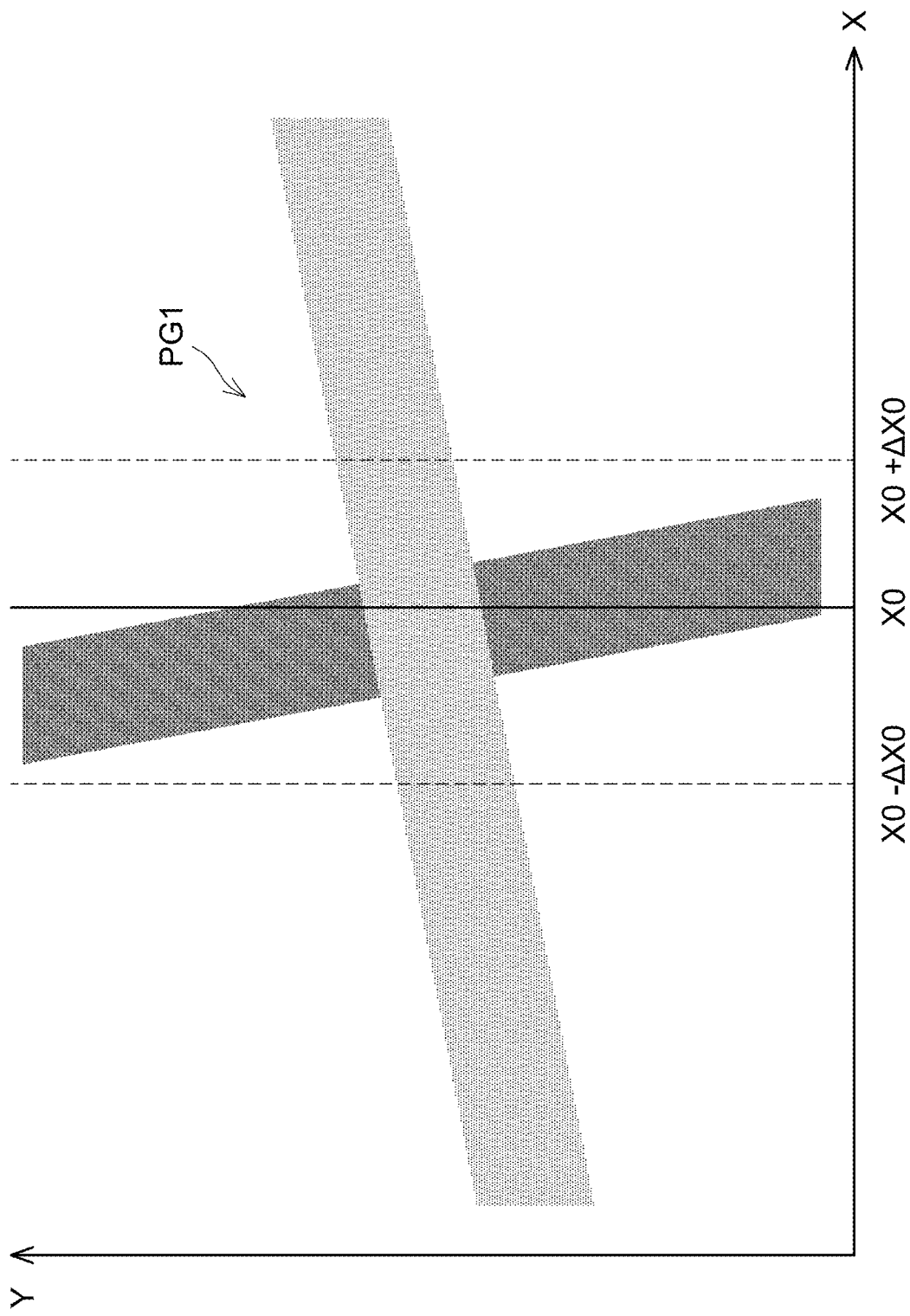
FIG. 29 schematically shows point clouds PG1 which the control unit 126 processes in the side step process in the rebar tying robot 100 of the embodiment.

In S58, the control unit 126 extracts only the point clouds that are within a predetermined judgement area from the point clouds included in the rebar cluster identified in S56. The judgement area is set for example as an area within a predetermined distance from the reference position X0 of the rebar tying robot 100 in the X direction (for example, when ΔX0 is set as 1.5 times the diameter of the primary rebar R1', the area ranges from X0+ΔX0 to X0-ΔX0). Due to this, as shown in FIG. 29, only the point clouds PG2 that are within the judgement area are extracted (see FIG. 30) from the point clouds PG1 included in the rebar cluster. In FIGS. 29, 30, 33, 34, 35, 36, 38, and 39, it should be noted that the point clouds are depicted as a hatched region, and each point constituting the point clouds is not depicted.

Figure 30:
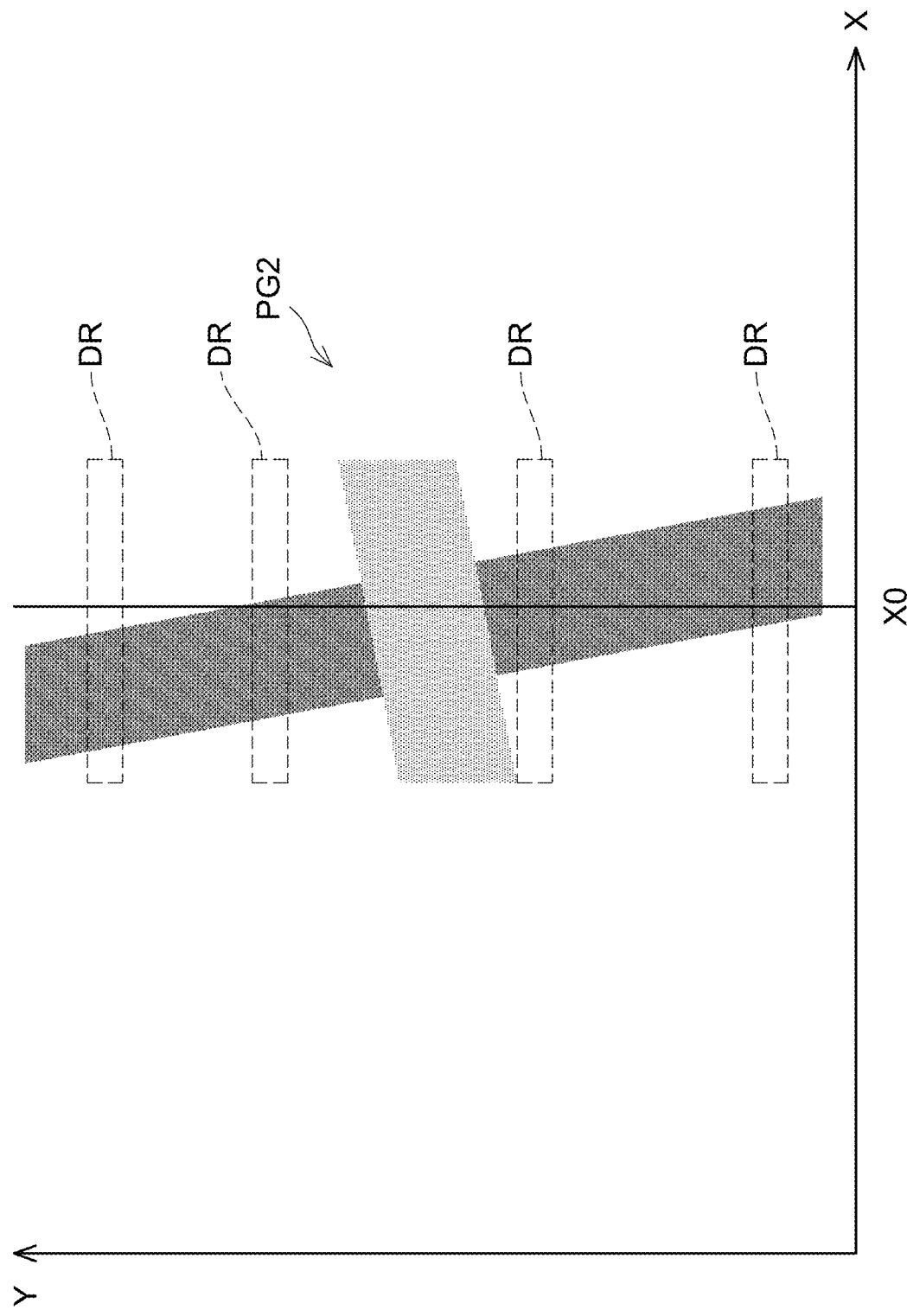
FIG. 30 schematically shows confirmation areas DR and point clouds PG2 which the control unit 126 processes in the side step process in the rebar tying robot 100 of the embodiment.

As shown in FIG. 28, in S60, the control unit 126 determines whether the number of point clouds within a confirmation area among the point clouds extracted in S58 is equal to or greater than a predetermined threshold. As shown in FIG. 30, the confirmation area DR is an area that is the same as the judgement area used in S58 in the X direction, and is an area having a predetermined length (such as 1 mm) in the Y direction. As shown in FIG. 30, in the present embodiment, a plurality of confirmation areas DR whose positions in the X direction are different is set. As shown in FIG. 28, in the case where the number of point clouds in the confirmation area does not reach the threshold in S60 (case of NO), the control unit 126 determines that the front portion of the rebar tying robot 100 is not positioned above the primary rebar R1' and the process proceeds to S72. In the case where the number of point clouds in the confirmation area is equal to or greater than the threshold (case of YES), the control unit 126 determines that the front portion of the rebar tying robot 100 is located above the primary rebar R1' and the process proceeds to S62.

In S62, the control unit 126 obtains point cloud data from the rear three-dimensional distance sensor 200. In the following explanation, the point cloud data obtained from the rear three-dimensional distance sensor 200 may be termed rear point cloud data.

In S64, similar to S54, the control unit 126 extracts, from the point clouds included in the rear point cloud data, point clouds located at positions in the Z direction corresponding to the primary rebar R1' and the secondary rebars R2.

In S66, similar to S56, the control unit 126 clusters the point clouds extracted in S64, identifies a cluster with the largest number of point clouds as a rebar cluster, and extracts the point clouds included in the rebar cluster.

In S68, similar to S58, the control unit 126 extracts only the point clouds that are within the predetermined judgement area from the point clouds included in the rebar cluster identified in S56.

In S70, similar to S60, the control unit 126 determines whether the number of point clouds within confirmation area among the point clouds extracted in S58 is equal to or greater than the predetermined threshold. In the case where the number of point clouds in the confirmation area does not reach the threshold (case of NO), the control unit 126 determines that the rear portion of the rebar tying robot 100 is not positioned above the primary rebar R1' and the process proceeds to S72.

In S72, the control unit 126 drives the side stepper 196 to move the rebar tying robot 100 rightward or leftward. After S72, the process returns to S52.

In S70, in the case where the number of point clouds in the confirmation area is equal to or greater than the threshold (case of YES), the control unit 126 determines that the front portion of the rebar tying robot 100 is located above the primary rebar R1'. In this case, both the front and rear portions of the rebar tying robot 100 are located above the primary rebar R1', and there is no further need to move the rebar tying robot 100 in the left-right direction, thus the control unit 126 terminates the process of FIG. 28.

According to the process of FIG. 28, the control unit 126 can determine whether the side step motion of the rebar tying robot 100 has been completed by using processes with a relatively small computation load.

(Primary Rebar Model Generation Process executed by Control Unit 126)

Figure 31:
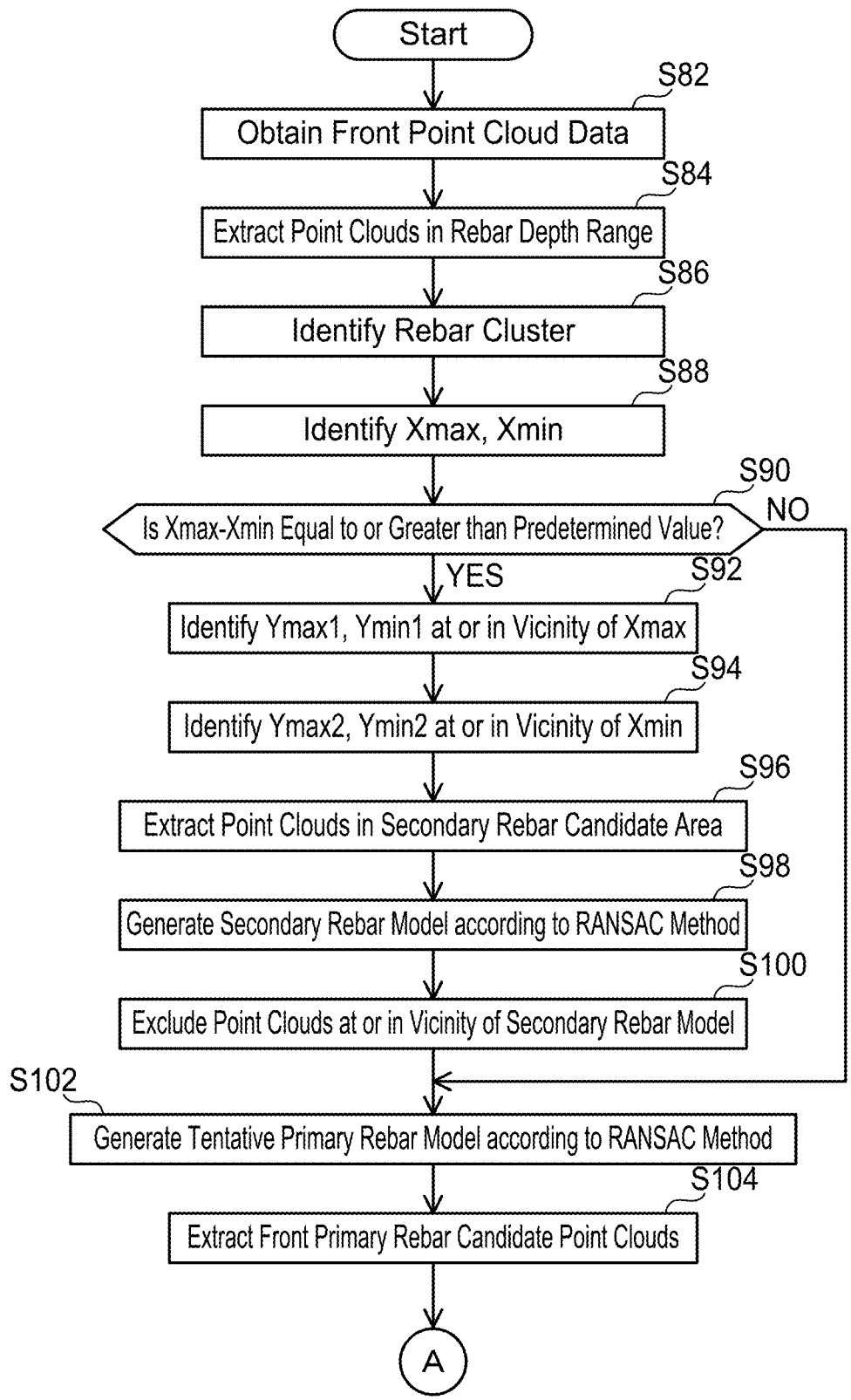
FIG. 31 is a flowchart of a primary rebar model generation process which the control unit 126 executes in the rebar tying robot 100 of the embodiment.
Figure 32:
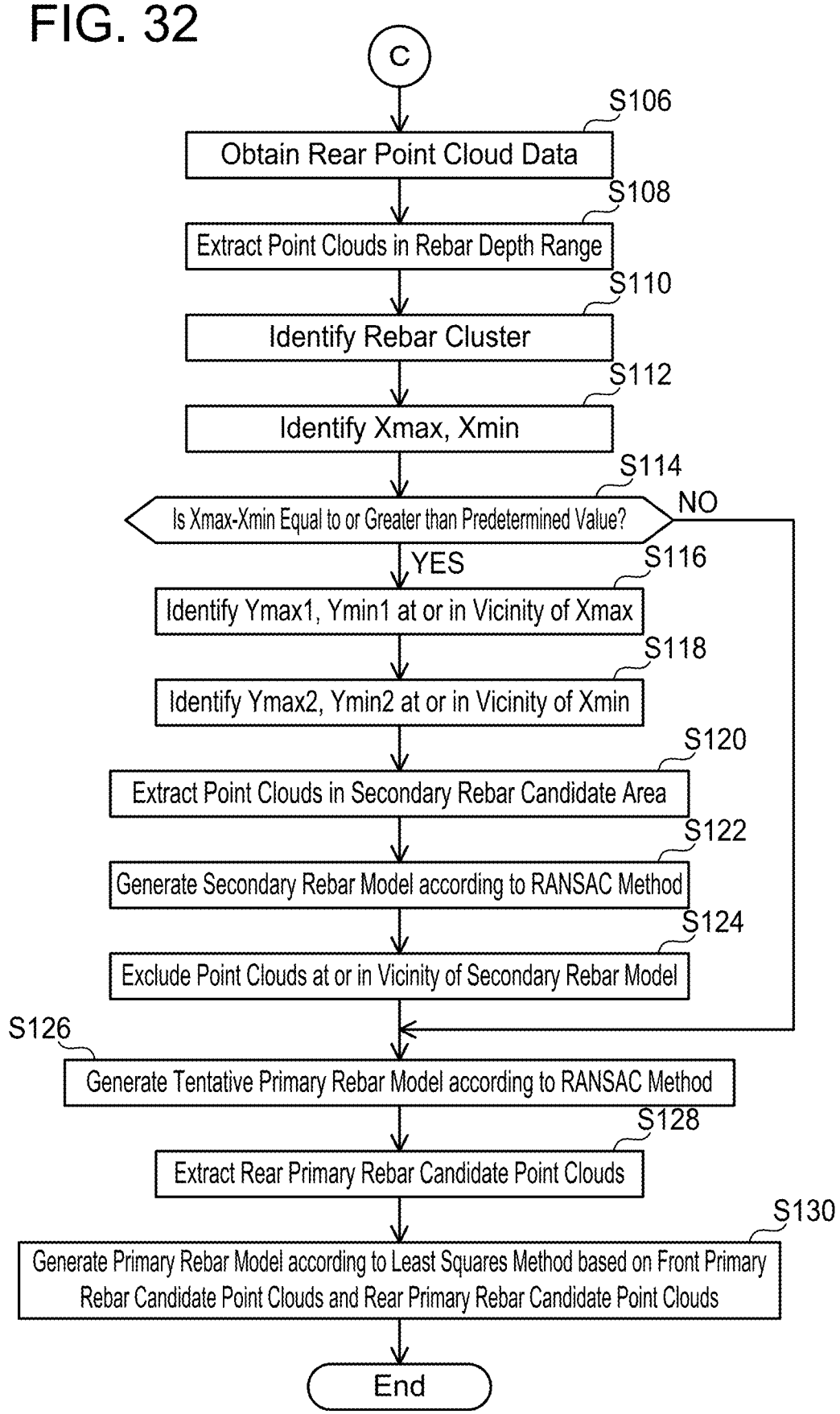
FIG. 32 is a flowchart of the primary rebar model generation process which the control unit 126 executes in the rebar tying robot 100 of the embodiment.

In the primary rebar model generation process indicated in S4 and S12 of FIG. 19 and S24 of FIG. 20, the control unit 126 executes processes indicated in FIGS. 31 and 32.

As shown in FIG. 31, in S82, the control unit 126 obtains front point cloud data from the front three-dimensional distance sensor 198.

In S84, the control unit 126 extracts, from the point clouds included in the front point cloud data, the point clouds whose positions in the Z-direction are within a predetermined rebar depth range.

In S86, the control unit 126 clusters the point clouds extracted in S84, identifies a cluster with the largest number of point clouds as a rebar cluster, and extracts the point clouds included in the rebar cluster.

In S88, the control unit 126 identifies a maximum value Xmax and a minimum value Xmin of positions in the X direction of the point clouds included in the rebar cluster identified in S86.

In S90, the control unit 126 determines whether a difference between Xmax and Xmin identified in S88 is equal to or greater than a predetermined value (such as 3 times the diameter of the primary rebar R1'). In the case where the difference between Xmax and Xmin does not reach the predetermined value (case of NO), the control unit 126 determines that the rebar cluster identified in S86 does not include point clouds corresponding to the secondary rebar R2, and the process proceeds to S102. In the case where the difference between Xmax and Xmin is equal to or greater than the predetermined value (case of YES), the control unit 126 determines that the point clouds corresponding to the secondary rebar R2 are included in the rebar cluster identified in S86, and the process proceeds to S92.

In S92, the control unit 126 identifies a maximum value Ymax1 and a minimum value Ymin1 of positions in the Y direction of the point clouds, which are included in the rebar cluster identified in S86 and whose positions in the X direction are close to Xmax.

In S94, the control unit 126 identifies a maximum value Ymax2 and a minimum value Ymin2 of positions in the Y direction of the point clouds, which are included in the rebar cluster identified in S86 and whose positions in the X direction are close to Xmin.

Figure 33:
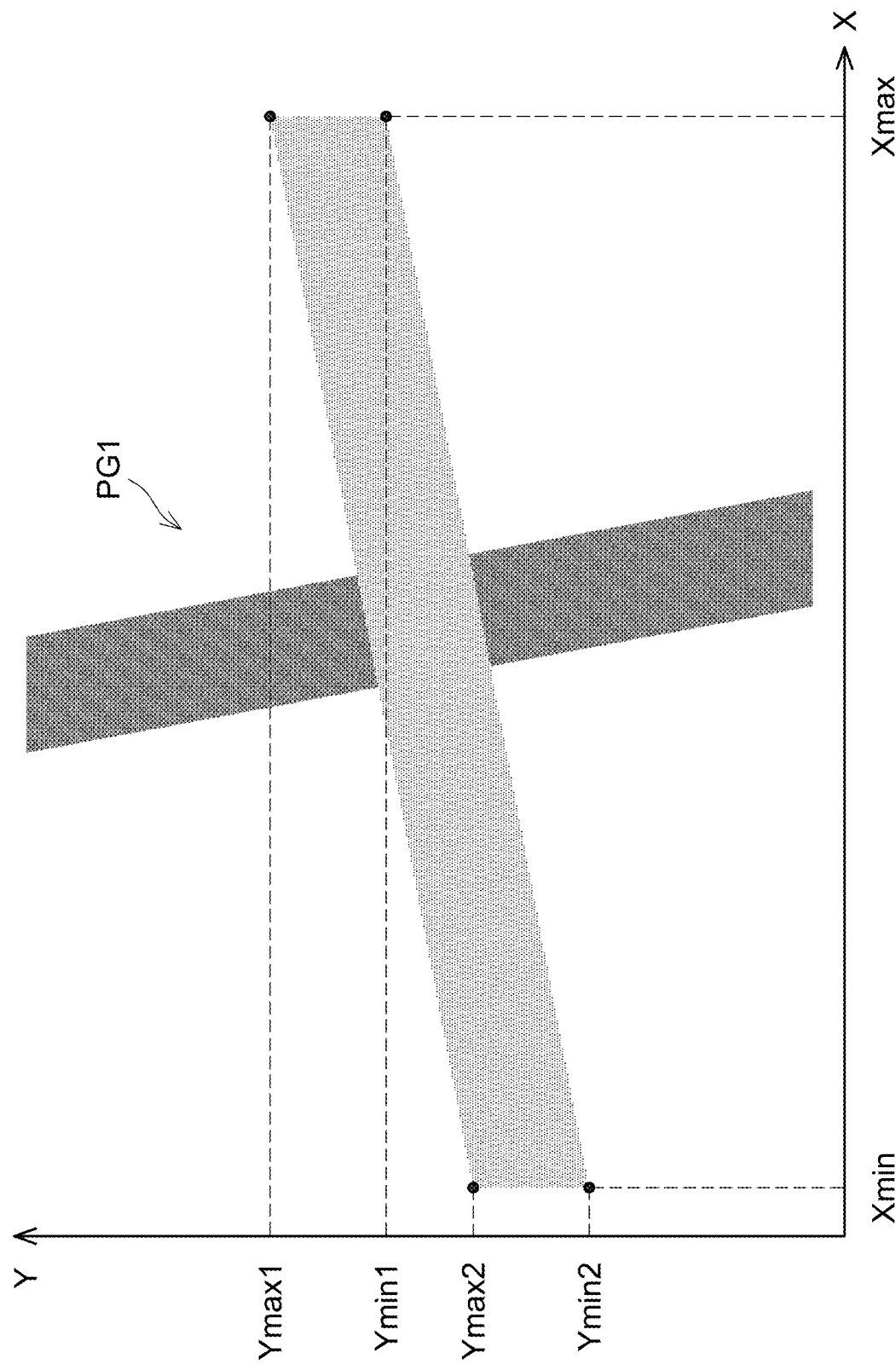
FIG. 33 schematically shows point clouds PG1 which the control unit 126 processes in the primary rebar model generation process in the rebar tying robot 100 of the embodiment.

In S96, the control unit 126 extracts, from the point clouds included in the rebar cluster identified in S86, only the point clouds that are within a predetermined secondary rebar candidate area. The secondary rebar candidate area is for example set to an area ranging from Xmax to Xmin in the X direction and ranging from the larger one of Ymax1 and Ymax2 to the smaller one of Ymin1 and Ymin2 in the Y direction. Due to this, as shown in FIG. 33, only the point clouds PG2 that are within the secondary rebar candidate area are extracted from the point clouds PG1 included in the rebar cluster (see FIG. 34).

Figure 34:
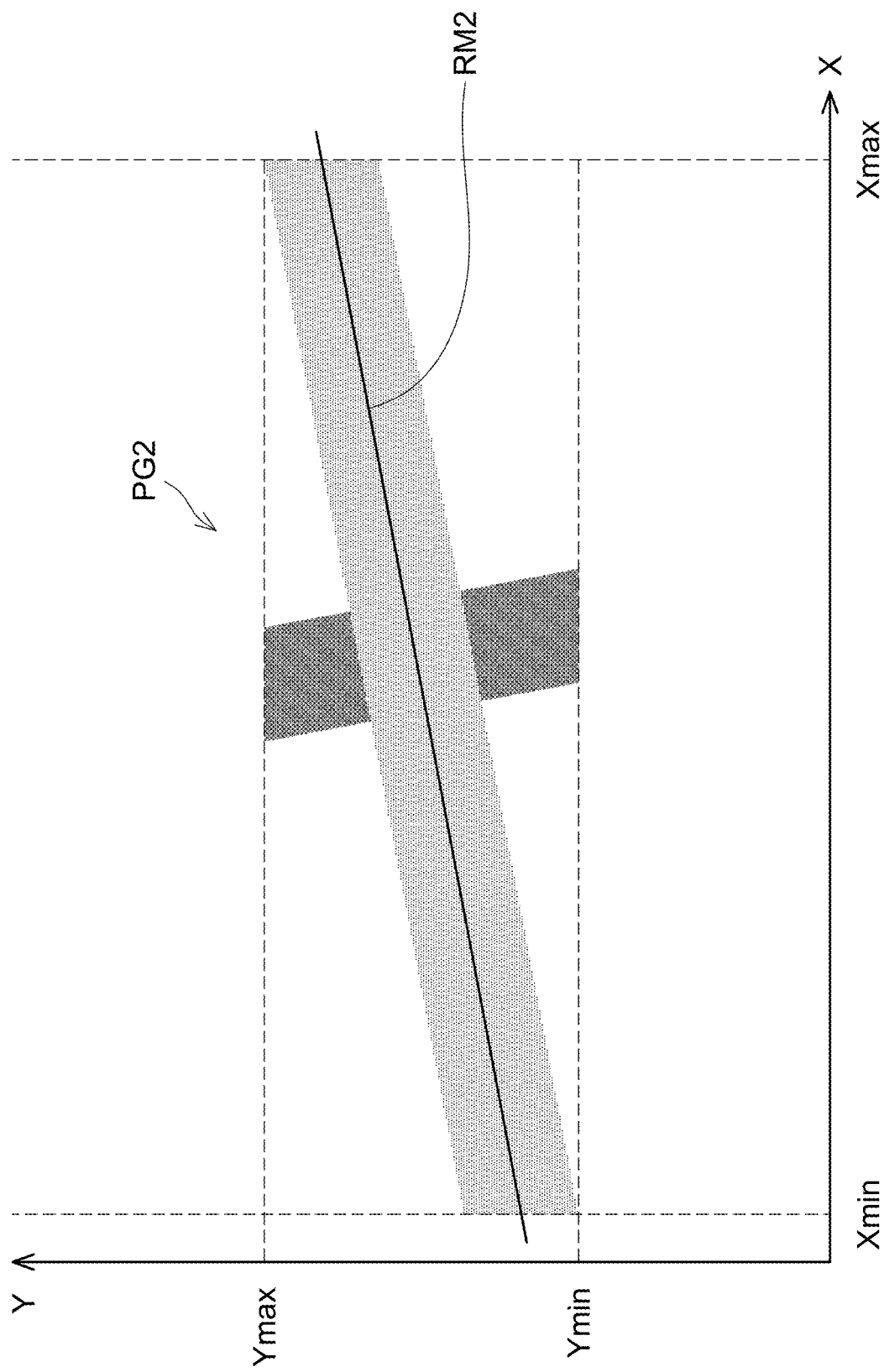
FIG. 34 schematically shows point clouds PG2 and a secondary rebar model RM2 which the control unit 126 processes in the primary rebar model generation process in the rebar tying robot 100 of the embodiment.

In S98, the control unit 126 generates a secondary rebar model in which a position and an angle of a secondary rebar R2 as viewed from the rebar tying robot 100 are modeled by a linear line, according to a Random Sample Consensus (RANSAC) method based on the point clouds extracted in S96. Details of rebar model generation by the RANSAC method will be described later. As shown in FIG. 34, the secondary rebar model RM2 is generated according to the above based on the point clouds PG2 within the secondary rebar candidate area.

Figure 35:
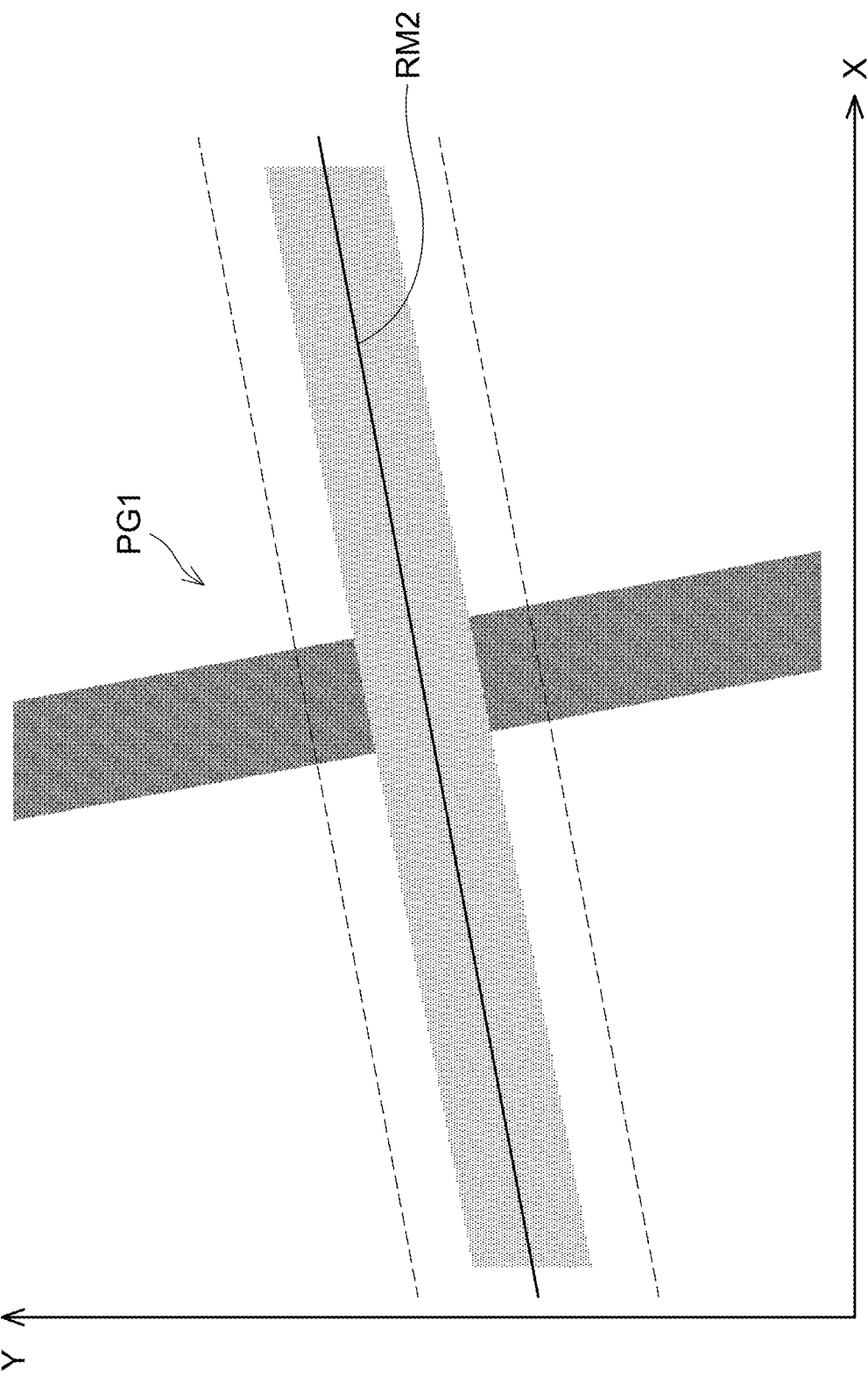
FIG. 35 schematically shows the point clouds PG1 and the secondary rebar model RM2 which the control unit 126 processes in the primary rebar model generation process in the rebar tying robot 100 of the embodiment.

In S100, the control unit 126 removes point clouds that are located at or in the vicinity of the secondary rebar model generated in S98 from the point clouds included in the rebar cluster identified in S86, and extracts remaining point clouds. The point clouds located at or in the vicinity of the secondary rebar model hereof refer to the point clouds whose distance from the secondary rebar model in a direction perpendicular to the secondary rebar model is smaller than a predetermined value (for example, 1 times the diameter of the secondary rebars R2). According to the above, as shown in FIG. 35, point clouds PG3 obtained by removing the point clouds located at or in the vicinity of the secondary rebar model RM2 from the point clouds PG1 included in the rebar cluster are extracted (see FIG. 36).

Figure 36:
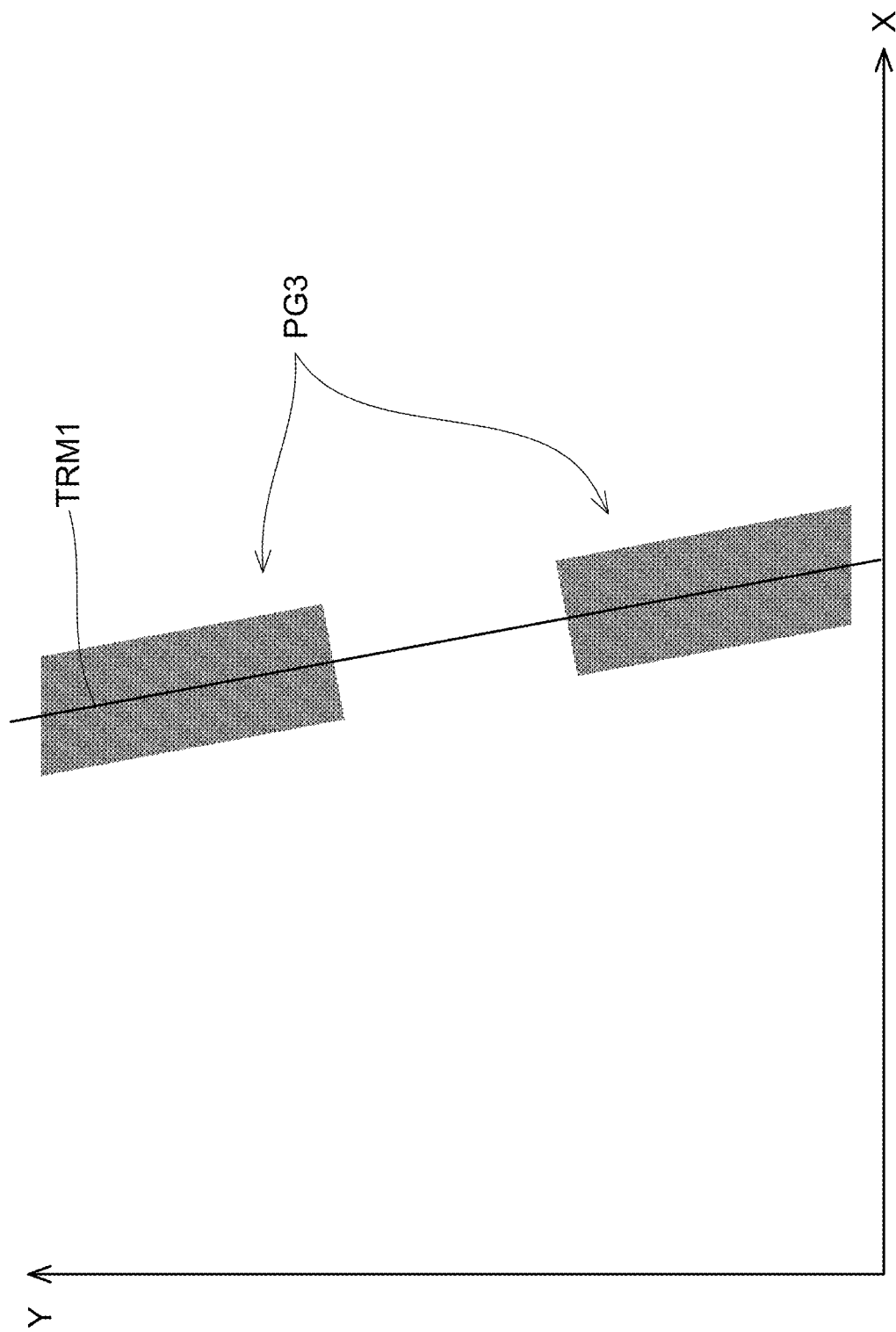
FIG. 36 schematically shows point clouds PG3 and a tentative primary rebar model TRM1 which the control unit 126 processes in the primary rebar model generation process in the rebar tying robot 100 of the embodiment.

In S102, the control unit 126 generates a tentative primary rebar model using the RANSAC method based on the point clouds extracted in S100 (or in the case of NO in S90, the point clouds included in the rebar cluster identified in S86). Due to this, as shown in FIG. 36, the tentative primary rebar model TRM1 is generated from the point clouds PG3.

In S104, the control unit 126 extracts, from the point clouds extracted in S100, the point clouds used in generating the tentative primary rebar model TRM1 in S102 (that is, the point clouds that were not determined as outliers in the RANSAC method) as point clouds being a candidate of the primary rebar R1'. The point clouds extracted in S104 may hereinbelow be termed front primary rebar candidate point clouds.

Next, as shown in FIG. 32, in S106, the control unit 126 obtains rear point cloud data from the rear three-dimensional distance sensor 200.

Processes from S108 to S128 executed in connection to the rear point cloud data are the same as the processes of S84 to S104 executed in connection to the front point cloud data, thus the explanation thereof will be omitted. Point clouds extracted in S128 may hereinbelow be termed rear primary rebar candidate point clouds.

In S130, a primary rebar model is generated using a least square method based on the front primary rebar candidate point clouds obtained in S104 and the rear primary rebar candidate point clouds obtained in S128. When the primary rebar model is generated in S130, the processes of FIGS. 28 and 29 are terminated.

In the process of S130, the primary rebar model may be generated using the RANSAC method instead of the least square method. However, when the RANSAC method is used, if there is a difference in the number of the front primary rebar candidate point clouds and the number of the rear primary rebar candidate point clouds, the primary rebar candidate point clouds having the smaller number could be handled as outliers, and they may not be used in generating the primary rebar model. As above, by generating the primary rebar model using the least square method, a more accurate primary rebar model can be obtained.

(Intersecting Position Identification Process Executed by Control Unit 126)

Figure 37:
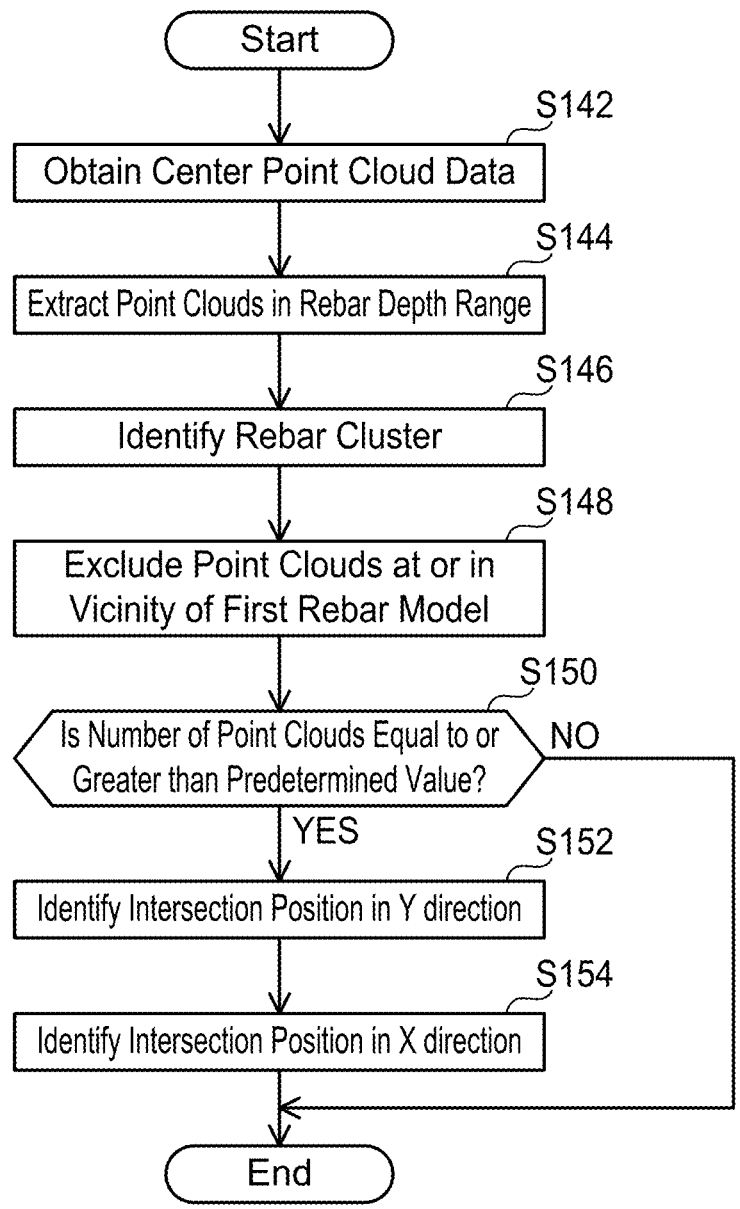
FIG. 37 is a flowchart of an intersecting position identification process which the control unit 126 executes in the rebar tying robot 100 of the embodiment.

In the intersecting position identification process indicated in S26 of FIG. 20, the control unit 126 executes processes shown in FIG. 37.

In S142, the control unit 126 obtains point cloud data from the central three-dimensional distance sensor 202. In the following explanation, the point cloud data obtained from the central three-dimensional distance sensor 202 may be termed central point cloud data.

In S144, the control unit 126 extracts point clouds whose positions in the Z direction are within the predetermined rebar depth range from the point clouds included in the central point cloud data.

In S146, the control unit 126 clusters the point clouds extracted in S144, identifies a cluster with the largest number of point clouds as a rebar cluster, and extracts the point clouds included in the rebar cluster.

Figure 38:
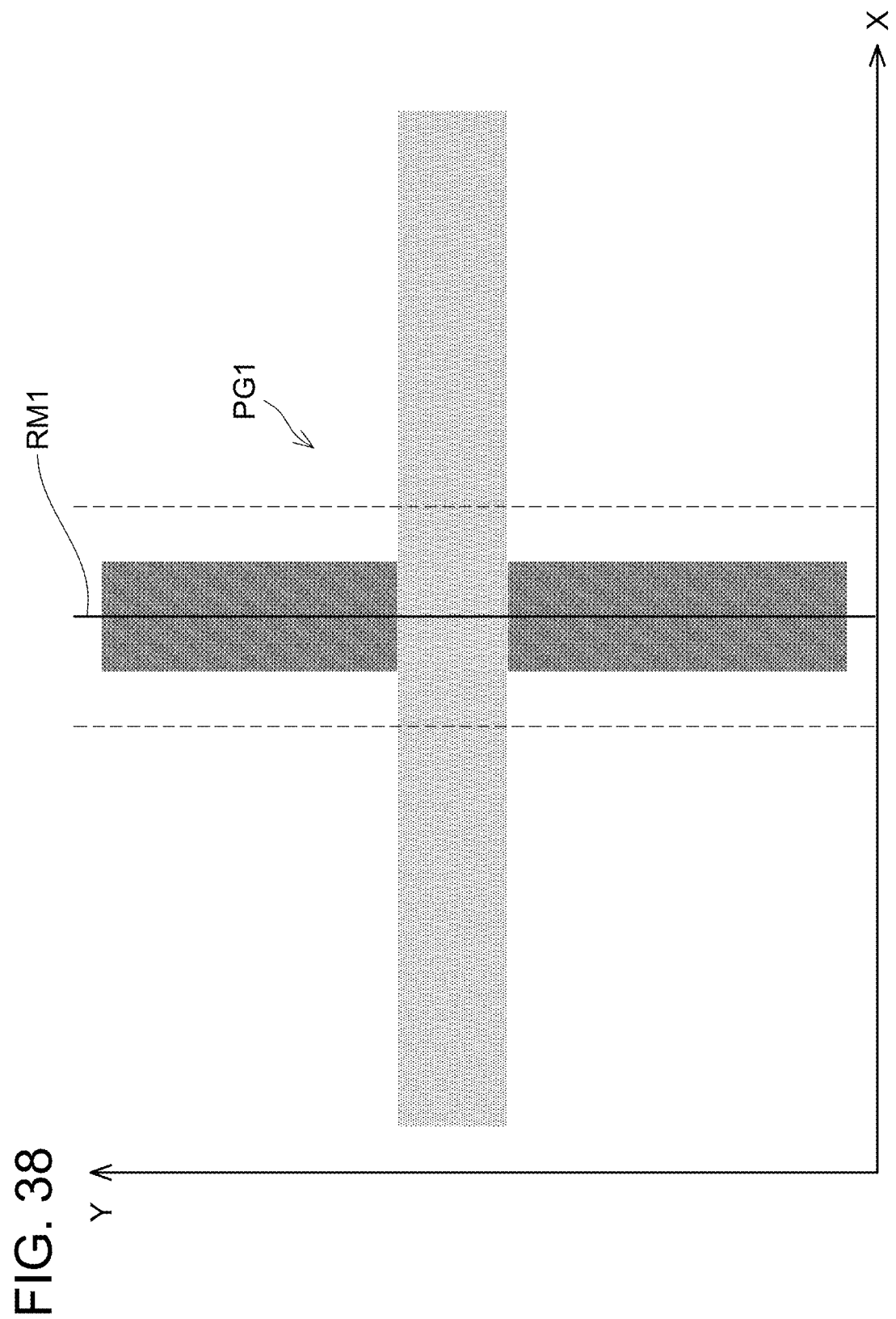
FIG. 38 schematically shows point clouds PG1 and a primary rebar model RM1 which the control unit 126 processes in the intersecting position identification process in the rebar tying robot 100 of the embodiment.

In S148, the control unit 126 removes point clouds that are located at or in the vicinity of the primary rebar model generated in S24 (see FIG. 20) from the point clouds included in the rebar cluster identified in S146, and extracts remaining point clouds. The point clouds located at or in the vicinity of the primary rebar model hereof refer for example to the point clouds whose distance from the primary rebar model in a direction perpendicular to the primary rebar model is smaller than a predetermined value (for example, 1 times the diameter of the primary rebar R1'). According to the above, as shown in FIG. 38, point clouds PG2 obtained by removing the point clouds located at or in the vicinity of the primary rebar model RM1 from the point clouds PG1 included in the rebar cluster are extracted (see FIG. 39).

In S150, the control unit 126 determines whether the number of the point clouds extracted in S148 is equal to or greater than a predetermined number. When the number of the point clouds does not reach the predetermined number (case of NO), the control unit 126 determines that the intersecting point of the primary rebar R1' and the secondary rebar R2 is not present within the field of view of the central three-dimensional distance sensor 202. In this case, the process of FIG. 30 is terminated without the control unit 126 identifying the position of the intersecting point. In the case where the number of the point clouds is equal to or greater than the predetermined number in S150 (case of YES), the process proceeds to S152.

In S152, the control unit 126 identifies Yc, which is a position in the Y direction of the intersecting point of the primary rebar R1' and the secondary rebar R2, based on the point clouds extracted in S148. For example, Yc is calculated as an average value Ymean of the positions in the Y-direction of the point clouds extracted in S148.

Figure 39:
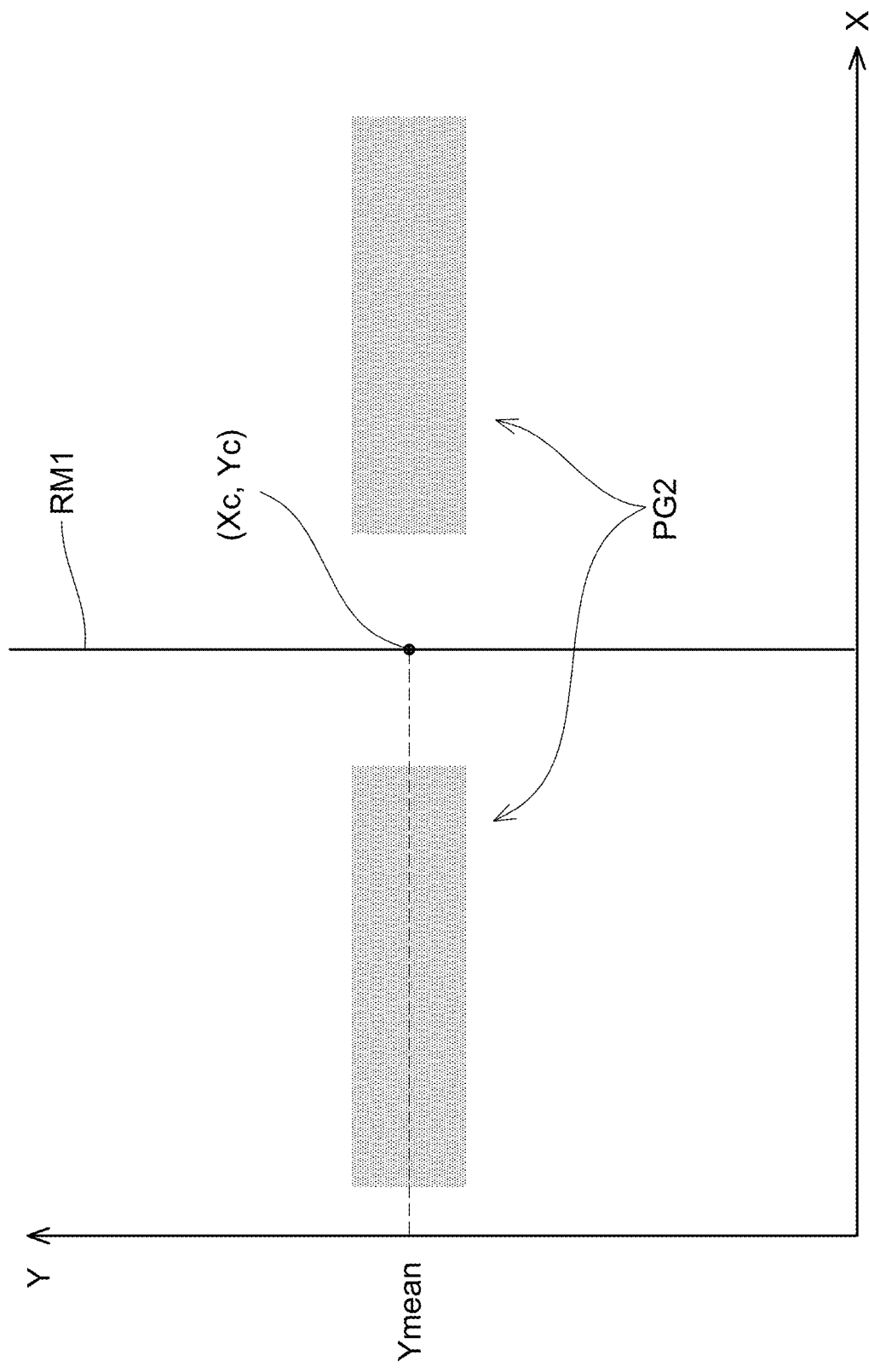
FIG. 39 schematically shows point clouds PG2 and the primary rebar model RM1 which the control unit 126 processes in the intersecting position identification process in the rebar tying robot 100 of the embodiment.

In S154, the control unit 126 identifies Xc, which is a position in the X direction of the intersecting point of the primary rebar R1' and the secondary rebar R2, based on the primary rebar model generated in S24 (see FIG. 20) and Yc identified in S152. For example, Xc is identified as a position in the X direction of a point on the primary rebar model when a position in the Y direction is Yc. According to the above, as shown in FIG. 39, the position Xc, Yc of the intersecting point of the primary rebar R1' and the secondary rebar R2 is identified. After S154, the process of FIG. 30 is terminated.

In the process of S152, Yc may be identified by the least square method instead of calculating the average value Ymean of the positions in the Y direction. In this case, Yc can be identified by assuming a linear line perpendicular to a linear line represented by the primary rebar model as the secondary rebar model and calculating an intersecting point of the primary rebar model and the secondary rebar model by the least square method based on the point clouds extracted in S150. However, as described above, by identifying Yc by calculating the average value Ymean of the positions in the Y direction, the load of the processes which the control unit 126 executes can be reduced.

(Generation of Rebar Model Using RANSAC Method)

As described above, in the present embodiment, the control unit 126 estimates a correct linear model (tentative primary rebar model, secondary rebar model, and the like) from the point clouds including the outliers according to the RANSAC method, which is one of robust estimation algorithms.

Figure 40:
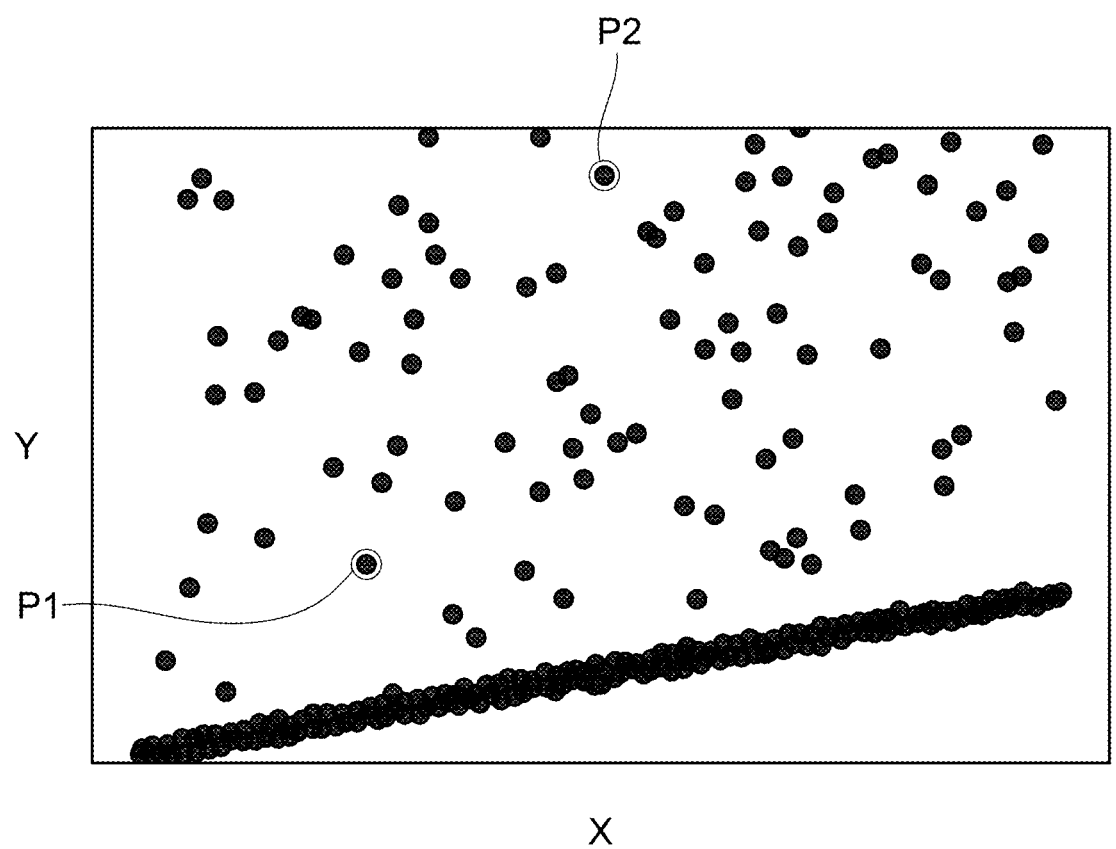
FIG. 40 schematically shows how the control unit 126 generates a rebar model according to a RANSAC method in the rebar tying robot 100 of the embodiment.

Firstly, as shown in FIG. 40, the control unit 126 randomly extracts two or more points (such as P1 and P2) as modeling reference points from the point clouds.

Figure 41:
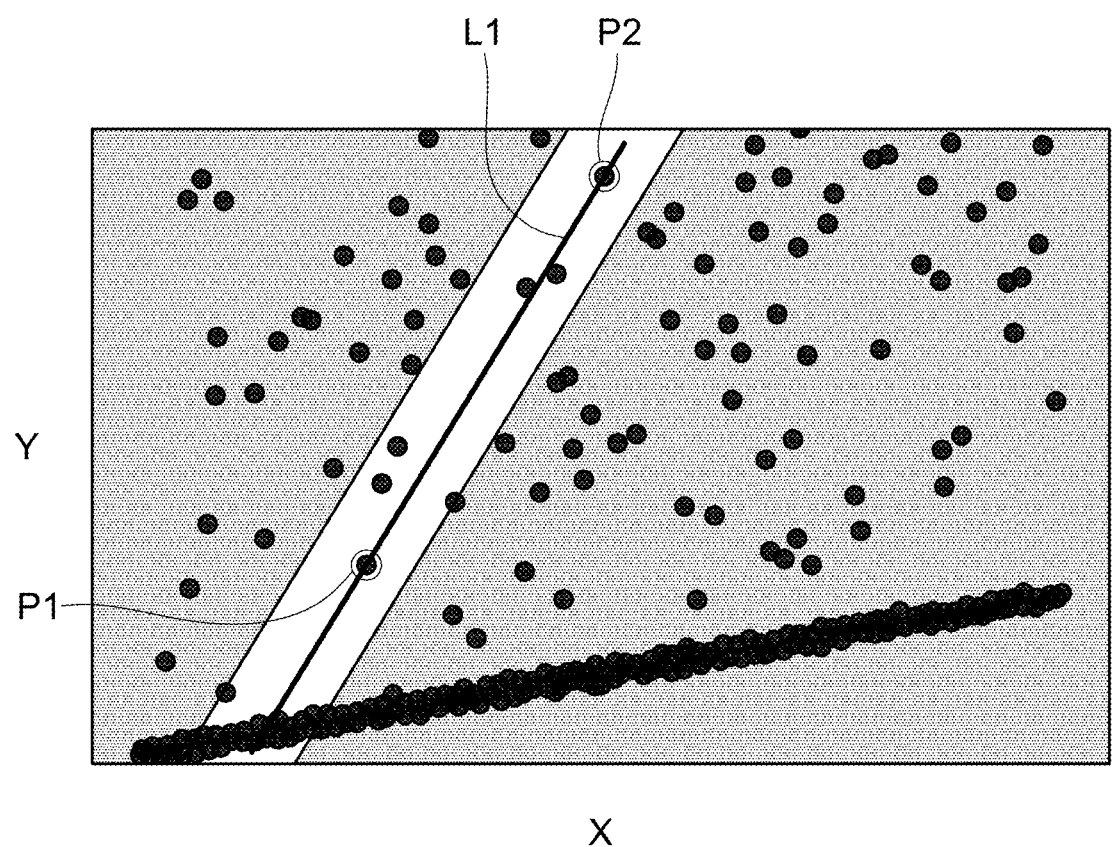
FIG. 41 schematically shows how the control unit 126 generates the rebar model according to the RANSAC method in the rebar tying robot 100 of the embodiment.

Then, as shown in FIG. 41, the control unit 126 estimates a linear model (such as L1) using the least square method, for example, based on the extracted modeling reference points P1, P2. Further, the control unit 126 counts the number of outliers obtained when the estimated linear model L1 is applied to the original point clouds. In an example shown in FIG. 41, among the original point clouds, the number of points whose distance from the estimated linear model L1 is equal to or greater than a predetermined value (points within the hatched area in the figure) is counted as the number of outliers.

Figure 42:
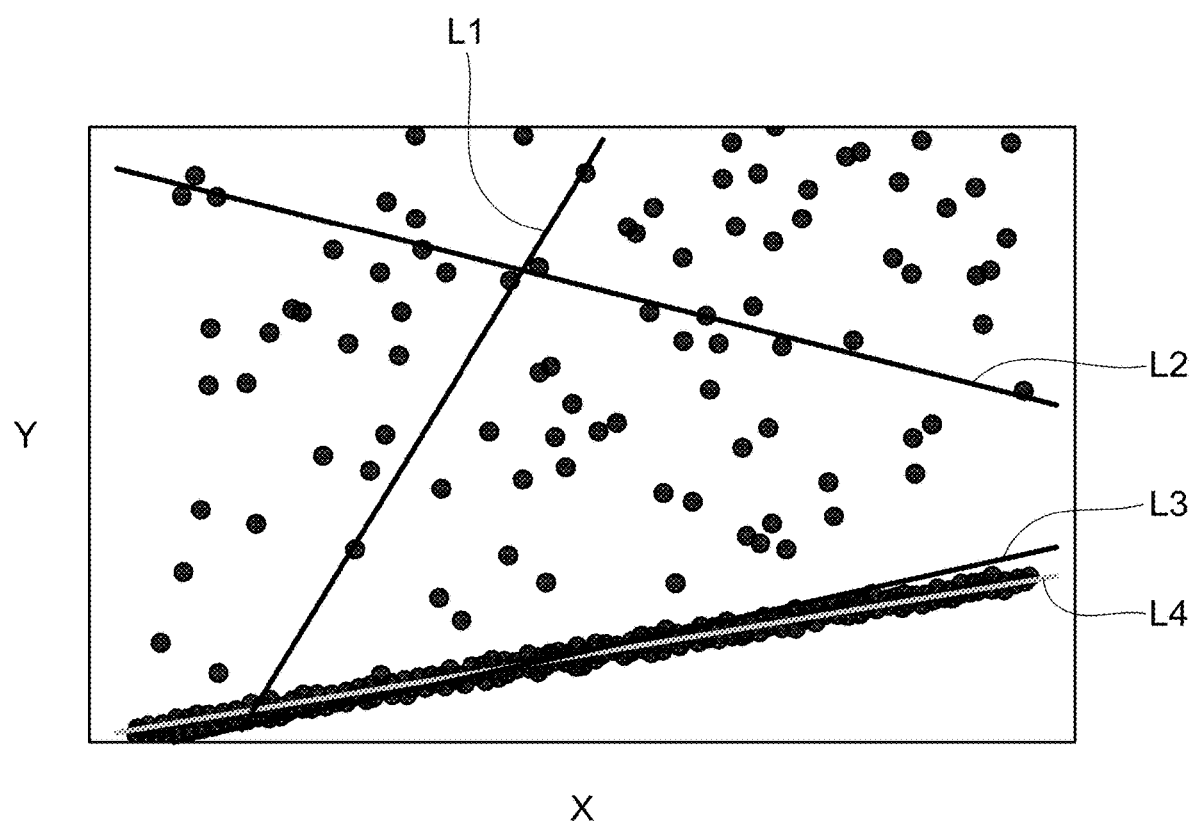
FIG. 42 schematically shows how the control unit 126 generates the rebar model according to the RANSAC method in the rebar tying robot 100 of the embodiment.

Further, as shown in FIG. 42, the control unit 126 repeatedly executes random extraction of the modeling reference points and the linear model estimation as described above, and selects candidates of a correct linear model. In the example shown in FIG. 42, linear models L1, L2 are excluded from the candidates because they have a large number of outliers, and the linear models L3, L4 are selected as the candidates because they have a small number of outliers. Further, the control unit 126 estimates, from the correct linear model candidates L3, L4, a linear model with less error with respect to the original point clouds (excluding the outliers) as the correct linear model. In the example shown in FIG. 42, among the linear models L3, L4, the linear model L4 with less error with respect to the original point clouds that excluded the outliers is estimated as the correct linear model.

(Variants)

In the above embodiment, the configuration in which the reel 10 is attached to the rebar tying machine 2 and the rebar tying machine 2 ties the rebars R using the wire W fed out from the reel 10 was described. Unlike this configuration, a configuration in which a wire supplying unit (not shown) including a large-sized reel (not shown) is mounted on the conveying unit 106 of the rebar tying robot 100 and the rebar tying machine 2 ties the rebars R using the wire W supplied from the wire supplying unit may be employed.

In the above embodiment, the case in which a commercial rebar tying machine 2 (such as TR180D sold by Makita Corporation) is detachably attached to the rebar tying robot 100 was described. Unlike this configuration, the rebar tying robot 100 may be configured with a dedicated rebar tying unit (not shown) integrally attached thereto. In this case, the rebar tying unit may be integrated with the operation unit 104.

In the above embodiment, an emergency stop button (not shown) for allowing the user to perform emergency stop on the operation of the rebar tying robot 100 may be disposed on the rebar tying robot 100 (such as on the housing 110 of the power supply unit 102). In this case, when the emergency stop button is pressed by the user, the control unit 126 stops the right crawler motor 228, the left crawler motor 254, the stepper motor 279, and the lift motor 148 and turns off the actuator 180. When the user presses the operation execution button 122 again after having resolved the risk, the control unit 126 firstly drives the stepper motor 279 to return the front crank mechanism 276 and the rear crank mechanism 277 to the zero-point position, and drives the lift motor 148 to return the lift mechanism 130 to the upper limit position. After this, the control unit 126 executes the normal control and operates the rebar tying robot 100. The emergency stop button may be arranged at the vicinity of an outer circumference of the rebar tying robot 100, such as at the vicinity of its end portion along the front-rear direction or left-right direction so that the user can easily press the button in emergency. Further, there may be multiple emergency stop buttons.

In the above embodiment, an operation displaying indicator (not shown) that displays the operating state of the rebar tying robot 100 may be arranged on the rebar tying robot 100 (such as on the housing 110 of the power supply unit 102). In this case, the operation displaying indicator may display the state of the tying work which the rebar tying robot 100 performs. The state of the tying work may for example include a state of tying all the intersecting points between the primary rebar R1 and the secondary rebars R2 and a state of tying every other intersecting point between the primary rebar R1 and the secondary rebars R2. Alternatively, the operation displaying indicator may show the user a state in which the rebar tying robot 100 has stopped due to error. The operation displaying indicator may display the operating state of the rebar tying robot 100 by colors of emitted light or blinking patterns of one or more light emitting units, or by a combination thereof, for example. In arranging the operation displaying indicator on the housing 110, the operation displaying indicator may be arranged at a high position so that it is visible from a distance.

In the above embodiment, the configuration in which the conveying unit 106 of the rebar tying robot 100 comprises the right crawler 192 and the left crawler 194 as its longitudinal movement mechanism configured to move the rebar tying robot 100 in the front-rear direction was described. Unlike this configuration, the conveying unit 106 of the rebar tying robot 100 may comprise other types of longitudinal movement mechanism.

In the above embodiment, the configuration in which the conveying unit 106 of the rebar tying robot 100 comprises the side stepper 196 as its lateral movement mechanism configured to move the rebar tying robot 100 in the left-right direction was described. Unlike this configuration, the conveying unit 106 of the rebar tying robot 100 may comprise other types of lateral movement mechanism.

As above, in one or more embodiments, the rebar tying robot 100 is configured to alternately and repeatedly perform the operation of moving, in the direction in which the plurality of primary rebars R1 extends, over the plurality of primary rebars R1 and the plurality of secondary rebars R2 intersecting the plurality of primary rebars R1 and the operation of tying the plurality of primary rebars R1 and the plurality of secondary rebars R2 at points where they intersect. The rebar tying robot 100 comprises the rebar tying machine 2 (an example of rebar tying unit), the conveying unit 106 configured to convey the rebar tying machine 2, and the control unit 126 configured to control the operation of the conveying unit 106. The conveying unit 106 comprises the right crawler 192 and the left crawler 194 (examples of longitudinal movement mechanism) configured to move the rebar tying robot 100 in the front-rear direction, and the central three-dimensional distance sensor 202 (an example of first three-dimensional distance sensor) configured to output the central point cloud data (an example of first point cloud data) which represents the three-dimensional position of an object in the first field of view by point clouds. The control unit 126 is configured to execute the first rebar extraction process (see S142, S144 of FIG. 37) in which the control unit 126 extracts, from the point clouds included in the central point cloud data, the point clouds whose positions in the up-down direction are within the predetermined rebar depth range, and the intersection location identification process (see S152, S154 of FIG. 37) in which the control unit 126 identifies the position where the primary rebar R1 and the secondary rebar R2 intersect based on the point clouds extracted in the first rebar extraction process.

In one or more embodiments, the intersection location identification process includes the primary rebar model generation process (see S130 of FIG. 32) in which the control unit 126 generates the primary rebar model in which the primary rebar R1 is modeled by a linear line, the primary rebar exclusion process (see S148 of FIG. 37) in which the control unit 126 further extracts, from the point clouds extracted in the first rebar extraction process, the point clouds that are not included in the area at or in the vicinity of the primary rebar model, and the intersection location calculation process (see S152, S154 of FIG. 37) in which the control unit 126 calculates the position where the primary rebar R1 and the secondary rebar R2 intersect based on the primary rebar model and the point clouds extracted in the primary rebar exclusion process.

In one or more embodiments, the intersection location calculation process includes: the average value calculation process (see S152 of FIG. 37) in which the control unit 126 calculates the average value of the positions in the front-rear direction of the point clouds extracted in the primary rebar exclusion process, and the average value application process (see S154 of FIG. 37) in which the control unit 126 applies the average value calculated in the average value calculation process to the primary rebar model.

In one or more embodiments, the conveying unit 106 further comprises the front three-dimensional distance sensor 198 (an example of second three-dimensional distance sensor) configured to output the front point cloud data (an example of second point cloud data) which represents the three-dimensional position of an object in the second field of view by point clouds, the second field of view being frontward of the first field of view, and the rear three-dimensional distance sensor 200 (an example of third three-dimensional distance sensor) configured to output the rear point cloud data (an example of third point cloud data) which represents the three-dimensional position of an object in the third field of view by point clouds, the third field of view being rearward of the first field of view. The control unit 126 is further configured to execute the second rebar extraction process (see S82, S84 of FIG. 31) in which the control unit 126 extracts, from the point clouds included in the front point cloud data, the point clouds whose positions in the up-down direction are within the rebar depth range, and the third rebar extraction process (see S106, S108 of FIG. 32) in which the control unit 126 extracts, from the point clouds included in the rear point cloud data, the point clouds whose positions in the up-down direction are within the rebar depth range. In the primary rebar model generation process, the primary rebar model is generated based on the point clouds extracted in the second rebar extraction process and the point clouds extracted in the third rebar extraction process (see S130 of FIG. 32).

In one or more embodiments, the front three-dimensional distance sensor 198 and the rear three-dimensional distance sensor 200 are directed downward.

In one or more embodiments, the control unit 126 is configured to further execute the cluster extraction process (see S146 of FIG. 37) in which the control unit 126 further extracts, from the point clouds extracted in the first rebar extraction process, the point clouds included in the largest cluster. The intersection location identification process is based on the point clouds extracted in the cluster extraction process (see S152 and S154 of FIG. 37).

In one or more embodiments, the central three-dimensional distance sensor 202 is offset from the center of the rebar tying robot 100 in the left-right direction to one side in the left-right direction and is directed diagonally downward toward the other side in the left-right direction.

The invention claimed is:

1. A rebar tying robot configured to alternately and repeatedly perform an operation of moving in a direction in which a plurality of primary rebars extends, over the plurality of primary rebars and a plurality of secondary rebars intersecting the plurality of primary rebars and an operation of tying the plurality of primary rebars and the plurality of secondary rebars at points where the plurality of primary rebars and the plurality of secondary rebars intersect, the rebar tying robot comprising:
a rebar tying unit;
a conveying unit configured to convey the rebar tying unit; and
a control unit configured to control an operation of the conveying unit, wherein
the rebar tying unit comprises:
a feeder mechanism including a feed motor and configured to feed out a wire around the point where the primary rebar and the secondary rebar intersect; and
a twister mechanism including a twisting motor and configured to tie the primary rebar and the secondary rebar with the wire by twisting the wire around the point where the primary rebar and the secondary rebar intersect,
the conveying unit comprises:
a carrier supporting the rebar tying unit;
a longitudinal movement mechanism including a longitudinal movement motor and configured to move the carrier in a front-rear direction; and
a first three-dimensional distance sensor configured to output first point cloud data which represents a three-dimensional position of a subject in a first field of view by point clouds,
the control unit is configured to execute:
a first rebar extraction process in which the control unit extracts, from the point clouds included in the first point cloud data, point clouds whose positions in an up-down direction are within a predetermined rebar depth range; and
an intersection location identification process in which the control unit identifies a position where the primary rebar and the secondary rebar intersect based on the point clouds extracted in the first rebar extraction process, and the intersection location identification process includes:
- a primary rebar model generation process in which the control unit generates a primary rebar model in which the primary rebar is modeled by a linear line;
- a primary rebar exclusion process in which the control unit further extracts, from the point clouds extracted in the first rebar extraction process, point clouds that are located at a distance greater than a predetermined distance from the linear line to isolate point clouds corresponding to the secondary rebar; and
- an intersection location calculation process in which the control unit calculates a position where the primary rebar and the secondary rebar intersect based on the point clouds extracted in the primary rebar exclusion process and the primary rebar model.

2. The rebar tying robot according to claim 1, wherein the intersection location calculation process includes:
- an average value calculation process in which the control unit calculates an average value of positions in the front-rear direction of the point clouds extracted in the primary rebar exclusion process; and
- an average value application process in which the control unit applies the average value calculated in the average value calculation process to the primary rebar model.

3. The rebar tying robot according to claim 1, wherein the conveying unit further comprises:
- a second three-dimensional distance sensor configured to output second point cloud data which represents a three-dimensional position of a subject in a second field of view by point clouds, the second field of view being frontward of the first field of view; and
- a third three-dimensional distance sensor configured to output third point cloud data which represents a three-dimensional position of a subject in a third field of view by point clouds, the third field of view being rearward of the first field of view, the control unit is configured to execute:
- a second rebar extraction process in which the control unit extracts, from the point clouds included in the second point cloud data, point clouds whose positions in the up-down direction are within the rebar depth range; and
- a third rebar extraction process in which the control unit extracts, from the point clouds included in the third point cloud data, point clouds whose positions in the up-down direction are within the rebar depth range, and in the primary rebar model generation process, the primary rebar model is generated based on the point clouds extracted in the second rebar extraction process and the point clouds extracted in the third rebar extraction process.

4. The rebar tying robot according to claim 3, wherein the second three-dimensional distance sensor and the third three-dimensional distance sensor are directed downward.

5. The rebar tying robot according to claim 1, wherein the control unit is configured to further execute a cluster extraction process in which the control unit further extracts, from the point clouds extracted in the first rebar extraction process, point clouds included in a largest cluster, and the intersection location identification process is based on the point clouds extracted in the cluster extraction process.

6. The rebar tying robot according to claim 1, wherein the first three-dimensional distance sensor is offset from a center of the rebar tying robot in a left-right direction to one side in the left-right direction and is directed diagonally downward toward the other side in the left-right direction.

7. The rebar tying robot according to claim 2, wherein the conveying unit further comprises:
- a second three-dimensional distance sensor configured to output second point cloud data which represents a three-dimensional position of a subject in a second field of view by point clouds, the second field of view being frontward of the first field of view; and
- a third three-dimensional distance sensor configured to output third point cloud data which represents a three-dimensional position of a subject in a third field of view by point clouds, the third field of view being rearward of the first field of view, the control unit is configured to execute:
- a second rebar extraction process in which the control unit extracts, from the point clouds included in the second point cloud data, point clouds whose positions in the up-down direction are within the rebar depth range; and
- a third rebar extraction process in which the control unit extracts, from the point clouds included in the third point cloud data, point clouds whose positions in the up-down direction are within the rebar depth range, in the primary rebar model generation process, the primary rebar model is generated based on the point clouds extracted in the second rebar extraction process and the point clouds extracted in the third rebar extraction process, the second three-dimensional distance sensor and the third three-dimensional distance sensor are directed downward, the control unit is configured to further execute a cluster extraction process in which the control unit further extracts, from the point clouds extracted in the first rebar extraction process, point clouds included in a largest cluster, the intersection location identification process is based on the point clouds extracted in the cluster extraction process, and the first three-dimensional distance sensor is offset from a center of the rebar tying robot in a left-right direction to one side in the left-right direction and is directed diagonally downward toward the other side in the left-right direction.

* * * * *